(12) United States Patent
Oh et al.

(10) Patent No.: US 12,150,141 B2
(45) Date of Patent: Nov. 19, 2024

(54) METHOD AND APPARATUS FOR TRANSMITTING AND RECEIVING DATA IN WIRELESS COMMUNICATION SYSTEM

(71) Applicant: Samsung Electronics Co., Ltd., Gyeonggi-do (KR)

(72) Inventors: Jinyoung Oh, Gyeonggi-do (KR); Taehyoung Kim, Gyeonggi-do (KR); Kyunggyu Lee, Gyeonggi-do (KR); Youngrok Jang, Gyeonggi-do (KR); Hyoungju Ji, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 355 days.

(21) Appl. No.: 17/577,786

(22) Filed: Jan. 18, 2022

(65) Prior Publication Data

US 2022/0240294 A1 Jul. 28, 2022

(30) Foreign Application Priority Data

Jan. 18, 2021 (KR) .................. 10-2021-0006812
Jan. 20, 2021 (KR) .................. 10-2021-0008294

(51) Int. Cl.
*H04W 72/23* (2023.01)
*H04L 1/1812* (2023.01)

(52) U.S. Cl.
CPC ........... *H04W 72/23* (2023.01); *H04L 1/1812* (2013.01)

(58) Field of Classification Search
CPC ............................. H04L 1/1812; H04W 72/23
USPC ............................................................. 370/329
See application file for complete search history.

(56) References Cited

U.S. PATENT DOCUMENTS

| 11,646,832 | B2 * | 5/2023 | Rastegardoost | ...... H04L 5/0055 |
| | | | | 370/329 |
| 2021/0212099 | A1 * | 7/2021 | Yi | ........... H04W 72/23 |
| 2021/0352735 | A1 * | 11/2021 | Bae | ........... H04W 72/23 |
| 2022/0123906 | A1 * | 4/2022 | Wu | ........... H04L 1/1812 |
| 2022/0124737 | A1 * | 4/2022 | Huang | ........... H04L 1/0031 |
| 2022/0416956 | A1 * | 12/2022 | Li | ........... H04L 1/1864 |
| 2023/0141338 | A1 * | 5/2023 | Lin | ........... H04L 1/1822 |
| | | | | 370/329 |
| 2023/0147173 | A1 * | 5/2023 | Matsumura | ....... H04W 72/1273 |
| | | | | 370/329 |

(Continued)

*Primary Examiner* — Peter G Solinsky
(74) *Attorney, Agent, or Firm* — The Farrell Law Firm, P.C.

(57) ABSTRACT

The disclosure relates to a 5G or 6G communication system for supporting a higher data transmission rate. Provided is a method performed by a user equipment (UE), the method including receiving downlink control information (DCI) scheduling a plurality of physical downlink shared channels (PDSCHs); identifying a value of a hybrid automatic repeat and request (HARQ) feedback timing indicator included in the received DCI; and performing the HARQ feedback transmission, based on the identified value of the HARQ feedback timing indicator, wherein in case that the value is identified as a non-numerical value, HARQ feedback information for the plurality of PDSCHs is not transmitted based on the DCI and the HARQ feedback information for the plurality of PDSCHs is transmitted after an other DCI including a numerical value of the HARQ feedback timing indicator is received.

16 Claims, 15 Drawing Sheets

(56) References Cited

U.S. PATENT DOCUMENTS

| | | | |
|---|---|---|---|
| 2023/0179342 A1* | 6/2023 | Zhang | H04L 1/1854 |
| | | | 370/329 |
| 2023/0246788 A1* | 8/2023 | Jiang | H04L 5/0094 |
| | | | 370/329 |
| 2023/0262699 A1* | 8/2023 | Kusashima | H04L 5/0053 |
| 2023/0336312 A1* | 10/2023 | Park | H04L 5/0044 |
| 2024/0015761 A1* | 1/2024 | Lei | H04L 5/0098 |
| 2024/0072975 A1* | 2/2024 | Rastegardoost | H04W 72/20 |

* cited by examiner

METHOD AND APPARATUS FOR TRANSMITTING AND RECEIVING DATA IN WIRELESS COMMUNICATION SYSTEM

CROSS-REFERENCE TO RELATED APPLICATIONS

This application is based on and claims priority under 35 U.S.C. § 119 to Korean Patent Application Nos. 10-2021-0006812 and 10-2021-0008294, which were filed in the Korean Intellectual Property Office on Jan. 18, 2021, and Jan. 20, 2021, respectively, the entire disclosure of each of which is incorporated herein by reference.

BACKGROUND

1. Field

The disclosure relates generally to a method and apparatus for transmitting and receiving data in a wireless communication system, and a method and apparatus for transmitting a reception result of a received data channel.

2. Description of the Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (LTRLLC), and massive Machine-Type Communications (mMTC), there has been ongoing standardization regarding beamforming and massive MIMO for mitigating radio-wave path loss and increasing radio-wave transmission distances in nnWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended. Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

The present disclosure has been made to address the above-mentioned problems and disadvantages, and to provide at least the advantages described below.

The disclosure relates to a method and apparatus for transmission and reception of a data channel between a BS and a user equipment. In particular, provided are a method and apparatus for providing flexibility in physical DL shared channel (PDSCH) scheduling or physical UL shared channel (PUSCH) scheduling.

According to an aspect of the disclosure, a method performed by a UE includes receiving downlink control information (DCI) scheduling a plurality of physical downlink shared channels (PDSCHs); identifying a value of a hybrid automatic repeat and request (HARQ) feedback timing indicator included in the received DCI, wherein a slot for HARQ feedback transmission is determined based on the value of the HARQ feedback timing indicator and a slot where last physical downlink shared channel (PDSCH) among the plurality of PDSCHs is transmitted; and performing the HARQ feedback transmission, based on the identified value of the HARQ feedback timing indicator, wherein in case that the value is identified as a non-numerical value, HARQ feedback information for the plurality of PDSCHs is not transmitted based on the DCI and the HARQ feedback information for the plurality of PDSCHs is transmitted after an other DCI including a numerical value of the HARQ feedback timing indicator is received According to another aspect of the disclosure, a method performed by a BS includes transmitting downlink control information (DCI) scheduling a plurality of physical downlink shared channels (PDSCHs), wherein the DCI includes a hybrid automatic repeat and request (HARQ) feedback timing indicator and a slot for HARQ feedback transmission is determined based on a value of the HARQ feedback timing indicator and a slot where last physical downlink shared channel (PDSCH) among the plurality of PDSCHs is transmitted; and transmitting the plurality of PDSCHs, wherein in case that the value is a non-numerical value, HARQ feedback information for the plurality of PDSCHs is not transmitted based on the DCI and the HARQ feedback information for the plurality of PDSCHs is transmitted after an other DCI including a numerical value of the HARQ feedback timing indicator is transmitted.

According to another aspect of the disclosure, a UE includes a transceiver; and a processor coupled with the transceiver and configured to receive downlink control information (DCI) scheduling a plurality of physical downlink shared channels (PDSCHs), identify a value of a hybrid automatic repeat and request (HARQ) feedback timing indicator included in the received DCI, wherein a slot for HARQ feedback transmission is determined based on the value of the HARQ feedback timing indicator and a slot where last physical downlink shared channel (PDSCH) among the plurality of PDSCHs is transmitted, and perform the HARQ feedback transmission, based on the identified value of the HARQ feedback timing indicator, wherein in case that the value is identified as a non-numerical value, HARQ feedback information for the plurality of PDSCHs is not transmitted based on the DCI and the HARQ feedback information for the plurality of PDSCHs is transmitted after an other DCI including a numerical value of the HARQ feedback timing indicator is received.

According to another aspect of the disclosure, a BS includes a transceiver; and a processor coupled with the transceiver and configured to transmit downlink control information (DCI) scheduling a plurality of physical downlink shared channels (PDSCHs), wherein the DCI includes a hybrid automatic repeat and request (HARQ) feedback timing indicator and a slot for HARQ feedback transmission is determined based on a value of the HARQ feedback timing indicator and a slot where last physical downlink shared channel (PDSCH) among the plurality of PDSCHs is transmitted, and transmit the plurality of PDSCHs, wherein in case that the value is a non-numerical value, HARQ feedback information for the plurality of PDSCHs is not transmitted based on the DCI and the HARQ feedback information for the plurality of PDSCHs is transmitted after an other DCI including a numerical value of the HARQ feedback timing indicator is transmitted.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
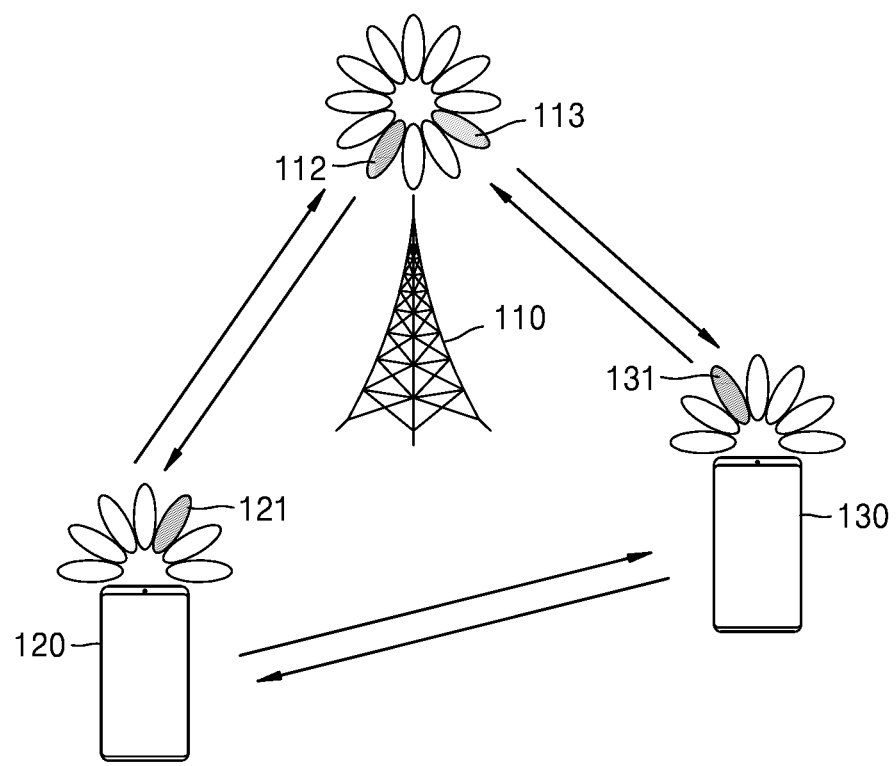
FIG. 1 illustrates a wireless communication system, according to an embodiment.

Hereinafter, embodiments of the disclosure will now be described more fully with reference to the accompanying drawings.

In the descriptions of embodiments, certain detailed explanations of the related art which are well known in the art to which the disclosure belongs and are not directly related to the disclosure are omitted. By omitting unnecessary explanations, the essence of the disclosure may not be obscured and may be explicitly conveyed. The terms used in the specification are defined in consideration of functions used in the disclosure, and may be changed according to the intent or known methods of operators and users. Accordingly, definitions of the terms should be understood based on the entire description of the present specification.

For the same reason, some components in the drawings are exaggerated, omitted, or schematically illustrated. Also, the size of each component does not entirely reflect the actual size. In the drawings, the same or corresponding components are denoted by the same reference numerals.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein. Rather, these embodiments are provided so that the disclosure will be thorough and complete and will fully convey the concept of the disclosure to one of ordinary skill in the art, and the disclosure will only be defined by the appended claims. Throughout the specification, like reference numerals denote like components. In the descriptions of the disclosure, detailed explanations of the related art are omitted when it is deemed that they may unnecessarily obscure the essence of the disclosure. The terms used in the specification are defined in consideration of functions used in the disclosure, and can be changed according to the intent or commonly used methods of users or operators. Accordingly, definitions of the terms are understood based on the entire descriptions of the present specification.

Throughout the disclosure, the expression "at least one of a, b or c" indicates only a, only b, only c, both a and b, both a and c, both b and c, all of a, b, and c, or variations thereof.

Examples of a terminal may include a UE, a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Hereinafter, a BS is an entity that allocates resources to a UE, and may be at least one of a gNode B, an eNode B, a Node B, (or xNode B (where, x indicates an alphabet letter including g or e), a radio access unit, a BS controller, a satellite, an airborne entity, or a node on a network. A UE may include an MS, a vehicle, a satellite, an airborne entity, a cellular phone, a smartphone, a computer, or a multimedia system enabled to perform a communication function. In the disclosure, a DL is a wireless transmission path of a signal transmitted from a BS to a UE, and a UL is a wireless transmission path of a signal transmitted from a UE to a BS. In addition, there may be a sidelink (SL) indicating a wireless transmission path of a signal being transmitted from a UE to another UE.

Although long term evolution (LTE), LTE-Advanced (LTE-A), or 5G system is mentioned as an example in the following description, embodiments of the disclosure may also be applied to other communication systems having similar technical backgrounds or channel types. For example, 5G-Advance or new radio (NR)-advance or 6G mobile communication technology, which is developed after a 5G mobile communication technology (or NR), may be included therein, and hereinafter, 5G may refer to a concept including legacy LTE, LTE-A, and other similar communication services. Also, the disclosure is applicable to other communication systems through modification at the discretion of one of ordinary skill in the art without greatly departing from the scope of the disclosure.

Each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory may produce an article of manufacture including instruction means that perform the functions specified in the flowchart block(s). The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit" as used in the present embodiment refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Thus, a "unit" may include, by way of example, components, such as software components, object-oriented software components, class components, task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or further separated into additional components and "units". Further, the components and "units" may be implemented to operate one or more central processing units (CPUs) in a device or a secure multimedia card. Also, a "unit" may include one or more processors in embodiments.

Wireless communication systems have been initially developed to provide voice centered services, and are now being developed to provide broadband wireless communication systems providing high-speed, high-quality packet data services, like communication standards of high speed packet access (HSPA), LTE or evolved universal terrestrial radio access (E-UTRA)), and LTE-Advanced (LTE-A) of the $3^{rd}$ Generation Partnership Project (3GPP), high rate packet data (HRPD) and ultra mobile broadband (UMB) of 3GPP2, 802.16e of the Institute of Electrical and Electronic Engineers (IEE), etc.

As a representative example of the broadband wireless communication system, the LTE system has adopted an OFDM scheme in a DL and has adopted a single carrier frequency division multiple access (SC-FDMA) scheme in a UL. The UL refers to a radio link for transmitting data or a control signal from a UE to a BS, and the DL refers to a radio link for transmitting data or a control signal from the BS to the UE. The multiple access schemes identify data or control information of different users in a manner that time-frequency resources for carrying the data or control information of the users are allocated and managed not to overlap each other, that is, to achieve orthogonality therebetween.

As a post-LTE communication system, the 5G communication system is requested to freely reflect various requirements from users and service providers, and thus, has to support services that simultaneously satisfies the various requirements. The services being considered for the 5G communication system include enhanced mobile broadband (EMBB), massive machine-type communication (mMTC), ultra-reliability low-latency communication (URLLC) services, etc.

eMBB aims to provide an improved data rate than a data rate supported by the legacy LTE, LTE-A, or LTE-Pro. For example, in the 5G communication system, eMBB should be able to provide a peak data rate of 20 Ghps in a DL and a peak data rate of 10 Ghps in an tiL at one BS. Also, the 5G communication system has to simultaneously provide the peak data rate and an increased user-perceived data rate of a UE. In order to satisfy such requirements, there is a need for an improvement in transmission/reception technology including an improved MIMO transmission technology. Also, a data rate required in the 5G communication system may be satisfied by using a frequency bandwidth wider than 20 megahertz (MHz) in the 3 GHz to 6 GHz or more frequency band, instead of the LIE transmitting a signal by using maximum 20 MHz in the 2 GHz band.

Also, mMTC is being considered to support application services such as IoT technologies in the 5G communication system, In order to efficiently provide the IoT technologies, the mMTC may require the support for a large number of terminals in a cell, improved coverage for a terminal, improved battery time, reduced costs of a terminal, and the like. Because IoT technologies may be attached to various sensors and various devices to provide a communication function, mMTC should be able to support a large number of terminals (e.g., 1,000,000) ter iinals/kilometer $(km)^2$) in a cell. Also, because a terminal supporting mMTC is likely to be located in a shadow region failing to be covered by the cell, such as the basement of a building, due to the characteristics of the service, the terminal may require wider coverage than other services provided by the 5G communication system. The terminal supporting the mMTC should be configured as a low-cost terminal and may require a very long battery life time of 10 to 15 years because it is difficult to frequently replace the battery of the terminal.

URLLC refers to cellular-based wireless communication services used for mission-critical purposes. For example, services for remote control of robots or machinery, industrial automation, unmanned aerial vehicles, remote health care, emergency alerts, and the like may be considered. Therefore, URLLC should provide communications providing very low latency and very high reliability. For example, a service supporting URLLC should satisfy air interface latency of less than 0.5 milliseconds, and simultaneously has a requirement for a packet error rate of $10^{-5}$ or less. Thus, for the service supporting URLLC, the 5G system should provide a transmit time interval (TTI) smaller than other services and may simultaneously have a design requirement for allocating wide resources in a frequency band so as to ensure reliability of a communication link.

The three services of the 5G, i.e., eMBB, URLLC, and mMTC, may be multiplexed and transmitted in one system. Here, in order to satisfy different requirements of the services, the services may use different transceiving schemes and different transceiving parameters, Obviously, 5G is not limited to the afore-described three services.

FIG. 1 illustrates a wireless communication system, according to an embodiment of the disclosure. FIG. 1 illustrates a BS 110, a first UE 120, and a second UE 130, as nodes using wireless channels in the wireless communication system. While FIG. 1 illustrates only one BS as an example, another BS same as or similar to the BS 110 may be further present.

The BS 110 may refer to a network infrastructure providing a wireless access to the first UE 120 and the second UE 130. The BS 110 has coverage defined as a preset geographical region based on a range for transmitting a wireless signal. The BS 110 may also be referred to as an access point (AP), eNodeB (eNB), gNodeB (gNB), 5G node, wireless point, transmission/reception point (TRP), or another term having a similar technical meaning.

The first UE 120 and the second UE 130 may respectively refer to devices used by users and may perform communication with the BS 110 through the wireless channels. In another case, at least one of the first UE 120 or the second UE 130 may be operated without user-involvement. That is, at least one of the first UE 120 or the second UE 130 may be a device performing MTC and may not be carried by a user. Each of the first UE 120 and the second UE 130 may be referred to as a mobile station, a subscriber station, a remote terminal, a wireless terminal, a user device, a station (STA), or another term having a similar technical meaning.

A wireless communication environment may include wireless communication not only in a licensed band but also in an unlicensed band. The BS 110, the first UE 120, and the second UE 130 may transmit and receive a wireless signal in the unlicensed band (e.g., 5 to 7.125 GHz and/or 51 to 71 GHz). In the unlicensed band, a cellular communication system and another communication system (e.g., a wireless local area network (WLAN)) may coexist. To ensure fairness between two communication systems, in other words, to prevent occurrence of a situation where a channel is exclusively used by one system, the BS 110, the first UE 120, and the second UE 130 may perform a channel access procedure for an unlicensed band. As an example of the channel access procedure for an unlicensed band, the BS 110, the first UE 120, and the second UE 130 may perform a "listen before talk (LBT)" procedure.

The BS 110, the first UE 120, and the second UE 130 may transmit and receive a wireless signal in an mmWave band (e.g., 28 GHz, 30 GHz, 38 GHz, and/or 60 GHz band). In this regard, in order to increase a channel gain, the BS 110, the first UE 120, and the second UE 130 may perform beamforming. Here, the beamforming may include transmission beamforming and/or reception beamforming. That is, the BS 110, the first UE 120, and the second UE 130 may apply directivity to a transmission signal or a reception signal. To this end, the BS 110 and the first UE 120 and the second UE 130 may select serving beams via a beam search procedure and/or a beam management procedure. After the serving beams are selected, communication thereafter may be performed using a resource in a quasi-co-located (QCL) relation with a resource that transmitted the serving beams.

The BS 110 may select a beam 112 or 113 in a particular direction. Then, the BS 110 may perform communication with a terminal by using the beam 112 or 113 in the particular direction. For example, the BS 110 may receive a signal from the first UE 120 or may transmit a signal to the first UE 120, by using the beam 112. The first UE 120 may receive a signal from the BS 110 or may transmit a signal to the BS 110, by using a beam 121. Also, the BS 110 may receive a signal from the second UE 130 or may transmit a signal to the second UE 130, by using the beam 113. The second UE 130 may receive a signal from the BS 110 or may transmit a signal to the BS 110, by using a beam 131.

Figure 2:
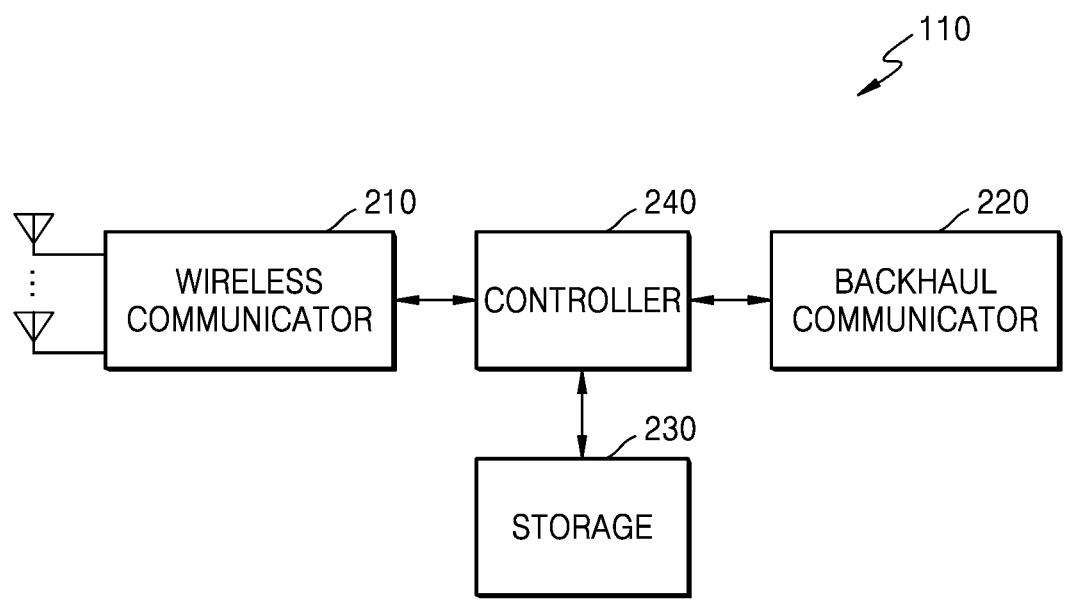
FIG. 2 illustrates a configuration of a BS (BS) in a wireless communication system, according to an embodiment.

FIG. 2 illustrates a configuration of a BS in a wireless communication system, according to an embodiment of the disclosure.

The configuration illustrated in FIG. 2 may be understood as a configuration of the BS 110 of FIG. 1. The terms such as "unit", "module", and the like used in the disclosure indicate a unit, which processes at least one function or motion, and the unit and the module may be implemented by hardware or software, or by a combination of hardware and software.

Referring to FIG. 2, the BS 110 includes a wireless communicator 210, a backhaul communicator 220, a storage 230, and a controller 240.

The wireless communicator 210 (which is interchangeably used with a transceiver) may perform functions for transmitting or receiving a signal through a wireless channel. The wireless communicator 210 may perform conversion between a baseband signal and a bit string based on physical layer specifications of a system. For data transmission, the wireless communicator 210 may generate complex symbols by encoding and modulating a transmission bit string. For data reception, the wireless communicator 210 may reconstruct the transmission bit string by demodulating and decoding a received baseband signal.

The wireless communicator 210 may up-convert a baseband signal into an RF band signal and then may transmit the RF band signal through an antenna, and may down-convert an RF band signal received through the antenna, into a baseband signal. To do so, the wireless communicator 210 may include a transmission filter, a reception filter, an amplifier, a mixer, an oscillator, a digital-to-analog convertor (DAC), an analog-to-digital convertor (ADC), etc. Also, the wireless communicator 210 may include a plurality of RF chains corresponding to a plurality of transmission and reception paths. Furthermore, the wireless communicator 210 may include at least one antenna array including a plurality of antenna elements.

In terms of hardware, the wireless communicator 210 may be configured as a digital unit and an analog unit, and the analog unit may be configured as a plurality of sub-units depending on operating power, an operating frequency, or the like. The digital unit may be configured as at least one digital signal processor (DSP).

The wireless communicator 210 may transmit and receive signals as described above. Accordingly, all parts or some parts of the wireless communicator 210 may be referred to as a transmitter, a receiver, or a transceiver. Also, in the descriptions below, transmission and reception performed through a wireless channel indicate that the aforementioned processing performed by the wireless communicator 210 is applied thereto. The wireless communicator 210 may include at least one transceiver.

The backhaul communicator 220 may provide an interface for performing communication with other nodes in a network. That is, the backhaul communicator 220 may convert a bit string to a physical signal, the bit string being transmitted from the BS to another node, another access node, another BS, an upper node, a core network, and the like, and may convert a physical signal to a bit string, the physical signal being received from another node.

The storage 230 may store basic programs, application programs, and data, e.g., configuration information, for operations of the BS. The storage 230 may be configured as a volatile memory, a non-volatile memory, or a combination of a volatile memory and a non-volatile memory. Furthermore, the storage 230 may provide stored data, in response to a request by the controller 240. The storage 230 may include at least one memory.

The controller 240 may control overall operations of the BS, and may transmit and receive signals via the wireless communicator 210 or the backhaul communicator 220. Also, the controller 240 may record data to or read data from the storage 230. The controller 240 may perform functions of a protocol stack which are requested by the communication rules. The protocol stack may be included in the wireless communicator 210. The controller 240 may include at least one processor.

The controller 240 may perform a channel access procedure on an unlicensed band. The transceiver (e.g., the wireless communicator 210) may receive signals transmitted through the unlicensed band, and the controller 240 may determine whether the unlicensed band is in an idle state, by comparing strength of the received signal with a threshold that is predefined or is determined as a value according to a function where a bandwidth is a factor. Also, the controller 240 may transmit a control signal to a UE or receive a control signal from the UE, via the transceiver. Also, the controller 240 may transmit data to the or receive data from the uE, via the transceiver. Based on the control signal or data signal received from the UE, the controller 240 may determine a transmission result with respect to a signal transmitted to the UE. The controller 240 may configure one DCI for allocating one or more data channels to one or more cells, and may transmit the DCi to the UE via the wireless communicator 210. Also, before transmission of the DCI, the controller 240 may provide configuration information to the UE higher layer signaling, the configuration information being for allocating one or more data channels according to one DCI. In addition, the controller 240 may transmit a data channel to the UE or receive a data channel from the UE, based on the configuration information and information fields included in the DCI.

Additionally, based on the transmission result, i.e., a reception result with respect to the control signal or data signal received by the UE, the controller 240 may maintain or change a length of a contention window (hereinafter, referred to as the contention window adjustment) for the channel access procedure. The controller 240 may determine a reference duration to obtain the transmission result for the contention window adjustment. The controller 240 may determine, in the reference window, a data channel for the contention window adjustment, The controller 240 may determine, in the reference window, a reference control channel for the contention window adjustment. When it is determined that the unlicensed band is in the idle state, the controller 240 may occupy a channel.

Also, the controller 240 may receive UL control information (UCI) from the UE via the wireless communicator 210 and check whether it is required to retransmit a DL data channel and/or change a modulation and coding scheme, via one or more pieces of HARQ acknowledgement (HARQ-ACK) information and/or channel state information (CSI) included in the UCI. Also, the controller 240 may generate DCI for scheduling initial transmission or retransmission of DL, data or requesting transmission of UCI and transmit the generated to the UE via the wireless communicator 210. Also, the controller 240 may control the wireless communicator 210 to receive UL data and/or UCI transmitted or retransmitted according to the afore-described DCI.

Figure 3:
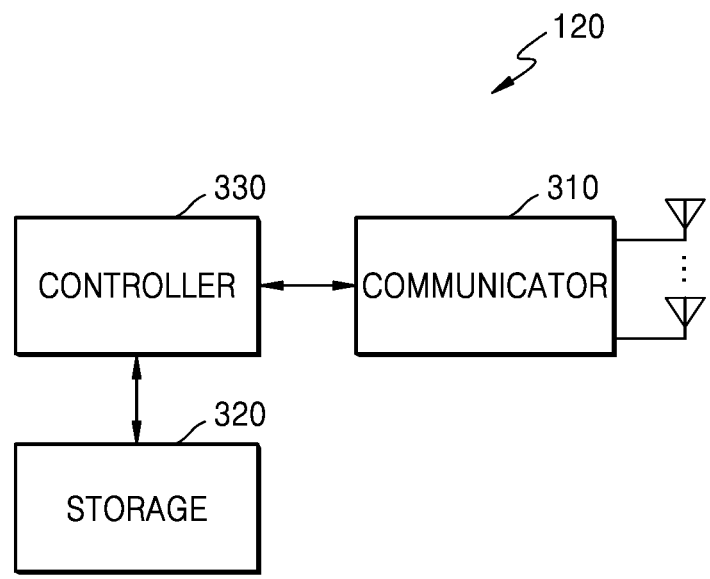
FIG. 3 illustrates a configuration of a user equipment (UE) in a wireless communication system, according to an embodiment.

FIG. 3 illustrates a configuration of a UE in a wireless communication system, according to an embodiment.

The configuration illustrated in FIG. 3 may be understood as a configuration of the first UE 120 or the second UE 130 of FIG. 1. The terms such as "unit", "module", and the like used in the disclosure indicate a unit, which processes at least one function or motion, and the unit and the module may be implemented by hardware or software, or by a combination of hardware and software.

Referring to FIG. 3, the UE 120 includes a communicator 310, a storage 320, and a controller 330.

The communicator 310 (which is interchangeably used with a transceiver) may perform functions for transmitting or receiving a signal through a wireless channel. The communicator 310 may perform conversion between a baseband signal and a bit string based on physical layer specifications of a system. For data transmission, the communicator 310 may generate complex symbols by encoding and modulating a transmission bit string. For data reception, the communicator 310 may reconstruct a transmission bit string received from another device or a BS, by demodulating and decoding a received baseband signal. The communicator 310 may up-convert a baseband signal into a RF band signal and then may transmit the RF band signal through an antenna, and may down-convert an RF band signal received through the antenna, into a baseband signal. The communicator 310 may include a transmission filter, a reception filter, an amplifier, a mixer, an oscillator, a DAC, an ADC, or the like.

Also, the communicator 310 may include a plurality of transmission and reception paths. Furthermore, the communicator 310 may include at least one antenna array including a plurality of antenna elements. In terms of hardware, the communicator 310 may be configured as a digital unit and an analog unit (e.g., an RF integrated circuit (RFIC)). In this regard, the digital unit and the analog unit may be implemented as one package. Also, the communicator 310 may include a plurality of RF chains. Furthermore, the communicator 310 may include at least one antenna array including a plurality of antenna elements, and thus, may perform beamforming.

The communicator 310 may transmit and receive signals as described above. Accordingly, all parts or some parts of the communicator 310 may be referred to as a transmitter, a receiver, or a transceiver. Also, in the descriptions below, transmission and reception performed through a wireless channel indicate that the aforementioned processing performed by the communicator 310 is applied thereto. The communicator 310 may include at least one transceiver.

The storage 320 may store basic programs, application programs, and data, e.g., configuration information, for operations of the UE. The storage 320 may be configured as a volatile memory, a non-volatile memory, or a combination of a volatile memory and a non-volatile memory. Furthermore, the storage 320 may provide stored data, in response to a request by the controller 330. The storage 320 may include at least one memory.

The controller 330 may control overall operations of the UE, and may transmit and receive signals via the communicator 310. Also, the controller 330 may record data to or read data from the storage 320. The controller 330 may perform functions of a protocol stack which are requested by the communication rules. To do so, the controller 330 may include at least one processor or microprocessor or may be a part of a processor. The controller 330 may include at least one processor. Also, a part of the communicator 310 and/or the controller 330 may be referred to as a communication processor. The controller 330 may receive, via the transceiver (e.g., the communicator 310), a DL signal (a DL control signal or DL data) transmitted from a BS. Also, the controller 330 may determine a transmission result with respect to the DL The transmission result may include, as a feedback to the transmitted DL signal, acknowledgement (ACK), negative ACK (NACK), discontinuous transmission (DTX), etc. The transmission result may be referred to using various terms including a reception state of a DL signal, a reception result of the DL signal, a decoding result of the DL signal, HARQ-ACK information of the DL signal, or the like. In addition, the controller 330 may transmit, to the a UL signal as a response signal to the DL signal via the transceiver. The UL signal may explicitly or implicitly include the transmission result of the DL signal. The controller 330 may include, in UCI, one or more pieces of information among the afore-described HARQ-ACK information and/or CSI, and may transmit the UCI to the BS via the communicator 310. Here, the UCI may be transmitted with UL data via a UL data channel or may be transmitted without UL data via a UL data channel to the BS.

The controller 330 may perform a channel access procedure on an unlicensed band. The communicator 310 may receive signals transmitted through the unlicensed band, and the controller 330 may determine whether the unlicensed band is in an idle state, by comparing strength of the received signal with a threshold that is predefined or is determined as a value according to a function where a bandwidth is a factor. The controller 330 may perform an access procedure on the unlicensed band so as to transmit a signal to the BS. Also, the controller 330 may determine a UL transmit resource in which the UCI is to be transmitted, by using one or more of a result of performing the channel access procedure and the DCI received from the BS, and may transmit the UCI to the BS via the transceiver.

The controller 330 may receive higher layer signaling from the BS via the communicator 310, the higher layer signaling including configuration information required to receive one DCI configured to allocate one or more data channels to one or more cells. The controller 330 receives the DCI and interprets fields included in the DCI, based on the configuration information. Also, the controller 330 may transmit a data channel to the BS or may receive a data channel from the BS, based on the configuration information and information fields included in the DCI.

Figure 4:
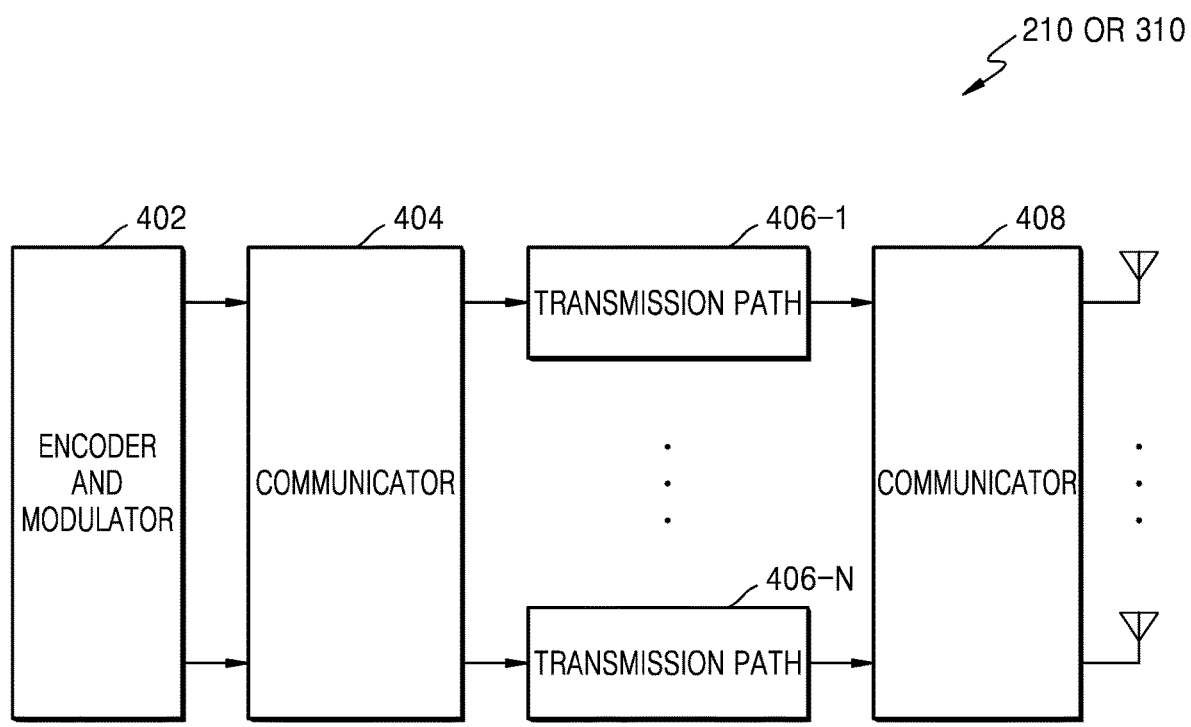
FIG. 4 illustrates a configuration of a communicator in a wireless communication system, according to an embodiment.

FIG. 4 illustrates a configuration of a communicator in a wireless communication system, according to an embodiment of the disclosure.

Referring to FIG. 4, the wireless communicator 210 (or the communicator 310) include an encoding and modulating unit 402, a digital beamformer 404, a plurality of transmission paths 406-1 to 406-N, and an analog beamformer 408.

The encoding and modulating unit 402 may perform channel encoding. For channel encoding, at least one of low density parity check (LDPC) codes, convolution codes, or polar codes may be used. The encoding and modulating unit 402 may generate modulated symbols by performing constellation mapping on encoded bits.

The digital beamformer 404 may perform beamforming on a digital signal (e.g., the modulated symbols). To do so, the digital beamformer 404 may multiply the modulated symbols by beamforming weights. In this regard, the beamforming weights may be used to change the magnitude and phase of a signal and may be referred to as a preceding matrix, a precoder, and the like. The digital beamformer 404 may output modulated symbols that are digitally-beamformed (i.e., precoded) to the plurality of transmission paths 406-1 to 406-N. Here, according to a MIMO transmission technique, the modulated symbols may be multiplexed or same modulated symbols may be provided to the plurality of transmission paths 406-1 to 406-N.

The plurality of transmission paths 406-1 to 406-N may convert digitally-beamformed digital signals to analog signals. To do so, each of the plurality of transmission paths 406-1 to 406-N may include an inverse fast Fourier transform (IFFT) operator, a cyclic prefix (CP) inserter, a DAC, and an up-converter. The CP inserter is arranged for an OFDM, 4 scheme, and may be excluded when a different physical layer scheme (e.g., filter bank multi-carrier (FBMC)) is applied. The plurality of transmission paths 406-1 to 406-N may provide independent signal processing processes to a plurality of streams generated through digital beamforming. However, depending on implementation methods, some elements of the plurality of transmission paths 406-1 to 406-N may be shared.

The analog beamformer 408 may perform beamforming on analog signals from the plurality of transmission paths 406-1 to 406-N, and then the beamformed signals may be connected to the at least one antenna array including a plurality of antenna elements. To do so, the analog beamformer 408 may multiply the analog signals by beamforming weights. In this regard, the beamforming weights may be used to change the magnitude and phase of a signal. The analog beamformer 408 may be variously configured, based on connection structures between the plurality of transmission paths 406-1 to 406-N and antennas. Each of the plurality of transmission paths 406-1 to 406-N may be connected to one antenna array. The plurality of transmission paths 406-1 to 406-N may be connected to one antenna array. The plurality of transmission paths 406-1 to 406-N may be adaptively connected to one antenna array or at least two antenna arrays.

Figure 5:
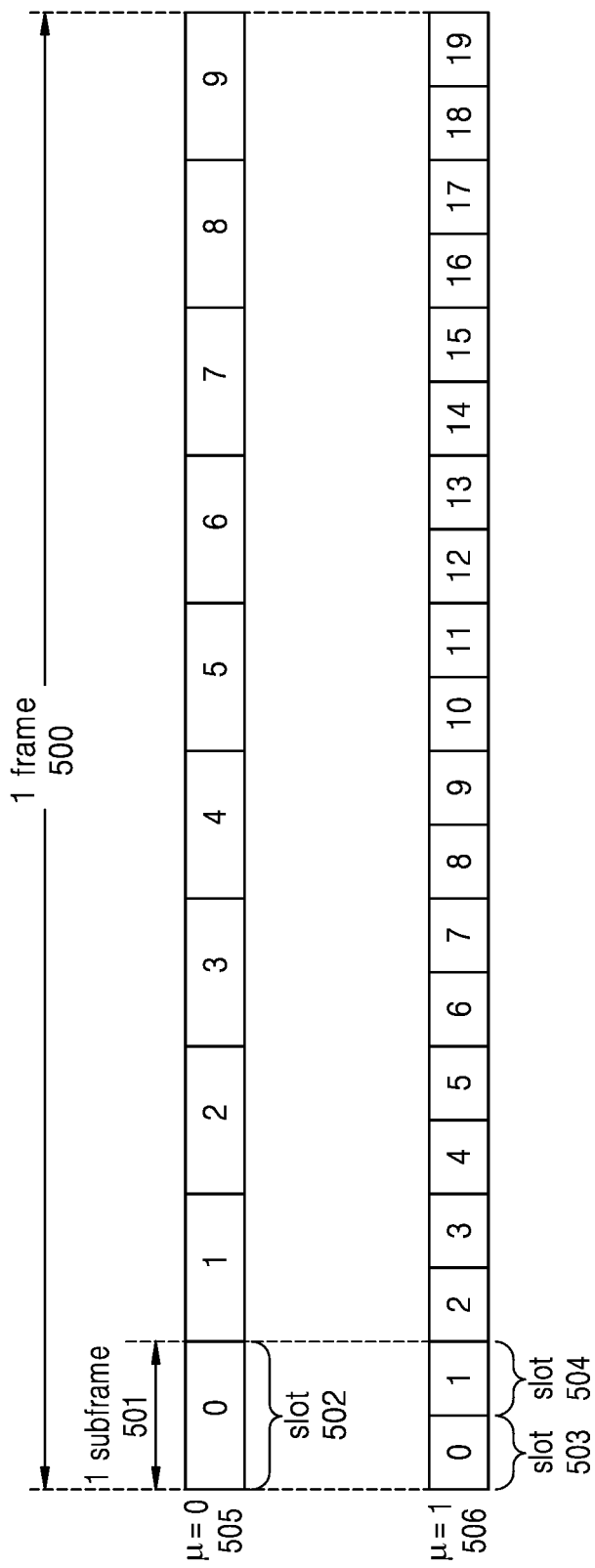
FIG. 5 illustrates structures of a frame, a subframe, and a slot of a 5G communication system, according to an embodiment.

FIG. 5 illustrates structures of a frame, a subframe, and a slot of a 5G communication system, according to an embodiment.

Referring to FIG. 5 an example of structures of a frame 500, a subframe 501, and slots 502, 503, and 504 of a case where μ=0 505 indicating a subcarrier spacing of 15 kHz and a case where μ=1 506 indicating a subcarrier spacing of 30 kHz are included. In the 5G communication system of FIG. 5, 1 frame 500 may be defined as 10 milliseconds (ms). 1 subframe 501 may be defined as 1 ms, and thus, 1 frame 500 may consist of 10 subframes 501. 1 subframe 501 may consist of one slot or a plurality of slots. 1 slot may consist of or may be defined as 14 OFDM symbols. That is, the number of symbols per 1 slot ($N_{symb}^{slot}$) is 14. Here, the number of slots per 1 subframe 501 ($N_{symb}^{subframe,\mu}$) may vary according to numerology μ 505 or 506 indicating a configuration of a subcarrier spacing. When μ=0, 1 subframe 501 may consist of one slot 502, and when 1 subframe 501 may consist of two slots 503 and 504.

As the number of slots per 1 subframe may vary according to a configuration value μ with respect to a subcarrier spacing, the number of slots per 1 frame ($N_{symb}^{frame,\mu}$) may also vary accordingly. Each subcarrier spacing configuration value μ, and $N_{symb}^{subframe,\mu}$ and $N_{symb}^{frame,\mu}$, according to μ, may be defined as in Table 1 below. When μ=2, the LE may be additionally configured with a CP by higher layer signaling from the BS. Table 1 shows a frame structure according to each subcarrier spacing.

TABLE 1

| μ | Δf = $2^\mu \cdot 15$[kHz] | Cyclic prefix | $N_{symb}^{slot}$ | $N_{slot}^{frame,\mu}$ | $N_{slot}^{subframe,\mu}$ |
|---|---|---|---|---|---|
| 0 | 15 | Normal | 14 | 10 | 1 |
| 1 | 30 | Normal | 14 | 20 | 2 |
| 2 | 60 | Normal, Extended | 14 | 40 | 4 |
| 3 | 120 | Normal | 14 | 80 | 8 |
| 4 | 240 | Normal | 14 | 160 | 16 |

Higher layer signaling or a higher layer signal may indicate at least one of UE-specific or cell-specific radio resource control (RRC) signaling or packet data convergence protocol (PDCP) signaling or a media access control (MAC) control element (MAC CE). Also, higher layer signaling or a higher layer signal may include system information, i.e., a system information block (SIB), which is commonly transmitted to a plurality of UEs, and may also include information (e.g., a physical broadcast channel (PBCH) payload) except for a master information block (MIB) from among information transmitted via a PBCH. Here, the MIB may also be indicated as being included in the higher layer signaling or the higher layer signal.

Figure 6:
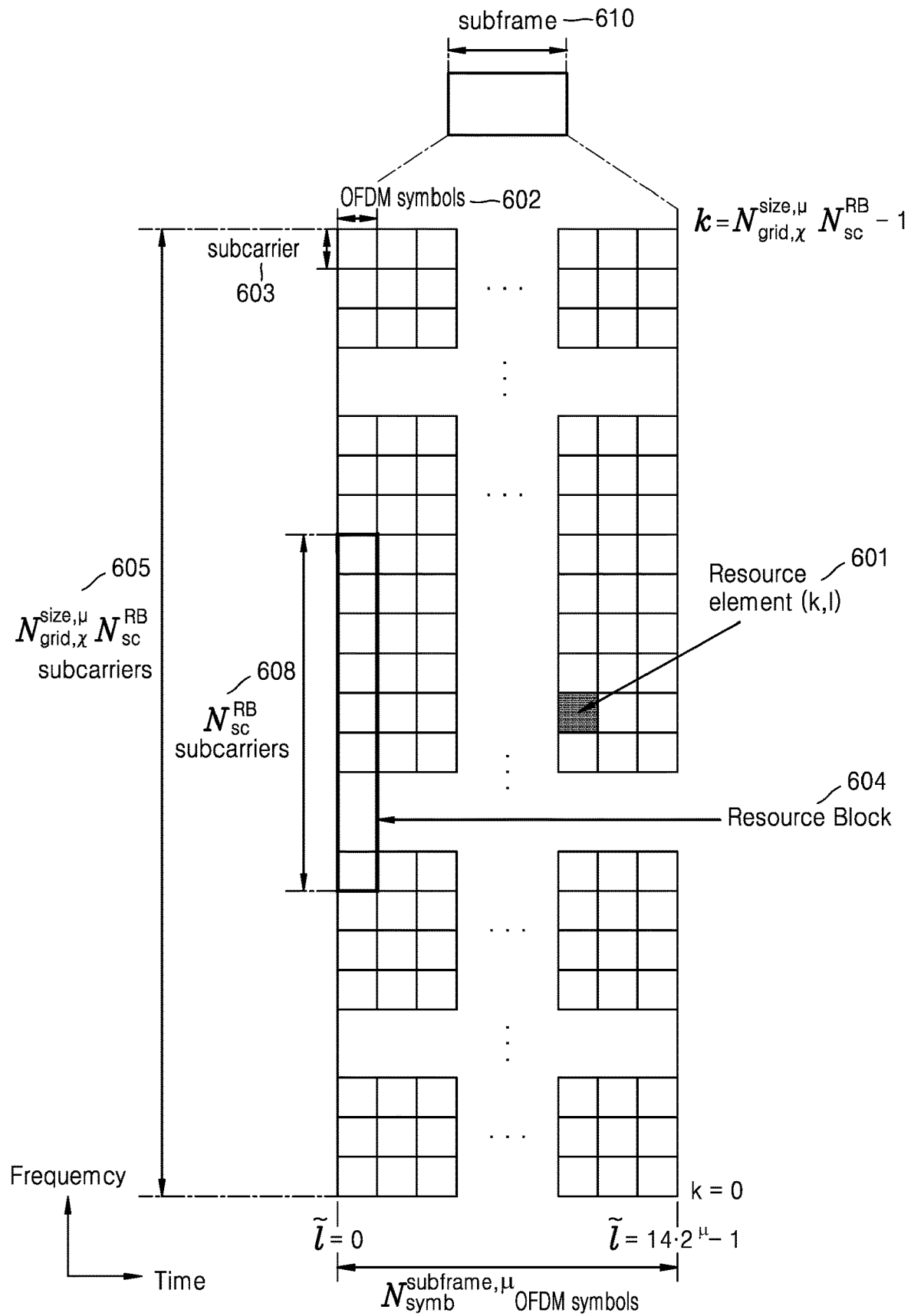
FIG. 6 illustrates a basic structure of a time-frequency domain of the 5G communication system, according to an embodiment.

FIG. 6 illustrates a basic structure of a time-frequency domain of the 5G communication system, according to an embodiment. That is, FIG. 6 is a diagram illustrating a basic structure of a time-frequency domain that is a radio resource region over which data or a control channel is transmitted in the 5G communication system.

In FIG. 6, the horizontal axis represents a time domain and the vertical axis represents a frequency domain. A basic unit of a resource in the time-frequency domain is a resource element (RE) 601 and may be defined as 1 OFDM symbol 602 in the time domain and 1 subcarrier 603 in the frequency domain. In the frequency domain, $N_{sc}^{RB}$ (e.g., 12) consecutive REs may constitute one resource block (RB) 604.

With respect to each subcarrier spacing configuration value μ and each carrier, one resource grid consisting of $N_{grid,x}^{size,\mu} N_{sc}^{RB}$ subcarrier spacings and $N_{symb}^{subframe,\mu}$ OFDM symbols may be defined to start from a common RB (CRB) $N_{grid,x}^{start,\mu}$ indicated by higher layer signaling, and one resource grid may be present for a given antenna port, subcarrier spacing configuration μ, and transmission direction (e.g., a DL, a UL, or an SL).

The BS may transmit carrier bandwidth $N_{grid,x}^{size,\mu}$ and start location $N_{grid,x}^{start,\mu}$ of subcarrier spacing configuration μ, with respect to a UL and a DL to the UE by higher layer signaling (e.g., higher layer parameters "carrierBandwidth"

and "offsetToCarrier"). The carrier bandwidth $N_{grid,x}^{size,\mu}$ may be configured for subcarrier spacing configuration μ by the higher layer parameter "carrierBandwidth", and the start location $N_{grid,x}^{start,\mu}$ may be, for Point A, a frequency offset of subcarrier having a lowest frequency among available resources of the carrier, may be configured as "offsetToCarrier", and may be expressed as the number of RBs. $N_{grid,x}^{size,\mu}$ and $N_{grid,x}^{start,\mu}$ may be subcarrier unit values. Upon reception of the parameters, the UE may identify a start location and size of a carrier bandwidth, according to $N_{grid,x}^{size,\mu}$ and $N_{grid,x}^{start,\mu}$. An example of higher layer signaling information that carries $N_{grid,x}^{size,\mu}$ and $N_{grid,x}^{start,\mu}$ is shown below in Table 2 (higher layer signaling information element SCS-SpecificCarrier).

TABLE 2

```
SCS-SpecificCarrier ::= SEQUENCE {
    offsetToCarrier              INTEGER (0..2199),
    subcarrierSpacing            ,
    carrierBandwidth             INTEGER (1..maxNrofPhysicalResourceBlocks),
    ...,
    [[
    txDirectCurrentLocation INTEGER (0..4095)    OPTIONAL -- Need S
    ]]
}
```

Here, Point A refers to a value that provides a common reference point with respect to a resource block grid. For a PCell DL, the UE may obtain Point A from "offsetToPointA" that is a higher layer parameter, and for all other cases, the UE may obtain Point A from an absolute radio frequency channel number (ARFCN) configured by "absoluteFrequencyPointA" that is a higher layer parameter. "offsetToPointA" indicates a frequency offset between Point A and a lowest subcarrier of a lowest RB having a lowest frequency among RBs that overlap with a synchronization signal/physical broadcast channel (SS/PBCH) selected or used by the UE in an initial cell selection procedure by the UE, and is expressed in an RB unit.

A number or index of a CRB is increased by 1 from 0 in a direction where a value of a frequency domain is increased. With respect to subcarrier spacing configuration μ, a center of a subcarrier index 0 of a CRB matches Point A. A frequency domain CRB index $n_{CRB}^{\mu}$ and an RE of subcarrier spacing configuration pi have a relation of $n_{CRB}^{\mu}=\lfloor k/N_{sc}^{RB} \rfloor$. "k" is a value relatively defined with respect to Point A. That is, k=0 is Point A.

A physical resource block (PRB) of subcarrier spacing configuration is defined as numbers or indices from 0 up to $N_{BWP,i}^{size,\mu}-1$ in a BWP. i refers to a number or index of a BWP. A relation between PRB ($n_{PrB}^{\mu}$)) and CRB ($n_{CRB}^{\mu}$)) in a BWP i may be equal to $n_{CRB}^{\mu}=n_{PRB}^{\mu}+N_{BWP,i}^{start,\mu}$. $N_{BWP,i}^{start,\mu}$ refers to the number of CRBs from CRB 0 up to a first RB in which the BWP i starts.

BWP configuration in the 5G communication system will now be described in detail with reference to FIG. 7.

Figure 7:
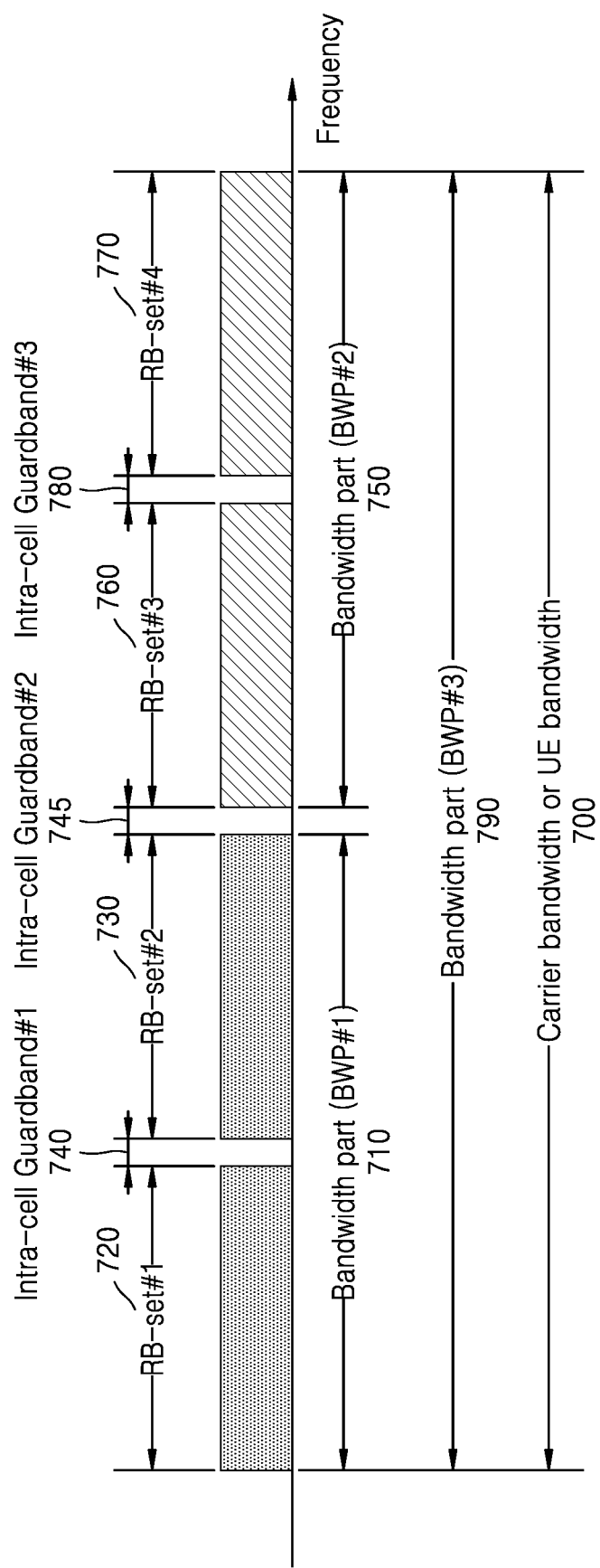
FIG. 7 illustrates an example of a configuration of a bandwidth part (BWP) and an intra-cell guard-band in the 5G communication system, according to an embodiment.

FIG. 7 illustrates an example of a configuration of a BWP and an intra-cell guard-band in the 5G communication system, according to an embodiment.

Referring to FIG. 7, a plurality of BWPs, i.e., BWP#1 710, BWP#2 750, and BWP#3 143 790, may be configured in a carrier bandwidth or UE bandwidth 700. BWP#3 790 occupies the entirety of the UE bandwidth 700. BWP#1 710 and BWP#2 750 may respectively occupy the lower half and the upper half of the UE bandwidth 700.

The BS may configure the UE with one BWP or a plurality of BWPs in a UL or a DL, and one or more higher layer parameters below may be configured for each BWP. A configuration with respect to a BWP may be independent in a UL and a DL. Table 3, below, shows an example of higher layer signaling information element IMP with respect to each BWP.

TABLE 3

```
BWP ::=                      SEQUENCE {
    bwp-Id                       BWP-Id,
    locationAndBandwidth         INTEGER (1..65536),
    subcarrierSpacing            ENUMERATED {n0, n1, n2, n3, n4, n5},
    cyclicPrefix                 ENUMERATED { extended }
}
```

Here, "bwp-Id" indicates an identifier of a BWP, "locationAndBandwidth" indicates a frequency domain location and bandwidth of the BWP, "subcarrierSpacing" indicates a subcarrier spacing used in the BWP, and "cyclicPrefix" indicates whether an extended CP is to be used or a normal CP is to be used in the BWP.

In addition to the parameters above, various parameters related to a BWP may be configured for the UE. The parameters may be transmitted from the BS to the UE by higher layer signaling, e.g., RRC signaling. In a given time, at least one BWP from among the configured one BWP or plurality of BWPs may be activated. An activation indication with respect to a configured BWP may be semi-statically provided from the BS to the UE by RRC signaling or may be dynamically provided via DCI used to schedule a PDSCH or a PUSCH.

Before RR connection, the UE may receive configuration with respect to an initial BWP for initial connection from the BS via an MIB. In more detail, the UE may receive, via an MIB in an initial access stage, configuration information with respect to a CORESET and a search space in which a PDCCH may be transmitted. Here, the CORESET and the search space configured via the MIB may each be regarded as 0 for identity (ID). The BS may notify, via the MIB, the UE of configuration information such as frequency allocation information, time allocation information, numerology, and the like about CORESET#0. The numerology may include at least one of a subcarrier spacing or CP. CP may indicate at least one of a length of a CP or information (e.g., normal or extended) corresponding to the length of the CP.

Also, the BS may notify, via the MIB, the UE of a monitoring period about CORESET#0 and configuration information about an occasion, i.e., configuration information about search space#0. The UE may regard a frequency domain configured as CORESET#0 and obtained from the MIB as an initial BWP for the initial access. An ID of the initial BWP may be regarded as 0.

Configuration with respect to a BWP which is supported by the 5G communication system may be used for various purposes.

When a bandwidth supported by the UE is smaller than a system bandwidth, data transmission or reception by the UE, with respect to the system bandwidth may be supported via BWP configuration. The BS may configure a frequency domain location of a BWP for the UE so as to allow the UE to transmit or receive data in a particular frequency location in the system bandwidth.

In order to support different numerologies, the BS may configure the UE with a plurality of BWPs. In order to support all data transmission and reception using a subcarrier spacing of 15 kHz and a subcarrier spacing of 30 kHz, the BS may configure two BWPs as the subcarrier spacing of 15 kHz and the subcarrier spacing of 30 kHz for a certain UE. Different BWPs may be frequency division multiplexed, and when to transmit or receive data in a particular subcarrier spacing, a BWP configured with the subcarrier spacing may be activated.

In order to reduce power consumption of the UE, the BS may configure the UE with BWPs having bandwidths of different sizes. When the UE supports a very large bandwidth, e.g., a bandwidth of 100 MHz, and always transmits or receives data in the bandwidth, very large power consumption may occur. In particular, in a zero-traffic circumstance, unnecessary monitoring on a DL control channel in the large bandwidth of 100 MHz may be very inefficient in terms of power consumption. In order to reduce power consumption of the UE, the BS may configure the UE with a BWP of a relatively small bandwidth, e.g., a BWP of 20 MHz. In the zero-traffic circumstance, the UE may perform a monitoring operation in the BWP of 20 MHz, and may transmit or receive data in a BWP of 100 MHz, in response to an instruction by the BS.

As described above, UEs before RRC connection may receive configuration information about an initial BWP via an MIB in an initial access stage. In more detail, the UE may be configured with a CORESET for a PDCCH from an MIB of a PBCH. A bandwidth of the CORESET configured by the MIB may be regarded as an initial DL BWP, and the UE may receive, via the configured initial DL BWP, a PDSCH in which SIB is transmitted.

In more detail, the UE may detect a CORESET in an initial BWP and a PDCCH on a search space, which is configured via an MIB, may receive remaining system information (RMSI) or SIB1, which is necessary for an initial access, via a PDSCH scheduled by the PDCCH, and may obtain configuration information about a UL initial BWP via the SIB1 (or the RMSI). The initial BWP may be used for other system information (OSI), paging, and a random access, as well as reception of the SIB.

When one or more BWPs are configured for the UE, the BS may indicate, to the UE, BWP switching, by using a BWP indicator field in DCI.

When a currently-activated BWP for the UE is BWP#1 710 in FIG. 7, the BS may indicate BWP#2 750 to the UE, by using a BWP indicator in DCI, and the UE may perform BWP switching to the indicated BWP#2 750, based on the BWP indicator in the received DCI.

As described above, DCI-based BWP switching may be indicated by DCI for scheduling a PDSCH or a PUSCH, and thus, when the UE receives a BWP switching request, the UE has to receive or transmit, in a switched BWP, the PDSCH or the PUSCH scheduled by the DCI, without a problem. To do so, requirements for a delay time ($T_{BWP}$) requested in BWP switching may be defined as in Table 4 below.

TABLE 4

| | | BWP switch delay $T_{BWP}$ (slots) | |
|---|---|---|---|
| μ | NR Slot length (ms) | Type 1$^{Note\ 1}$ | Type 2$^{Note\ 1}$ |
| 0 | 1 | 1 | 3 |
| 1 | 0.5 | 2 | 5 |
| 2 | 0.25 | 3 | 9 |
| 3 | 0.125 | 6 | 17 |

Note 1:
Depends on UE capability.

Note 2:
If the BWP switch involves changing of SCS, the BWP switch delay is determined by the larger one between the SCS before BWP switch and the SCS after BWP switch.

The requirements for a BWP switching delay time support Type 1 or Type 2, according to UE capabilities. The UE may report, to the BS, its supportable BWP switching delay time type.

According to the requirements for the BWP switching delay time, when the UE receives DCI including a BWP switching indicator in a slot n, the UE may complete switching to a new BWP, which is indicated by the BWP switching indicator, in a time point not later than a slot n+$T_{BWP}$, and may perform transmission and reception on a data channel scheduled by the DCA in the new BWP. When the BS attempts to schedule a data channel on the new BWP, the BS may determine time domain resource allocation for the data channel, in consideration of the I 3WP switching delay time ($T_{BWP}$). That is, when the BS schedules the data channel on the new BWP, the BS may schedule the data channel after the BWP switching delay time when performing a method of determining time domain resource allocation for the data channel. Accordingly, the UE may not expect that DCI indicating BWP switching indicates a slot offset K0 or K2 being smaller than the BWP switching delay time ($T_{BWP}$).

If the uE receives DCI (e.g., DCI format 1_1 or 0_1) indicating BWP switching, the UE may not perform transmission or reception in a time duration starting from a third symbol of a slot in which a PDCCH including the DCI is received up to a start symbol of a slot indicated via a slot offset K0 or K2 indicated via a time domain resource allocation field in the DCI. When the UE receives DCI indicating BWP switching in a slot n, and a slot offset indicated via the DCI is K, the UE may not perform transmission or reception in a duration starting from a third symbol of the slot n up to a symbol before a slot n+K (i.e., a last symbol of a slot n+K−1).

A UE may be configured with an intra-cell guard-band with respect to one or more cells (or carriers). An intra-cell guard-band configuration may be for each of a DL guard-band and a UL guard-band. FIG. 7 illustrates an example in which a carrier bandwidth or UE bandwidth 700 is configured with a plurality of intra-cell guard-bands, i.e., intra-cell guard-band#1 740, intra-cell guard-band#2 745, and intra-cell guard-band#3 780. In more detail, the UE may be configured with each of $N_{RB-set,x}$−1 UL/DL intra-cell guard-bands in a cell or carrier by "IntraCellGuardBand-r16" as higher layer signaling being configurable as below. Here, x=DL or UL. Table 5 shows an example of higher layer signaling information element IntraCellGuardBand-r16 for configuring an intra-cell guard-band.

TABLE 5

```
IntraCellGuardBand-r16 ::= SEQUENCE (SIZE (1..ffsValue)) OF GuardBand-r16
GuardBand-r16    ::= SEQUENCE {
    startCRB-r16     INTEGER (0..ffsValue),
    nrofCRBs-r16     INTEGER (1..ffsValue)
}
```

Here, "startCRB" indicates a start CRB index ($GB_{s,x}^{start,\mu}$) of the intra-cell guard-band, and "nrofCRBs" indicates a length of the intra-cell guard-band which may be expressed as the number of CRBs (N) or the number of PRBs (N). "nrofCRBs" may be a value indicating a last CRB index ($GB_{s,x}^{end,\mu}$) of the intra-cell guard-band. In other words, the "GuardBand" may include one or more values (startCRB, nrofCRBs), and a first value of every two-values may indicate a lowest CRB index $GB_{s,x}^{start,\mu}$ of the intra-cell guard-band and a second value may indicate a highest CRB index $GB_{s,x}^{end,\mu}$ of the intra-cell guard-band. It may be determined that $GB_{s,x}^{end,\mu}=GB_{s,x}^{start,\mu}+N$. A case where the CRB index is expressed as a PRB index is also possible. The UE may determine the number ($N_{RB-set,x}-1$) of intra-cell guard-bands configured by the BS, by using the number of (startCRB, nrofCRBs) pairs included in "GuardBand" or a sequence length (e.g., sequence length/2) of "GuardBand". The UE may be configured with a case where there are no UL/DL intra-cell guard-bands in a cell or carrier or a case where a guard-band is 0, by "IntraCellGuardBand-r16". In a case where at least "startCRB-r16" has a negative value equal to −1 or has a value other than an integer value, the UE may determine, based on the configuration, that UL/DL intra-cell guard-bands do not exist in a cell or carrier.

After the UE is configured with an intra-cell guard-band as described above, the UE may identify a resource region except for the intra-cell guard-band in a carrier or configured BWP as a resource set (e.g., an RB-set) including $N_{RB-set}$ RBs, and may perform UL/DL transmission and reception by using a resource included in the resource set. A resource region of each resource set may be determined as shown below.

Start CRB index of a first resource set 0): $RB_{0,x}^{start,\mu}=N_{grid,x}^{start,\mu}$ Last CRB index of a last resource set (resource set index $N_{RB-set}$): $RB_{N_{RB-set},x}^{start,\mu}=N_{grid,x}^{start,\mu}+N_{grid,x}^{size,\mu}$ Start CRB index of a resource set other than the above resource set: $RB_{s+1,x}^{start,\mu}=GBhd\ s,x^{end,\mu}+1$ End CRB index of the resource set other than the above resource set: $RB_{s,x}^{end,\mu}=GB_{s,x}^{start,\mu}-1$ Here, s=0, 1, ..., $N_{RB-set,x}-1$, $N_{grid,x}^{start,\mu}$, and $N_{grid,x}^{size,\mu}$ indicate an available first RB and bandwidth of the carrier according to subcarrier spacing configuration μ and may be configured by higher layer signaling.

FIG. 7 illustrates an example in which the carrier bandwidth or UE bandwidth 700 is configured with 3 intra-cell guard-bands and 4 resource sets $N_{RB-set}=4$, i.e., resource set#1 720, resource set#2 730, resource set#3 760, and resource set#4 770.

The UE may perform UL/DL transmission and reception by using a resource included in a resource set and an intra-cell guard-band. When a UL/DL transmission and reception resource configured or scheduled by the BS is allocated within two consecutive resource sets, the UE may perform UL/DL transmission and reception by using an intra-cell guard-band between two of the resource sets.

When the UE is not configured with an intra-cell guard-band by "intraCellGuardBandx" (where, x=DL or UT) as higher layer signaling, the UE may determine an intra-cell guard-band and a resource set resource region by using an intra-cell guard-band predefined with the BS. Here, the intra-cell guard-band may be predefined according to a size of a subcarrier spacing and a carrier or a size of a BWP. Also, an intra-cell guard-band may be independently predefined for each of a DL and a UL, and intra-cell guard-bands of a DL and a UL may be equal. Here, the fact that an intra-cell guard-band is predefined may mean that, for each intra-cell guard-band, a start CRB index $GB_{s,x}^{start,\mu}$ of each intra-cell guard-band, a last CRB index $GB_{s,x}^{end,\mu}$ of each intra-cell guard-band, a lowest CRB index $GB_{s,x}^{start,\mu}$ of each intra-cell guard-band, or a highest CRB index $GB_{s,x}^{end,\mu}$ of each intra-cell guard-band is predefined.

An example in which the UE is configured with at least one guard-band from among UL/DL guard-bands in a particular cell or carrier is provided. In a case of a cell that performs communication via an unlicensed band, the BS may configure one or more guard-bands in a bandwidth or BWP according to a channel size or the like of the unlicensed band. For example, an unlicensed band of 5 GHz band may consist of a plurality of 20 MHz-size channels, and a guard-band may exist between two of the channels. Therefore, in a case where the BS and the UE attempt to perform communication in a bandwidth or a BWP larger than 20 MHz, one or more guard-bands may be configured in the bandwidth or the BWP.

When the BS and the UE perform communication in an unlicensed band of which channel size is 20 MHz, if a size of at least one BWP from among BWPs 710, 750, and 790 configured by the BS for the UE is larger than 20 MHz, the UE may be configured with one or more intra-cell guard-bands, and may be configured such that each BWP is configured with a plurality of resource sets having a size of 20 MHz, according to the configuration of the intra-cell guard-bands. With respect to BWP#1 710 of FIG. 7, the UE may be configured with two of resource set#1 720 and resource set#2 730 and one intra-cell guard-band#1 740. The BS and the UE may perform a channel access procedure or listen-before-talk (LBT) on each resource set, and may perform UL/DL transmission and reception by using a resource set for which a channel access is successful.

In FIG. 7, the channel access procedure is successful in two consecutive resource sets (e.g., resource set#1 720 and resource set#2 730), a resource in the intra-cell guard-band#1 740 between the two resource sets may also be used in UL/DL transmission and reception. If the channel access procedure fails in at least one resource set from among two consecutive resource sets (e.g., resource set#1 720 and resource set#2 730), the resource in the intra-cell guard-band#1 740 between the two resource sets cannot be used in UL/DL transmission and reception.

An SS/PBCH block in the 5G communication system will now be described.

"SS/PBCH" block may refer to a physical layer channel block consisting of a primary SS (PSS), a secondary SS (SSS), and a PBCH. Details are as below.

PSS: A signal that is a reference of DL time/frequency synchronization providing some information of cell ID.

SSS: A signal that is a reference of DL time/frequency synchronization providing other information of cell ID which is not provided by the PSS. In addition, the SSS may function as a reference signal (RS) for demodulation of a PBCH.

PBCH: It provides essential system information requested by a UE to transmit or receive a data channel and a control channel. The essential system information may include search space-related control information indicating radio resource mapping information of a control channel, scheduling control information about a separate data channel to transmit system information, and the like.

SS/PBCH block: The SS/PBCH block consists of a combination of the PSS, the SSS, and the PBCH. One or more of the SS/PBCH blocks may be transmitted in a time of 5 ms, and each of the SS/PBCH blocks being transmitted may be identified by an index.

The UE may detect the PSS and the SSS in the initial access stage, and may decode the PBCH. The UE may obtain an MIB from the PBCH and may be configured with, from the PBCH, a CORESET#0 (which may correspond to a CORESET of which CORESET index is 0). The UE may assume that a selected SS/PBCH block (or an SS/PBCH block in which the PBCH is successfully decoded) and a DMRS being transmitted from the CORESET#0 are QCL, and may perform monitoring on the CORESET#0. The UE may obtain system information from DCI transmitted in the CORESET#0. The UE may obtain, from the system information, random access channel (RACH)-related configuration information required for an initial access. The UE may transmit a physical RACH (PRACH) to a BS, in consideration of a selected SS/PBCH block index, and upon reception of the PRACH, the BS may obtain the SS/PBCH block index selected by the UE. The BS may identify which block from among SS/PBCH blocks is selected by the UE and the UE monitors the CORESET#0 associated with the selected block.

In the 5G system, scheduling information about UL data (or PUSCH) or DL data (or PDSCH) is transmitted from the BS to the UE via DCI. The UE may attempt to monitor or detect, with respect to the PUSCH or the PDSCH, a DCI format for fallback and a DCI format for non-fallback. The DCI format for fallback may be configured as fields predefined between the BS and the UE, and the DCI format for non-fallback may include configurable fields.

The DCI may be channel-coded and modulated and then may be transmitted via a PDCCH that is a physical DL control channel. A CRC may be added to a payload of the DCI, and the CRC may be scrambled by a RNTI corresponding to an identity of the UE. According to an Objective of the DCI, e.g., transmission of UE-specific data, a power control command, a random access response, or different RNTIs may be used. That is, the RNTI may not be explicitly transmitted but may be included in a CRC calculation process and transmitted. Upon reception of the DCI being transmitted on the PDCCH, the UE may check the CRC by using the allocated RNTI, and as a result of the checking, when the CRC is correct, the UE may identify that the DCI is transmitted to the UE.

DCI for scheduling PDSCH about system information (SI) may be scrambled by a SI-RNTI. DCI for scheduling PDSCH about a random access response (RAR) may be scrambled by an RA-RNTI. DCI for scheduling PDSCH about a paging message may be scrambled by a P-RNTI. DCI for notifying a slot format indicator (SFI) may be scrambled by an SFI-RNTI. DCI for notifying transmit power control (TPC) may be scrambled by a TPC-RNTI. DCI for scheduling a UE-specific PDSCH or PUSCH may be scrambled by a cell RNTI (C-RNTI).

A DCI format 0_0 may be used as fallback DCI for scheduling the PUSCH, and in this regard, a CRC may be scrambled by at least one of C-RNTI, configured scheduling (CS)-RNTI, or modulation coding scheme (MCS)-C-RNTI. The DCI format 0_0 having the CRC being scrambled by at least one of C-RNTI, CS-RNTI, or MCS-C-RNTI may include at least one of a plurality of pieces of information below.

Identifier for DCI formats: Identifier for identifying DCI formats. When the UE receives DCI via a 1-bit identifier and a value of the identifier is 0, the UE may identify that the DCI is a UL DCI format (e.g., DCI format 0_1), and the value is 1, the UE may identify that the DCI is a DL DCI format (e.g., DCI format 1_0).

Frequency domain resource assignment: It includes $\lceil \log_2(N_{RB}^{UL,BWP}(N_{RB}^{UL,BWP}+1)/2) \rceil$ bits indicating RBs that are a frequency domain resource assigned according to resource assignment type 1. When the UE monitors a DCI format 0_0 in a common search space, $N_{RB}^{UL,BWP}$ indicates a size of an initial UL BWP, and when the UE monitors a DCI format 0_0 in a UE-specific search space, $N_{RB}^{UL,BWP}$ indicates a size of a UL BWP that is currently activated. In other words, according to a search space in which a Del format for fallback is transmitted, a BWP for determining a size of a frequency domain resource assignment field may vary.

When PUSCH hopping is performed, $N_{UL\_hop}$ most significant bits (MSBs) from among $\lceil \log_2(N_{RB}^{UL,BWP}(N_{RB}^{UL,BWP}+1)/2) \rceil$ bits may be used to indicate a frequency offset. When $N_{UL\_hop}=1$, it indicates that two offsets are configured by higher layer signaling, and when $N_{UL\_hop}=2$, it indicates that four offsets are configured by higher layer signaling, and $\lceil \log_2(N_{RB}^{UL,BWP}(N_{RB}^{UL,BWP}+1)/2) \rceil - N_{UL\_hops}$ bits indicate a frequency domain resource region assigned according to resource assignment type 1.

When PUSCH hopping is not performed, $\lceil \log_2(N_{RB}^{UL,BWP}(N_{RB}^{UL,BWP}+1)/2) \rceil$ bits indicate a frequency domain resource region assigned according to resource assignment type 1.

Time domain resource assignment: 4 bits indicate row indices of a time domain resource assignment table including a mapping type, a PUSCH transmission slot offset, a PUSCH start symbol, and the number of PUSCH transmission symbols. The time domain resource assignment table may be configured by higher layer signaling or may be preconfigured between the BS and the UE.

Frequency hopping flay: 1 bit indicates that PUSCH hopping is to be performed (enabled) or PUSCH hopping is not to be performed (disabled).

Modulation and coding scheme (MCS): MCS indicates a modulation scheme and a coding rate used in transmission of data.

New data indicator (NID): The NDI indicates whether it is HARQ initial transmission or retransmission.

Redundancy version: This indicates a redundancy version of HARQ.

HARQ process number: This indicate a process number of HARQ.

TPC command: This indicates a transmit power control command for a scheduled PUSCH.

Padding bit: This is a field to make a size (the number of all bits) equal to a different DCI format (e.g., DCI format and is inserted as 0, when required.

UL/SUL indicator: This is a 1 bit indicator, and if a cell has two or more ULs and a size of DCI format 1_0 before a padding bit is added thereto is greater than a size of DCI format 0_0 before a padding bit is added thereto, the UL/SUL indicator of 1 bit exists, and otherwise, the UL/SUL indicator does not exist or is a 0 bit. If the UL/SUL indicator exists, the UL/SUL indicator is positioned at a last bit of Del format 0_0 to which padding bit is added.

ChannelAccess-CPext: 2 bits indicate a channel access type and CP extension in a cell operating in an unlicensed band. The ChannelAccess-CPext does not exist or is a 0 bit in a cell operating in a licensed band.

DCI formats other than DCI format 0_0 are referred to in the 3GPP specificationn document.

Time domain resource allocation for a data channel in the 5G communication system will now be described.

A BS may configure a UE with a time domain resource allocation table for a DL data channel (PDSCH) and a UL data channel (PUSCH) by higher layer signaling (e.g., RRC signaling), or may use a time domain resource allocation table, as shown below in Table 6, predefined between the BS and the UE.

In a case of fallback DCI, the UE may use predefined table, as provided below Table 6, and in a case of non-fallback DCI, the UE may use table configured by higher layer signaling.

TABLE 6

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

For time domain resource allocation configured by higher layer signaling, a table consisting of a maximum of maxN-rofDL-Allocations=16 entries may be configured for a PDSCH, and a table consisting of a maximum of maxN-rofUL-Allocations=1.6 entries may be configured for a PUSCH. Each table may include, for example, PDCCH-to-PDSCH slot timing (which may be slot unit information indicating a time interval between a slot in which DCI for scheduling a PDSCH is received and a slot in which the LIE receives the PDSCH, or symbol unit information indicating a time interval between a last reception symbol of a PDCCH including the DCI and a first symbol of the scheduled PDSCH, and which may be expressed as K0) or PDCCH-to-PUSCH slot timing (which may be slot unit information indicating a time interval between a slot in which DCI for scheduling a PUSCH is received and a slot in which the UE transmits the PUSCH, or symbol unit information indicating a time interval between a last reception symbol of a PDCCH including the DCI and a first symbol on which the PUSCH is transmitted, and which may be expressed as K2), a location (S) and a length (L) of a start symbol on which a PDSCH or a PUSCH is scheduled in a slot, a mapping type of a or a PUSCH, etc.

If the UE detects or receives DCI for scheduling a PDSCH in a slot n, the UE may transmit a response signal or a reception result with respect to the PDSCH, i.e., HARQ-ACK, to the BS using a PUCCH of a slot n+k. Here, k is a value (expressed as K1) corresponding to the number of slots indicated by a PDSCH-to-HARQ feedback timing indicator field in the DCI. In this regard, k may be symbol unit information as a time interval between a last reception symbol of a PDCCH for transmitting the DCA to schedule a PDSCH and a first symbol of the for transmitting the response signal.

When higher layer signaling is used, information elements, such as PDSCH-TimeDomainResourceAllocation-List information element and PUSCH-TimeDomainResourceAllocation information element of Table 7 and Table 8, below, may be notified from the BS to the UE.

TABLE 7

PDSCH-TimeDomainResourceAllocation ::= SEQUENCE {
   k0                           INTEGER(0..32) OPTIONAL, -- Need S
   mappingType       ENUMERATED {typeA, typeB},
   startSymbolAndLength   INTEGER (0..127)
}

TABLE 8

PUSCH-TimeDomainResourceAllocation ::= SEQUENCE {
   k2                           INTEGER(0..32) OPTIONAL, -- Need S
   mappingType       ENUMERATED {typeA, typeB},
   startSymbolAndLength   INTEGER (0..127)
}

Here, "k0" indicates PDCCH-to-PDSCH timing as an offset of a slot unit, "k2" indicates PDCCH-to-PUSCH timing as an offset of a slot unit, "mappingType" indicates a mapping type of a PDSCH or a PUSCH, and "startSymbolAndLength" indicates a start symbol and length of a PDSCH or a PUSCH.

The BS may notify the UE of one of the entries of a time domain resource allocation table by L1 signaling, For example, the BS may indicate a time domain resource allocation field in DCI. The UE may obtain time domain resource allocation for a PDSCH or a PUSCH, based on the field in the DCI received from the BS.

Frequency domain resource allocation for a data channel in the 5G communication system will now be described.

As a method of indicating frequency domain resource allocation for a DL data channel (PDSCH) and a UL data channel (PUSCH), two types, i.e., resource allocation type 0 and resource allocation type 1, are supported.

Resource allocation type 0 refers to a method of allocating a resource in a unit of an RBG consisting of P consecutive RBs, and may be notified from the BS to the UE in the form of a bitmap. The RBCS may be configured as a set of consecutive VRBs, and a size P of the RBG (a nominal RBG size P) may be determined based on a value configured as rbg-Size that is a higher layer parameter and a value of a size of a BWP defined in Table 9 below.

TABLE 9

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

Here, a total number of RBGs ($N_{RBG}$) of a BWP i of which size is $N_{BWP,i}^{size}$ is $N_{RBG} = \lceil (N_{BWP,i}^{size} + (N_{BWP,i}^{start} \bmod P))/P \rceil$. A size of a first RBG is $RBG_0^{size} = P - N_{BWP,i}^{start} \bmod P$. When a size $RBG_{last}^{size}$ of a last RBG is $(N_{BWP,i}^{start} + N_{BWP,i}^{size}) \bmod P > 0$, $RBG_{last}^{size} = (N_{BWP,i}^{start} + N_{BWP,i}^{size}) \bmod P$, and otherwise, $RBG_{last}^{size}$ is P. A size of a RBG other than the above case is P. Bits of a bitmap having a size of $N_{RHG}$ bits may respectively correspond to RBGs, The RBGs may be allocated indices in order from a lowest frequency location of a BWP to a higher frequency. With respect to $N_{RBG}$ RBGs in a BWP, RBG#0 through RBG#($N_{RBG}-1$) may be sequentially mapped from an MSB to a least significant bit (LSB) in the bitmap of an RBG. When a particular bit value in the bitmap is 1, the UE may determine that an RBG corresponding to the bit value is allocated, and when a particular bit value in the bitmap is 0, the UE may determine that an RBG corresponding to the bit value is not allocated.

Resource allocation type 1 refers to a method of allocating a resource via a start location and length of VRBs being sequentially allocated, and interleaving or non-interleaving may be additionally applied to the sequentially-allocated VRBs. A resource allocation field of resource allocation type 1 may be configured with a resource indication value (RIV), and the RIV may be configured with a VRB start point $RB_{start}$ and a length of a sequentially-allocated RB $L_{RBs}$. $RB_{start}$ may be a first PRB index where resource allocation starts, and $L_{RBs}$ may be a length or the number of allocated consecutive PRBs. In more detail, a RIV in a BWP having a size of $N_{BWP}^{size}$ may be defined according to Function 1, shown below.

$$\text{If } (L_{RBs} - 1) \le \left\lfloor \frac{N_{BWP}^{size}}{2} \right\rfloor \text{ then } RIV = N_{BWP}^{size}(L_{RBs} - 1) + RB_{start}$$

$$\text{Else, } RIV = N_{BWP}^{size}(N_{BWP}^{size} - L_{RBs} - 1) + (N_{BWP}^{size} - 1 - RB_{start})$$

$$\text{where, } L_{RBs} \ge 1 \text{ and shell not exeed } N_{BWP}^{size} - RB_{start}.$$

Function 1

Here, $N_{BWP}^{size}$ may vary according to search spaces in which fallback DCI format (e.g., DCI format 0_0 or DCI format 1_0) is transmitted. When DCI format 0_0 is a fallback DCI format from among DCI (i.e., a UL grant) for configuring or scheduling UL transmission is transmitted in a common search space (CSS), a size of an initial UL BWP, $N_{BWP,0}^{size}$ or $N_{BWP}^{initial}$ NBWP may be used as $N_{BWP}^{size}$. Similarly, when DCI format 1_0 is fallback DCI format from among DCI for configuring or scheduling DL reception is transmitted in a CSS, if a CORESET#0 is configured for a cell, $N_{BWP}^{size}$ and/or $N_{BWP}^{initial}$ may be a size of the CORESET#0, and if the CORESET#0 is not configured, $N_{BWP}^{size}$ and/or $N_{BWP}^{size}$ may be a size of an initial DL BWP.

When DCI format 0_0 or DCI format 1_0 is fallback DCI format that is transmitted in a UE-specific search space (USS), or when a size of the fallback DCI format being transmitted in a USS is determined based on a size of an initial UL BWP or a size of an initial DL BWP but the DCI is applied to a different active BWP having a size of $N_{BWP}^{active}$, a RIV corresponds to $RB_{start}=0, K, 2K, \ldots, (N_{BWP}^{initial}-1)K$ Ninitial, BWP, and $L_{RBs}=K, 2K, \ldots, N_{BWP}^{initial}K$, and is defined based on Function 2, shown below.

$$\text{If } (L'_{RBs}-1) \le \lfloor N_{BWP}^{initial}/2 \rfloor \text{ then } RIV = N_{BWP}^{initial}(L'_{RBs}-1)+RB'_{start}$$

$$\text{Else, } RIV = N_{BWP}^{initial}(N_{BWP}^{initial}-L'_{RBs}-1)+(N_{BWP}^{initial}-1-RB'_{start})$$

$$\text{where, } L'_{RBs}=L_{RBs}/K, RB'_{start}=RB_{start}/K, L'_{RBs} \text{ shall not exceed } N_{BWP}-RB'_{start}$$

Function 2

Here, when $N_{BWP}^{active} > N_{BWP}^{initial}$, K is a largest value satisfying $K \le \lfloor N_{BWP}^{active}/N_{BWP}^{initial} \rfloor$ in a set (1,2,4,8). Otherwise ($N_{BWP}^{active} \le N_{BWP}^{initial}$), K is 1.

The BS may configure the UE with a resource allocation type by higher layer signaling. The higher layer parameter resourceAllocation may be configured as one value of resourceAllocationType0 or resourceAllocationType1 or dynamicSwitch. If the UE is configured with both resource allocation types 0 and 1 or if higher layer parameter resourceAllocation is configured as dynamicSwitch, an MSB of a resource allocation field in a DCI format for indicating scheduling may indicate whether it is resource allocation type 0 or resource allocation type 1, and resource allocation information may be indicated by remaining bits except for the MSB of the resource allocation field, based on the indicated resource allocation type, and the UE may interpret the resource allocation information of the DCI, based on the indication. If the UE is configured with one of resource allocation type 0 or resource allocation type 1 or if higher layer parameter resourceAllocation is configured as one value of resourceAllocationType 0 or resourceAllocationType1, a resource allocation field in a DCI format for indicating scheduling may indicate resource allocation information, based on the configured resource allocation type, and the UE may interpret the resource allocation information of the DCI, based on the configured resource allocation type.

A DL control channel in the 5G communication system will now be described in detail.

Figure 8:
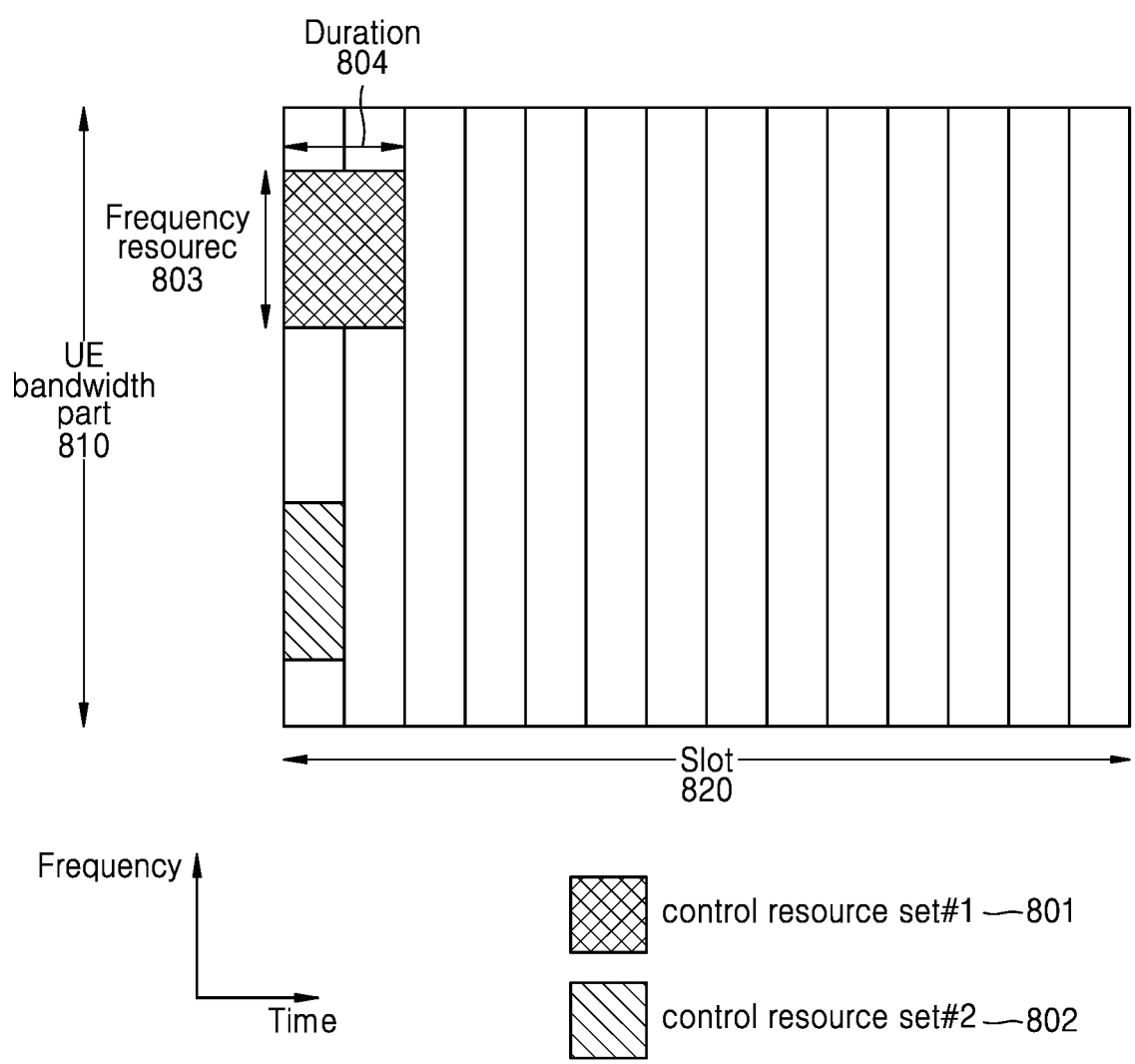
FIG. 8 illustrates an example of control resource set (CORESET) configuration of a DL control channel of the 5G communication system, according to an embodiment.

FIG. 8 is a diagram illustrating an example of CORESET configuration of a DL control channel of the 5G communication system, according to an embodiment of the disclosure. That is, FIG. 8 is a diagram illustrating an example of a CORESET in which a DL control channel is transmitted in the 5G communication system.

Referring to FIG. 8, a LIE BWP 810 is configured in a frequency domain, and two CORESETs, i.e., CORESET#1 801 and CORESET#2 802, are configured in 1 slot 820 in a time domain. The CORESETs 801 and 802 may be configured in a particular frequency resource 803 of a frequency domain within the UE BWP 810, and may be configured as one OFDM symbol or a plurality of OFDM symbols in a time domain. The OFDM symbols may be defined as a CORESET duration 804. Referring to the example, CORESET#1 801 is configured as a CORESET duration of two symbols, and CORESET#2 802 is configured as a CORSET duration of one symbol.

Each of the CORESETs may be configured by higher layer signaling, e.g., at least one of system information, an MIB, or RRC signaling, which is transmitted from the BS to the UE. Configuring a CORESET to the UE may mean providing information such as an identity of the CORESET, a frequency location of the CORESET, a symbol duration of the CORESET, and the like. For example, higher layer signaling information element or CORESET configuration information which is for configuring a CORESET may include a plurality of pieces of information of ControlResourceSet information element in Table 10 below.

TABLE 10

```
ControlResourceSet ::= SEQUENCE {
    controlResourceSetId                ControlResourceSetId,
    frequencyDomainResources            BIT STRING (SIZE (45)),
    duration                            INTEGER (1..maxCoReSetDuration),
    cce-REG-MappingType CHOICE {
        interleaved SEQUENCE {
            reg-BundleSize ENUMERATED {n2, n3, n6},
            interleaverSize ENUMERATED {n2, n3, n6},
            shiftIndex INTEGER(0..maxNrofPhysicalResourceBlocks-1) OPTIONAL -- Need S
        },
        nonInterleaved NULL
    },
    precoderGranularity ENUMERATED {sameAsREG-bundle, allContiguousRBs},
    tci-StatesPDCCH-ToAddList SEQUENCE(SIZE (1..maxNrofTCI-StatesPDCCH)) OF TCI-
StateId OPTIONAL, -- Cond NotSIB1-initialBWP
    tci-StatesPDCCH-ToReleaseList SEQUENCE(SIZE (1..maxNrofTCI-StatesPDCCH)) OF
TCI-StateId OPTIONAL, -- Cond NotSIB1-initialBWP
    tci-PresentInDCI ENUMERATED {enabled} OPTIONAL, -- Need S
    pdcch-DMRS-ScramblingID INTEGER (0..65535) OPTIONAL, -- Need S
}
```

Here, "controlResourceSetId" indicates a CORESET identity, "frequencyDomainResources" indicates a frequency domain resource, "duration" indicates a time duration of a CORESET, i.e., a time domain resource, "cce-REG-MappingType" indicates a CCE-to-REG mapping type, "reg-BundleSize" indicates a REG bundle size, "interleaverSize" indicates an interleaver size, and "shiftIndex" indicates an interleaver Shift.

Also, tci-StatesPDCCH indicates configuration information of transmission configuration indication (TCI) states, and may include one or more SS/PBCH block indices having a quasi-co-located (QCL) relation with a DMRS transmitted in the corresponding CORESET or a CSI reference signal (CSI-RS) index.

Figure 9:
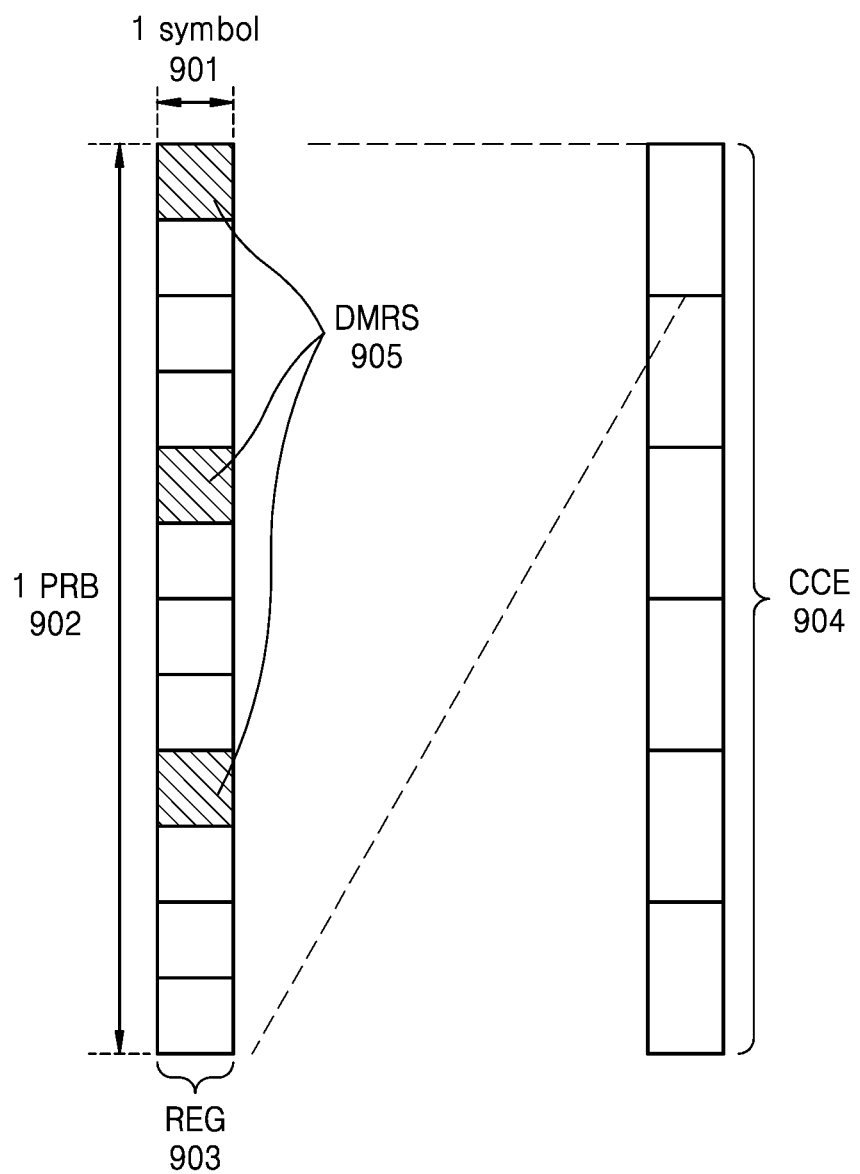
FIG. 9 illustrates a structure of a DL controlchannelof the 5G communication system, according to an embodiment.

FIG. 9 is a diagram illustrating a structure of a DL control channel of the 5G communication system, according to an embodiment of the disclosure. That is, FIG. 9 is a diagram illustrating an example of a basic unit of time and frequency resources constituting a DL control channel that is usable in the 5G communication system.

Referring to FIG. 9, the basic unit of time and frequency resources constituting the DL control channel may be referred to as an RE group (REG) 903, and the REG 903 may be defined as 1 OFDM symbol 901 in the time axis, and 1 PRB 902, that is, 12 subcarriers, in the frequency axis, A BS may configure a DL control channel allocation unit by concatenating at least one REG 903.

When the basic unit to which the DL control channel is allocated in the 5G is a control channel element (CCE) 904, one CCE 904 may consist of a plurality of REGs 903. When the REG 903 illustrated in FIG. 9 consists of 12 REs and 1 CCE 904 consists of 6 REGs 903, 1 CCE 904 may consist of 72 REs. A region where a CORESET is configured may include a plurality of CCEs 904, and a specific DL control channel may be mapped to one or more CCEs 904 according to an aggregation level (AL) in the CORESET. The CCEs 904 in the CORESET may be identified by numbers, and in this case, the numbers may be allocated to the CCEs 904 according to a logical mapping scheme.

The basic unit of the DL control channel, that is, the REG 903, may include both a region of REs to which DCI is mapped and a region to which a DMRS 905 used to demodulate the DCI is mapped. At least one DMRS 905 (three DMRSs in the illustrated example) may be transmitted in 1 REG 903. The number of CCEs required to transmit the DL control channel may be 1, 2, 4, 8, or 16 according to the AL, and a different number of CCEs may be used to implement link adaptation of the DL control channel. When AL=L, one DL control channel may be transmitted through L CCEs. A UE has to detect a signal without knowing existence about the DL control channel, and a search space indicating a set of CCEs may be defined for blind decoding. The search space refers to a set of control channel candidates including CCEs to which the UE has to attempt decoding on a given AL, and because there are various ALs that make 1, 2, 4, 8, and 16 CCEs into one bundle, the UE may have a plurality of search spaces. The search space set may be defined as a set of search spaces at all configured ALs.

A search space for a PDCCH may be classified into a CSS and a USS. A certain group of UEs or all of the UEs may monitor the CSS so as to receive cell-common control information such as a paging message or dynamic scheduling for system information. The UE may use a PDSCH for transmitting scheduling allocation information of an SIB, including cell operator information. The SIB may be detected by monitoring the CSS. The CSS may be defined as a set of predefined CCEs for a certain group of trEs or all of the UES that receive the PDCCH. The UE-specific PDSCH or PUSCH scheduling allocation information may be detected by monitoring the USS. The USS may be a function of the UE identity and various system parameters, and may be defined in a UE-specific manner.

In the 5G wireless communication system, a parameter for the search space with respect to the PDCCH may be configured from the BS to the UE by higher layer signaling (e.g., SIB, MIB, or RRC signaling). For example, the BS may configure the UE with the number of PDCCH candidates at each AL based on a monitoring period for the search space, a monitoring occasion of symbol units in the slot for the search space, a search space type (a CSS or USS), a combination of RNTI and DCI format to monitor in the search space, an index of a CORESET for which monitoring is to be performed in the search space, etc. A higher layer signaling information element for configuring parameters for the search space with respect to the PDCCH may include a search space information element ("SearchSpace") as shown in Table 11, below.

TABLE 11

```
SearchSpace ::=                              SEQUENCE {
    searchSpaceId                                SearchSpaceId,
    controlResourceSetId                         ControlResourceSetId OPTIONAL, -- Cond SetupOnly
    monitoringSlotPeriodicityAndOffset           CHOICE {
        sl1 NULL,
        sl2 INTEGER (0..1),
        ...
    }                                            OPTIONAL, -- Cond
Setup
    duration                                 INTEGER (2..2559) OPTIONAL, -- Need R
    monitoringSymbolsWithinSlot                  BIT STRING (SIZE (14)) OPTIONAL, -- Cond
Setup
    nrofCandidates                               SEQUENCE {
        aggregationLevel1                        ENUMERATED {n0, n1, n2, n3, n4, n5, n6, n8},
        aggregationLevel2                        ENUMERATED {n0, n1, n2, n3, n4, n5, n6, n8},
        aggregationLevel4                        ENUMERATED {n0, n1, n2, n3, n4, n5, n6, n8},
        aggregationLevel8                        ENUMERATED {n0, n1, n2, n3, n4, n5, n6, n8},
        aggregationLevel16                       ENUMERATED {n0, n1, n2, n3, n4, n5, n6, n8}
    }                                            OPTIONAL, -- Cond
Setup
    searchSpaceType                              CHOICE {
        common                                       SEQUENCE {
            dci-Format0-0-AndFormat1-0 SEQUENCE {
                ...
            },
            ue-Specific                              SEQUENCE {
                dci-Formats ENUMERATED {formats0-0-And-1-0, formats0-1-And-1-1},
                ...
            }
        } OPTIONAL -- Cond Setup2
}
```

Here, "searchSpaceId" indicates a search space identifier, "controlResourceSetId" indicates a CORESET identifier, "monitoringSlotPeriodicityAndOffset" indicates a monitoring slot level period, "duration" indicates a length of time duration to be monitored, "monitoringSymbolsWithinSlot" indicates symbols for monitoring a PDCCH in a slot, "nrofCandidates" indicates the number of PDCCH candidates for each AL, "searchSpaceType" indicates a search space type, "common" includes parameters for a CSS, and "ue-Specific" includes parameters for a USS.

Based on the configuration information, the BS may configure the UE with one or more search space sets. The BS may configure the UE with search space set 1 and search space set 2, may configure DCI format A scrambled by X-RNTI in the search space set 1 to be monitored in the CSS, and may configure DCI format B scrambled by Y-RNTI in the search space set 2 to be monitored in the USS.

One or more search space sets may exist in the CSS or the USS, For example, search space set#1 and search space set#2 may be configured for the CSS, and search space set#3 and search space set#4 may be configured for the USS.

A combination of the following DCI format and RNTI may be monitored in the CSS.

DCI format 0_0/1_0 with CRC scrambled by C-RNTI, CS-RNTI, SP-CSI-RNTI, RA-RNTI, TC-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI A combination of the following DCI format and RNTI may be monitored in the USS.

DCI format with CRC scrambled by C-RNTI, CS-RNTI, TC-RNTI

DCI format 0_0/1_0 with CRC scrambled by C-RNTI, CS-RNTI, TC-RNTI

The RNTIs specified above may follow the following definitions and uses:

cell-RNTI (C-RNTI) for UE-specific PDSCH scheduling;

temporary cell-RNTI (TC-RNTI) for UE-specific PDSCH scheduling; configured scheduling-RNTI (CS-RNTI) for semi-statically configured UE-specific PDSCH scheduling;

random access-RNTI (RA-RNTI;) for PDSCH scheduling in the random access phase;

paging-RNTI (P-RNTI) for PDSCH scheduling for transmitting paging;

system information-RNTI (SI-RNTI) for PDSCH scheduling for transmitting system information;

interruption-RNTI (INT-RNTI) for notifying whether PDSCH is punctured;

transmit power control-PUSCH-RNTI (TPC-PUSCH-RNTI) for indicating a power control command for PUSCH;

TPC-PUCCH-RNTI for indicating a power control command for a PUCCH; and

TPC-sounding reference signal-RNTI (TPC-SRS-RNTI) for indicating a power control command for a sounding reference signal (SRS).

The above-described DCI formats may be defined as in Table 12, below.

TABLE 12

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |

TABLE 12-continued

| DCI format | Usage |
| --- | --- |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G communication system such as NR, a physical channel and a physical signal may be distinguished as below. For example, UL/DL physical channels refer to a set of REs for delivering information transmitted via a higher layer, and representative examples thereof include a PDCCH, a PUCCH, a PDSCH, a PLUSCH and the like. UL/DL, physical signals refer to signals that do not deliver information transmitted via a higher layer and are used in a physical layer, and representative examples thereof include a DM-RS, a CSI-RS, a SRS, and the like.

A physical channel and a physical signal may be described as a signal without being distinguished. When it is described that the BS transmits a DL signal, it may mean that the BS transmits at least one of a DL physical channel and a physical signal which include PDCCH, PDSCH, DM-RS, CSI-RS, and the like. In other words, a signal in the disclosure refers to the term including both the channel and the signal, and when it is required to distinguish between them, they may be distinguished according to the context and cases.

In the 5G communication system, DL signal transmission duration and UL, signal transmission duration may be dynamically changed. To do so, a BS may indicate, to a UE information about whether each of OFDM symbols constituting one slot is a DL symbol, a UL symbol, or a flexible symbol by using a slot format indicator (SFI). Here, the flexible symbol may be neither of DL and UL symbols or may be a symbol that may become a DL symbol or a UL symbol, in response to UE-specific control information or scheduling information. The flexible symbol may include a gap guard necessary for a procedure of transitioning from DL to UL.

Upon reception of the SFI, the UE may perform an operation of receiving a DL signal from the BS on a symbol indicated as the DL symbol, and may perform an operation of transmitting a UL signal to the BS on a symbol indicated as the UL symbol. The UE may perform a PDCCH monitoring operation on a symbol indicated as the flexible symbol, and via a different indicator, e.g., via DCI, the UE may perform an operation of receiving a DL signal from the BS on the flexible symbol (e.g., when DCI format 1_0 or 1_1 is received), or may perform an operation of transmitting a UL signal to the BS on the flexible symbol (e.g., when DCI format 0_0 or 0_1 is received).

Figure 10:
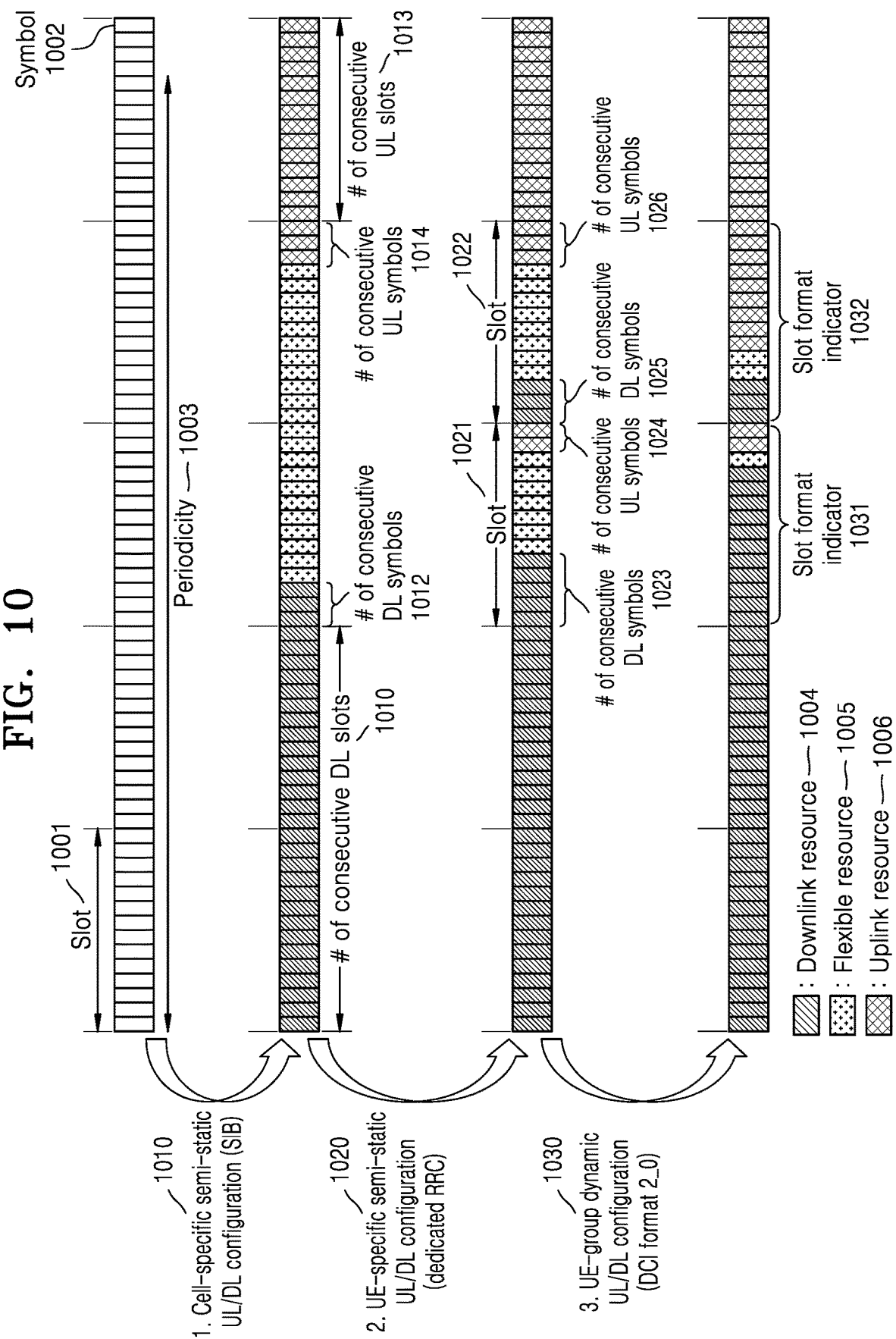
FIG. 10 illustrates an example of UL/DL configuration in the 5G system, according to an embodiment.

FIG. 10 is a diagram illustrating an example of UL/DL configuration in the 5G system, according to an embodiment. Three operations of UL/DL configuration of a symbol/slot are illustrated.

Referring to FIG. 10, in a first operation, UL/DL of a symbol/slot may be configured via cell-specific configuration information 1010 for semi-statically configuring UL/DL, e.g., system information such as SIB. In more detail, cell-specific UL/DL configuration information 1010 in the system information may include UL/DL pattern information and information for indicating a reference subcarrier spacing. The UL/DL pattern information may indicate transmission periodicity of each UL/DL pattern 1003, the number of consecutive full DL slots at the beginning of each UL/DL pattern 1003, the number of consecutive DL symbols in the beginning of the slot following the last full DL slot 1012, the number of consecutive full UL, slots at the end of each UL/DL pattern 1013, and the number of consecutive UL symbols in the end of the slot preceding the first full UL slot 1014. The UE may determine slot symbol which are not indicated for UL or DL, as flexible slot/symbol.

In a second operation, UE-specific configuration information 1020 may be delivered by UE-specific higher layer signaling (e.g., RRC signaling) indicating symbols to be configured for a DL or a UL in a slot 1021 or slot 1022 including a flexible slot. The UE-specific UL/DL configuration information 1020 may include a slot index indicating the slot 1021 or slot 1022 including a flexible slot, the number of consecutive DL symbols in the beginning of the slot 1023 or 1025, the number of consecutive UL symbols in the end of the slot 1024 or slot 1026, or information indicating a DL for all symbols in a slot or information indicating a UL for all symbols in a slot. A symbol or slot configured for a UL or a DL via the cell-specific configuration information 1010 of first operation cannot be changed to a DL or a UL by UE-specific higher layer signaling 1020.

Lastly, in order to dynamically change DL signal transmission duration and UL signal transmission duration, DCI of a DL control channel includes an SFI 1030 for indicating whether each symbol in each of slots is a DL symbol, a UL symbol or a flexible symbol. The slots start from a slot in which the HE detects the DCI. An SFI cannot indicate a DL or a UL for a symbol/slot configured for a UL or a DL in the first and second operations. A slot format of each slot 1031 or slot 1032 which includes at least one symbol not being configured for a UL or a DL in the first and second operations may be indicated by a DCI corresponding thereto.

An SFI may indicate a UL/DL configuration for 14 symbols in one slot, as shown in Table 13 below. An SFI may be simultaneously transmitted to a plurality of UEs via a UE-group (or cell) common control channel. In other words, a DCI including an SFI may be transmitted via a PDCCH that is CRC scrambled by an identifier, e.g., SFI-RNTI, which is different from UE-specific C-RNTI. DCI may include a SFI with respect to one or more slots, i.e., N slots. Here, a value of N may be an integer greater than 0 or may be a value configured from the BS to the UE by higher layer signaling from among a set of preconfigurable values such as 1, 2, 5, 10, 20, or more. A size of an SFI may be configured from the BS to the UE by higher layer signaling. Table 13, below, is a table where contents of an SFI are described.

TABLE 13

| format | Symbol number (or index) in one slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 9 | F | F | F | F | F | F | F | F | F | F | F | F | U | U |
| 19 | D | F | F | F | F | F | F | F | F | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines the slot format for the slot based on tdd-UL-DL-ConfigurationCommon, or tdd-UL-DL-ConfigurationDedicated and, if any, on detected DCI formats | | | | | | | | | | | | | |

In Table 13, D represents DL, U represents UL, and F represents a flexible symbolAccording to Table 13, a total number of slot formats available for one slot is 256. In the NR system, a maximum size of an information bit available for SFI indication is 128 bits, and the BS may configure the UE with the maximum size of the information bit by higher layer signaling, e.g., "dci-PayloadSize".

In this regard, a cell that operates in an unlicensed band may configure and indicate additional slot formats as in Table 14 by introducing one or more additional slot formats or modifying at least one of legacy slot formats. Table 14 shows an example of additional slot formats by which one slot is configured with only a UL symbol (U) and a flexible symbol (F).

TABLE 14

| Format | Symbol number (or index) in one slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 56 | F | U | U | U | U | U | U | U | U | U | U | U | U | U |
| 57 | F | F | U | U | U | U | U | U | U | U | U | U | U | U |
| 58 | U | U | U | U | U | U | U | U | U | U | U | U | U | F |
| 59 | U | U | U | U | U | U | U | U | U | U | U | U | F | F |
| ... | | | | | | | | | | | | | | |

DCI used for SFI indication may indicate slot format(s) with respect to a plurality of serving cells, and slot format(s) corresponding to each serving cell may be identified by a serving cell ID. Also, the DCI may indicate a slot format combination with respect to one or more slots for each serving cell. When a size of one SFI index field in DCI is 3 bits and indicates a slot format for one serving cell, the SFI index field of 3 bits may indicate one of a total of 8 slot formats (or slot format combinations), and the BS may indicate the SFI index field by UE-group common DCI.

At least one SFI index field included in DCI may be configured as an SFI indicator for a plurality of slots. Table 15 shows 3-bit SFI indicators configured with slot formats. {0, 1, 2, 3, 4} among values of SFI indicate a slot format for one slot. Other values of {5, 6, 7} indicate a slot format for 4 slots, and the UE may apply the indicated slot format sequentially to 4 slots starting from a slot in which DCI including the SFI indicator is detected.

TABLE 15

| Slot format combination ID | Slot Formats |
|---|---|
| 0 | 0 |
| 1 | 1 |
| 2 | 2 |
| 3 | 19 |
| 4 | 9 |
| 5 | 0 0 0 0 |
| 6 | 1 1 1 1 |
| 7 | 2 2 2 2 |

Unlicensed Band

For a system that performs communication in an unlicensed band, a communication apparatus (a BS or a UE) that attempts to transmit a signal in the unlicensed band may perform, before transmission of the signal, a channel access procedure, LBT or channel sensing on the unlicensed band in which the communication apparatus performs communication, and may access the unlicensed band and perform signal transmission when it is determined that the unlicensed band is in an idle state according to the channel access procedure. When it is determined that the unlicensed band is not in the idle state according to the channel access procedure performed, the communication apparatus may not perform signal transmission. Here, the channel access procedure is a procedure in which a BS or a UE measures a strength of a signal being received via a channel to be occupied for signal transmission in a deterministic time or a randomly-determined time, and compares the measured signal strength with a threshold $X_{Thresh}$ calculated using a function of which value is determined as one or more variables among a predefined threshold value, a channel bandwidth, a bandwidth on which a transmission-target signal is to be transmitted, and/or an intensity of a transmit power.

When a strength of a reception signal measured by sensing an unlicensed band channel is smaller than $X_{Thresh}$, the BS and the UE may determine that the channel is in an idle state or the channel is available (or can be occupied), and may occupy and use the channel. If a result of the sensing is equal to or greater than $X_{Thresh}$, the BS and the UE may determine that the channel is in a busy state or the channel is unavailable (or cannot be occupied), and thus, may not use the channel. Here, the BS and the UE may continuously perform sensing until it is determined that the channel is in an idle state. In other words, the channel access procedure in the unlicensed band may indicate a procedure for evaluating transmission performance availability of a channel, based on sensing. A basic unit of sensing is a sensing slot which may be a duration of $T_{sl}$=9 μs. When power detected at least from 4 μs in sensing slot duration is smaller than $X_{Thresh}$, the sensing slot duration may be regarded as being idle or not used. In the above case, if the power detected at least from 4 μs in the sensing slot duration is equal to or greater than $X_{Thresh}$, the sensing slot duration may be regarded as being busy or used by another apparatus.

The channel access procedure in the unlicensed band may be classified by whether a time to start the channel access procedure of the communication apparatus is fixed (frame-based equipment (FBE)) (or is semi-static), or is variable (load-based equipment (LBE)) (or is dynamic). In addition to the time to start the channel access procedure, according to whether a transmit/receive structure of the communication apparatus has a cycle or does not have a cycle, the communication apparatus may be determined to be the FBE or the LBE. In this case, the time to start the channel access procedure being fixed means that the channel access procedure of the communication apparatus may start periodically according to a pre-declared or pre-configured cycle. In addition, the time to start the channel access procedure being fixed may mean that the transmit/receive structure of the communication apparatus has a cycle. In this regard, the time to start the channel access procedure being variable means that the communication apparatus may transmit a signal in an unlicensed band at any time. Additionally, the time to start the channel access procedure being variable may mean that the transmit/receive structure of the communication apparatus may be determined when required without having a cycle. Hereinafter, in the disclosure, a channel access procedure or channel sensing may be interchangeably used, but a channel access procedure or a channel sensing operation by the BS or the UE may be the same or similar.

A DL transmission burst may be defined as follows. The DL transmission burst may indicate a seat of DL transmissions transmitted without a gap greater than 16 μs between DL transmissions by the BS. When the gap between DL transmissions is greater than 16 μs, the DL transmissions may indicate separate DL transmission bursts. Similarly, a UL transmission burst may be defined as below. The UL transmission burst may indicate a set of UL transmissions transmitted without a gap greater than 16 μs between UL transmissions by the UE. When the gap between UL transmissions is greater than 16 μs, the UL transmissions may indicate separate UL transmission bursts.

A channel access procedure of a case where a channel access procedure start time of a communication apparatus is fixed or semi-statically configured will now be described.

In the 5G system performing communication in an unlicensed band, when it is possible to guarantee, by regulations and by level of the regulations, non-existence of another system that shares and uses a channel of the unlicensed band for a long time, a semi-static channel access procedure or channel sensing operation as described below may be performed.

The BS attempting to use the semi-static channel access procedure may provide configuration information indicating that a channel access procedure by the BS is the semi-static channel access procedure and/or configuration information about a semi-static channel access to the UE by higher layer signaling (e.g., SIB1 and/or RRC signaling), such that the UE can identify that a channel access procedure by the BS is the semi-static channel access procedure. An example of the configuration information about a semi-static channel access may include a period ($T_x$) in which the BS can start channel occupancy. For example, a value of the period may be 1 ms, 2 ms, 2.5 ms, 4 ms, 5 ms, or 10 ms. When using the semi-static channel access procedure, the BS may start periodic channel occupancy at every $x \cdot T_x$, starting from a frame having an even index, $T_x$, among two consecutive frames, and may maximally occupy a channel for $T_y$=0.95 $T_x$. Here, $$x \in \left\{0, 1, \ldots, \frac{20}{T_x} - 1\right\}.$$

Figure 11:
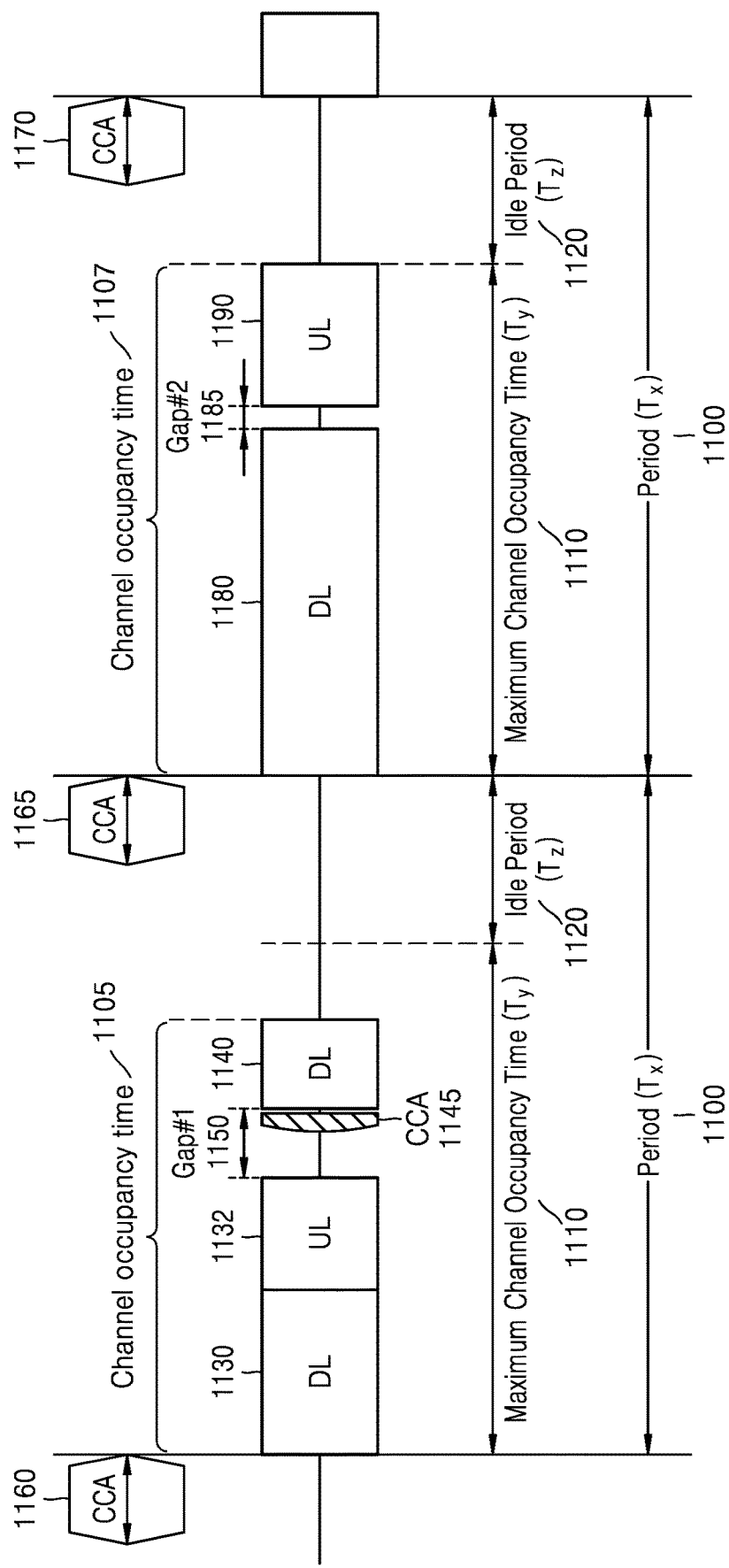
FIG. 11 illustrates an example of a channel access procedure for semi-static channel occupancy in a wireless communication system according to an embodiment.

FIG. 11 is a diagram illustrating an example of a channel access procedure for semi-static channel occupancy in a wireless communication system according to an embodiment of the disclosure.

Referring to FIG. 11, in the BS and the UE which perform a semi-static channel access procedure, a periodic channel occupancy period (or a semi-static periodic channel occupancy duration$T_x$) 1100, a channel occupancy time (COT) 1105 and 1107, a maximum channel occupancy time ($T_y$) 1110, an idle period ($T_z$) 1120, and clear channel assessment (CCA) durations (or sensing slots, sensing durations or sensing slot durations) 1160, 1165, or 1170 are illustrated.

The BS and the UE which use a semi-static channel access procedure may perform sensing on a channel in the CCA durations 1160 or 1165 so as to determine channel usage (or channel occupancy) availability, immediately before using or occupying the channel (e.g., immediately before DL transmission 1130 or DL transmission 1180). The sensing has to be performed in at least one sensing slot duration, and an example of sensing slot duration($T_{sl}$) is 9 μs.

A sensing method may involve comparing intensity or strength of received power detected or measured in the sensing slot duration with a predefined or preconfigured or calculated threshold $X_{Thresh}$. When a result of performing the sensing by the BS and the UE which performed sensing in the CCA duration 1160 is smaller than $X_{Thresh}$, the BS and the UE may determine that the channel is in an idle state or the channel is available (or can be occupied), and may occupy and use the channel for a maximum channel occupancy time 1110. When the result of performing the sensing is equal to or greater than $X_{Thresh}$, the BS and the UE may determine that the channel is in a busy state or the channel is unavailable (or cannot be occupied), and may not use the channel until a time 1180 in which a start of a subsequent channel occupancy is possible or a time 1165 in which channel sensing is to be performed in a subsequent CCA duration 1165.

When the BS performs the semi-static channel access procedure and thus starts channel occupancy, the BS and the UE may perform communication in the following manner.

After a sensing slot duration is sensed as an idle state, the BS has to immediately perform DL transmission at a start point of a COT. If the sensing slot duration is sensed as a busy state, the BS should not perform any transmission in a current COT.

When a gap 1150 between a DL transmission 1140 exists, the BS attempts to perform transmission within a COT 1105, and DL transmission 1130 and UL transmission 1132 earlier than the DL transmission 1140 is greater than 16 μs, the BS may perform sensing on at least one sensing slot duration 1145, and according to a result of the sensing, the BS can or cannot perform the DL transmission 1140.

When the gap 1150 between the DL transmission 1140 exists, the BS attempts to perform transmission within COT 1105, and the UL transmission 1132 performed by the UE earlier than the DL transmission 1140 is maximally 16 µs (or equal to or smaller than 16 µs), the BS may perform the DL transmission 1140 without channel sensing (without sensing a slot duration 1145).

If a transmission apparatus attempts to transmit, in an unlicensed band, a signal with respect to a service that does not match a QCI or SQI of Table 16, the transmission apparatus may select a QCI being closest to the service and a QCI or 5QI of Table 16, and may select a channel access priority class corresponding thereto. Also, when a signal to be transmitted in a channel of an unlicensed band has a plurality of different QCIs or 5QIs, a channel access priority class may be selected based on QCI or 5QI having a lowest channel access priority class.

TABLE 16

| Channel Access Priority class (p) | QCI or 5QI | $m_p$ | $CW_{min,p}$ | $CW_{max,p}$ | $T_{mcot,p}$ | Allowed $CW_p$ sizes |
|---|---|---|---|---|---|---|
| 1 | 1, 3, 5, 65, 66, 69, 70, 79, 80, 82, 83, 84, 85 | 1 | 3 | 7 | 2 ms | {3, 7} |
| 2 | 2, 7, 71 | 1 | 7 | 15 | 3 ms | {7, 15} |
| 3 | 4, 6, 8, 9, 72, 73, 74, 76 | 3 | 15 | 63 | 8 or 10 ms | {15, 31, 63} |
| 4 | — | 7 | 15 | 1023 | 8 or 10 ms | {15, 31, 63, 127, 255, 511, 1023} |

When the UE performs UL transmission 1190 within COT 1107 of the BS, if a gap 1185 between the UL transmission 1190 and DL transmission 1180 is maximally 16 µs (or equal to or smaller than 16 µs), the UE may perform the UL transmission 1190 without channel sensing.

When the UE performs UL transmission within COT 1107 of the BS, if the gap 1185 between the UL transmission 1190 and the DL transmission 1180 is greater 16 µs, the UE may perform channel sensing in at least one sensing slot duration immediately before the UL transmission 1190 within duration of 25 µs, and may perform or may not perform the UL transmission 1190 according to a result of the sensing.

The BS and the LE should not perform any transmission in a set of consecutive symbols in at least $T_x = \max(0.05 T_x, 100 \mu s)$ duration before next COT starts.

A channel access procedure of a case where a channel access procedure start time of a communication apparatus is variable or dynamic will now be described. In the 5G system performing communication in an unlicensed band, when a semi-static channel access procedure is not used or a dynamic channel access procedure is performed, a BS may perform a channel access procedure or channel sensing of a type as described below.

First type DL channel access procedure

According to the first type DL channel access procedure, the BS may perform, before DL transmission, sensing on a channel for a predetermined time or a time corresponding to the number of sensing slots corresponding to the predetermined time, and may perform the DL transmission when the channel is in an idle state. The first type DL channel access procedure will now be described in detail below.

In the first type DL channel access procedure, parameters for the first type DL channel access procedure may be determined according to a quality of service class identifier (QCI) or 5G QoS identifier (5QI) of a signal to be transmitted in a channel of an unlicensed band. Table 16 below shows an example of a relation between channel access priority class and a QCI or 5QI. A QCI 1, 2, and 4 may respectively indicate QCI values for services including a conversational voice), a conversational video (live streaming)), and a non-conversational video (buffered streaming).

When a value p of a channel access priority class is determined based on QCI or 5QI of a signal to be transmitted in a channel of an unlicensed band, a channel access procedure may be performed by using channel access procedure parameters corresponding to the determined value of the channel access priority class For example, as in Table 16, the channel access procedure may be performed by using $m_p$ for determining a length of a defer duration $T_d$, a set $CW_p$ of contention window values or sizes, and a minimum value $CW_{min,p}$ and a maximum value $CW_{max,p}$ of a content window, which are the channel access procedure parameters corresponding to the value p of the channel access priority class. After channel occupancy, allowed maximum channel occupancy available duration $T_{mcot,p}$ may also be determined according to the value $T_{mcot,p}$ of the channel access priority class.

Figure 12:
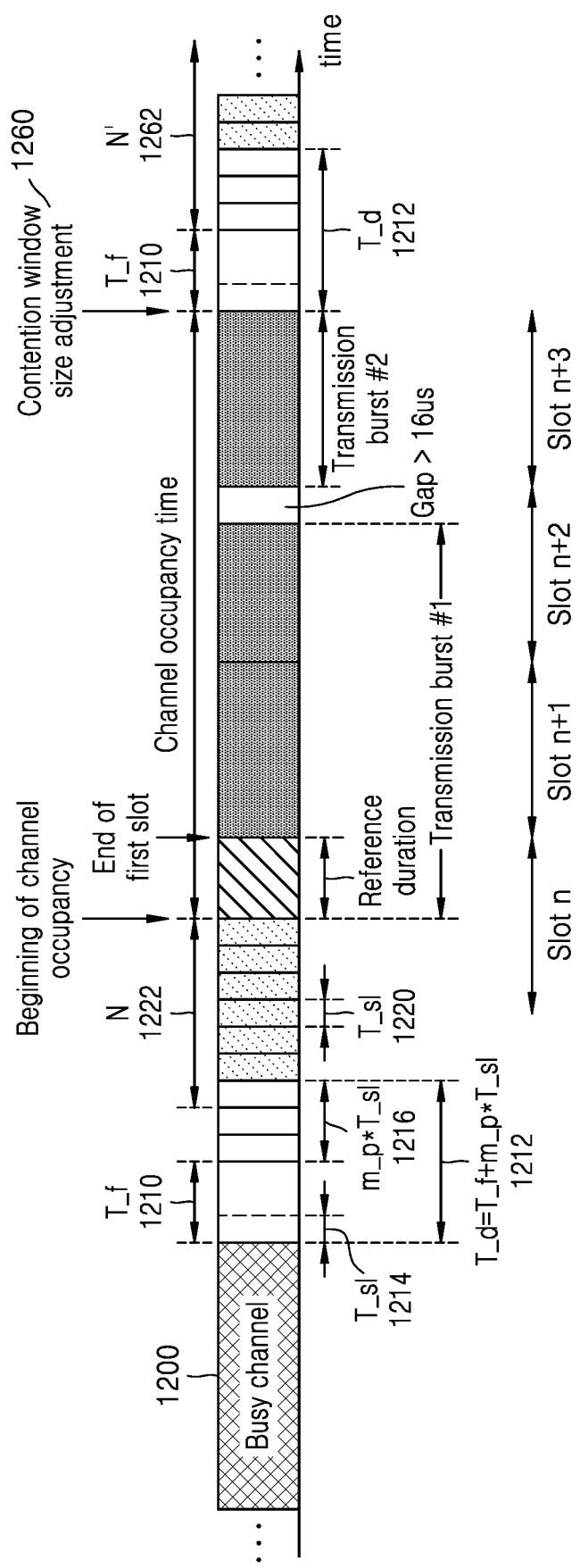
FIG. 12 illustrates an example of a channel access procedure for dynamic channel occupancy in a wireless communication system, according to an embodiment.

FIG. 12 is a diagram illustrating an example of a channel access procedure for dynamic channel occupancy in a wireless communication system, according to an embodiment of the disclosure. That is, an example of the first type IDL channel access procedure by the BS is illustrated.

Referring to FIG. 12, the BS attempting to transmit a IDL signal in an unlicensed band may perform a channel access procedure within a defer time of at least $T_d$ 1212. A defer duration $T_d$ 1212 may be configured sequentially by $T_f$ 1210 and $m_p \times T_{sl}$ 1216. $T_f$ 1210 may be 16 µs, and $T_{sl}$ 1214 or 1220 may indicate a length of a sensing slot. $T_f$ 1210 may include one sensing slot 1214, and the sensing slot 1214 may be located at a start point of $T_f$ 1210. When the BS performs a channel access procedure with a channel access priority class 3 (p=3) of Table 16, a defer duration $T_d$ 1212 required to perform a channel access procedure may be determined to be $T_f + m_p \times T_{sl}$ and $m_p = 3$. When first $T_{sl}$ 1214 of $T_{sl}$ 1210 is in an idle state, the BS may not perform a channel access procedure in a remaining time ($T_f - T_{sl}$ after the first $T_{sl}$ 1214 of 1210. Even when the BS performs a channel access procedure in the remaining time ($T_f - T_{sl}$), a result of the channel access procedure may not be used. In other words, a $T_f - T_{sl}$ time may refer to a time which defers a channel access procedure, regardless of whether or not the channel access procedure is performed.

When it is determined that the unlicensed band is in an idle state in $T_d$(1212, the BS may start channel occupancy after N sensing slots 1222. Here, N may be an integer value randomly selected by using 0 and a value $CW_p$) of a contention window in a time or immediately before a channel access procedure is started. That is, the integer value may be determined as N=rand(0, $CW_p$). A method of configuring a contention window will be described in detail at a later time. In a case of channel access priority class p=3 of Table 16, a minimum contention window value and a maximum contention window value are respectively 15 and 63, and an available contention window is {15, 31, 63}. Therefore, a value of N may be randomly selected from one of 0 to 15, 0 to 31, or 0 to 63, according to a contention window value. The BS may perform sensing in every sensing slot, and when a strength of a reception signal measured in a sensing slot is smaller than a threshold $X_{Thresh}$, the BS may perform an update as N=N−1. When the strength of the reception signal measured in the sensing slot is equal to or greater than the threshold $x_{Thresh}$, the BS may not deduct but may maintain the value of $X_{Thresh}$ and may perform channel sensing in the defer time $X_{Thresh}$. When it is determined that N=0, the BS may perform DL transmission. Here, the BS may occupy and use the channel for $T_{mcot,p}$, according to the channel access priority class and Table 16.

After a COT, a contention window size adjustment 1260 may be performed. After the contention window size adjustment 1260, a defer time $T_d$ 1212 necessary for performing a channel access procedure may exist again. A time $T_f$ 1210 may be included in the defer time $T_d$ 1212, Then, after N' duration 1262, the channel access procedure may start.

The first type DL channel access procedure may be divided into the steps described below. The BS may sense that a channel is in an idle state during sensing slot duration of the defer time $T_d$ 1212, and when a value of counter N is 0, the BS may perform DL, transmission. The counter N may be adjusted according to channel sensing performed in additional sensing slot duration(s) according to the steps described below.

Step 1: The BS configures the counter N as N=$N_{init}$, and moves to step 4. $N_{init}$ is a value randomly selected between 0 and $Cw_p$.

Step 2: If N>0, the BS determines whether to decrease the counter N. if the BS determines to decrease the counter N, the BS configures the counter N as N=N−1.

Step 3: The BS senses a channel during additional sensing slot duration. When it is determined that the channel is in an idle state, the BS moves to step 4. When it is determined that the channel is not in an idle state, the BS moves to step 5.

Step 4: If N=0, the BS starts DL transmission, and if it is not N=0, the BS moves to step 2.

Step 5: Until a sensing slot in a busy state is detected within a defer time $T_d$, or until all sensing slots within the defer time $T_d$, are detected as being in an idle state, the BS senses a channel.

Step 6: When all sensing slots within the defer time $T_d$, are detected as being in an idle state, the BS moves to step 4. Otherwise, the BS moves to step 5.

A procedure for the BS to maintain or adjust a value of contention window $CW_p$ is described below. A contention window adjustment procedure is applied to a case where the BS performed DL transmission including a PDSCH corresponding to at least a channel access priority class p, and is configured with the steps described below.

Step 1: The BS configures $CW_p$=$CW_{min-p}$ for all channel access priority classes p.

Step 2:
if a HARQ-ACK feedback is available after the last $CW_p$ update, the BS moves to step Otherwise, when a DL transmission of the BS which is transmitted after a first type channel access procedure does not include retransmission or when the DL transmission is transmitted within duration $T_w$ immediately after reference duration of a DL transmission burst being first transmitted after the first type channel access procedure after a most-recent $CW_p$ update, the BS moves to step 5.

In cases other than the above case, the BS moves to step 4.

Step 3: A HARQ-ACK feedback with respect to a PDSCH transmitted in a reference duration of a most-recent DL transmission burst, for which a HARQ-ACK feedback is available, may be used as below.

Among the HARQ-ACK feedbacks, when at least one HARQ-ACK feedback among HARQ-ACK feedbacks with respect to a PDSCH transmitted in a unit of a transport block (TB) is ACK, or among the HARQ-ACK feedbacks, when at least 10% of HARQ-ACK feedbacks among HARQ-ACK feedbacks with respect to a PDSCH transmitted in a unit of a code block group (CBG) are ACK, the BS moves to step 1.

Otherwise, the BS moves to step 4.

Step 4: The BS increases $CW_p$ to a next-large value compared to a current value among allowed $CW_p$ values, with respect to all channel access priority classes p.

if current $CW_p$=$CW_{max,p}$, $CW_p$ that is allowed as a next-large value is $CW_{max,p}$.

If $CW_p$=$CW_{max,p}$ is sequentially used K times to generate $N_{init}$, the BS may initialize $CW_p$ as $CW_{min,p}$ with respect to the channel access priority class p. Here, K may be selected among {1, 2, . . . , 8} by the BS with respect to each channel access priority class p.

Step 5: The BS maintains $CW_p$ with respect to all channel access priority classes p, and moves to step 2.

In the above case, duration $T_w$ is max ($T_A$,$T_B$+1 ms) . Here, $T_B$ refers to UL/DL transmission burst duration starting from a start of reference duration, and corresponds to a value in a ms unit. In the 5G system performing communication in an unlicensed band when it is not possible to guarantee, by regulations and by level of the regulations, non-existence of another system that shares and uses a channel of the unlicensed band for a long time, a duration is $T_A$=5 ms, and otherwise, it is $T_A$=10 ms.

A reference duration may indicate a duration which occurs first in terms of time among a duration including at least one unicast PDSCH transmitted via all time-frequency resource domains allocated to the PDSCH, as a duration starting from a channel occupancy start to the end of a first slot among a channel occupancy of the BS which includes PDSCH transmission, or a duration including at least one unicast PDSCH transmitted via all time-frequency resource domains allocated to the PDSCH, as a duration starting from channel occupancy start to the end of a DL transmission burst. If the channel occupancy of the BS includes unicast PDSCH but does not include a unicast PDSCH transmitted via all titne-frequency resource domains allocated to the PDSCH, first DL transmission burst duration including unicast PDSCH may be a reference duration. Here, channel occupancy may indicate transmission performed by the BS after a channel access procedure.

According to a second-A type DL channel access procedure, the BS may perform sensing on a channel in at least a $T_{short-dl}$=25 μs duration immediately before DL transmission, and when the channel is in an idle state, the BS may perform DL transmission. In this case, $T_{short,dl}$ is 25 μs long and is configured sequentially by $T_f$=16 μs and one sensing slot ($T_{sl}$=9 μs). $T^f$ includes one sensing slot ($T_{sl}$=9 μs), and a start time of a sensing slot may be equal to a start time of $T_f$. That is, $T_f$ may start with a sensing slot $T_{sl}$. When the BS performs a DL transmission not including a DL data channel to be transmitted to a specific UE, the second-A type DL channel access procedure may be performed.

According to a second-B type DL channel access procedure, the BS may perform sensing on a channel in at least $T_f$=16 μs duration immediately before DL transmission, and when the channel is in an idle state, the BS may perform DL transmission. In this case, $T_f$ may include one sensing slot ($T_{sl}$=9 μs), and a sensing slot may be located at the last 9 μs of $T_f$. That is, $T_f$ ends with a sensing slot $T_{sl}$). The second-B type DL channel access procedure may be applied to a case where a gap between a start of the DL transmission to be transmitted by the BS and an end of UL transmission by the UE is 16 μs or is equal to or smaller than 16 μs.

A second-C type DL channel access procedure may be applied to a case where a gap between a start of DL transmission by the BS and an end of UL transmission by the UE is 16 μs or is equal to or smaller than 16 μs, and the BS may perform DL transmission without a separate procedure or channel sensing. Here, maximum duration of the DL transmission performed after the second-C type DL channel access procedure may be 584 μs.

Unlike the first type DL channel access procedure, in the second-A, second-B, and second-C type DL channel access procedures, channel sensing duration or time the BS performs before DL transmission is deterministic. Based on the characteristic above, a DL channel access procedure may be performed differently, as described below. For example, three transmission types are as follows.

Type 1: This is a type that performs DL transmission after a channel access procedure is performed during a variable time, and corresponds to the first type DL channel access procedure.

Type 2: This is a type that performs DL transmission after a channel access procedure is performed during a static time, and corresponds to the second-A and second-B type DL channel access procedures.

Type 3: This is a type that performs DL transmission without performing a channel access procedure, and corresponds to the second-C type DL channel access procedure.

The BS that performs a channel access procedure or channel sensing may configure an energy detection threshold or sensing threshold $X_{Thresh}$, as described below. Here, $X_{Thresh}$ has to be configured as a value equal to or smaller than $X_{Thresh\_max}$ indicating a maximum energy detection threshold or sensing threshold, and its unit is decibels (dBm).

In the 5G system performing communication in an unlicensed band, when it is possible to guarantee, by regulations, non-existence of another system that shares and uses a channel of the unlicensed band for a long time, it is $X_{Thresh,max}$=min{$T_{max}$+10 dB,$X_r$}. In this case, $X_r$ refers to a maximum energy detection threshold requested by each local regulation, and its unit is dBm. If a maximum energy detection threshold requested by each local regulation is not configured nor defined, it may be $X_r$=$T_{max}$+100 dB.

In a case other than the above case, i.e., in the 5G system performing communication in an unlicensed band, when it is not possible to guarantee, by regulations, non-existence of another system that shares and uses a channel of the unlicensed band for a long time, a maximum energy detection threshold may be determined by using Equation 1 below. However, Equation 1 is merely an example of a method of determining a maximum energy detection threshold, and the disclosure is not limited thereto.

Equation 1: ED threshold $$X_{Thresh,max} = \max\left\{\min\left\{\begin{array}{l} -72 + 10\log10(BW\text{MHz}/20\text{ MHz})\text{dBm}, \\ T_{max}, \\ T_{max} - T_A + (P_H + 10\log10(BW\text{MHz}/20\text{ MHz}) - P_{TX} \end{array}\right\}\right\}$$

In Equation 1, above, $T_A$ is 10 dBm in a transmission that includes a PDSCH, and when a discovery signal and a channel are transmitted, $T_A$ is 5 dB. $P_H$ is 23 dBm, and $P_{TX}$ refers to a maximum output power of the BS and its unit is dBm. Regardless of whether DL transmission is transmitted via one channel or a plurality of channels, the BS may calculate a threshold by using a maximum transmit power transmitted via one channel. Here, $T_{max}$=10log10 (3.16228·10$^{-8}$(mW/MHz) ·BWMHz(MHz)), and BW refers to a bandwidth of one channel and its unit is MHz.

A method by which the UE determines an energy detection threshold $X_{Thresh}$ for accessing a channel for UL transmission will now be described below.

The BS may configure a maximum energy detection threshold of the UE by higher layer signaling, e.g., "maxEnergyDetectionThreshold". After the UE is configured with or is provided "maxEnergyDetectionThreshold" from the BS, the UE may configure $X_{Thresh\_max}$ as a value configured by the parameter. When the UE is not configured with nor is provided "maxEnergyDetectionThreshold" from the BS, the UE may configure $X_{Thresh\_max}$ as described below. If the UE is not configured with nor is provided an energy detection threshold offset (e.g., energyDetectionThresholdOffset provided by higher layer signaling) from the BS, the UE may configure $X_{Thresh\_max}$ as $X'_{Thresh\_max}$. If the UE, is configured with or is provided an energy detection threshold offset from the BS, the UE may configure $X_{Thresh\_max}$ by adjusting $X^{Thresh\_max}$ by the energy detection threshold offset. Here, $X'_{Thresh\_max}$ may be determined as described below.

In a case other than the above case, i.e., in the 5G system performing communication in an unlicensed band, when it is possible to guarantee, by regulations, non-existence of another system that shares and uses a channel of the unlicensed band for a long time, the BS may provide the UE with higher layer signaling "absenceOfAnyOtherTechnology". When the UE is configured with or is provided "absenceOfAnyOtherTechnology" by higher layer signaling from the BS, the UE may configure $X'_{Thresh\_max}$=min{$T_{max}$+ 10 dB,$X_r$}. In this case, $X_r$ refers to a maximum energy detection threshold requested by each local regulation, and its unit is dBm. If a maximum energy detection threshold requested by each local regulation is not configured nor defined, it may be $X_r$=$T_{max}$+10 dB. When the UE is not configured with nor is provided "absenceOfAnyOtherTechnology" by higher layer signaling from the BS, the UE may determine $X'_{Thresh\_max}$ by using Equation 1 described above. In this case, $T_A$=10 dBm, $P_H$=23 dBmn, and $P_{TX}$ is $P_{CMAX\_H,c}$.

As described above, K0, K1, and K2 values may be determined according to UE processing time capability. The UE processing time capability will now be described with an example of a K1 value.

The UE may provide or transmit, to the BS via a PUCCH, a response signal or HARQ-ACK information in response to a PDSCH received from the BS, The UE may transmit the HARQ-ACK information with respect to the received PDSCH after a time in the PDSCH is decoded, and the decoding time may vary according to UE processing time capability. Therefore, if the BS indicates a K1 value to allow PUCCH transmission of transmitting the HARQ-ACK information with respect to the PDSCH to be performed before the decoding processing time of the UE, the UE cannot provide the BS with HARQ-ACK information valid for the received PDSCH. Therefore, the BS has to configure and/or indicate a K1 value in such a manner that the UE does not transmit a time or symbol immediately before a first symbol of a PUCCH including a response signal or HARQ-ACK information with respect to a PDSCH, not earlier than symbol L1 including a timing advance between the BS and the UE, from a time or symbol after a very last symbol on which the UE received the PDSCH. When the above condition is satisfied, the UE may provide the BS with HARQ-ACK information valid for the PDSCH. When the above condition is not satisfied, the UE does not transmit HARQ-ACK, transmits HARQ-ACK information irrelevant to a reception result of the PDSCH, or may always transmit ACK or NACK information. In this case, UE refers to the number of symbols starting from a time or symbol after a very last symbol on which the UE received the PDSCH up to a first symbol on which a CP starts after a time of $T_{proc,1}$, where $T_{proc,1}=(N_1+d_{1,1}+d_2)(2048+144) \cdot \kappa 2^{-\mu} \cdot T_c + T_{ext}$.

$N_1$, $d_{1,1}$, $\kappa$, $\mu$, TC and $T_{ext}$ may be defined as described below.

When HARQ-ACK information is transmitted via a PUCCH (a UL control channel), $d_{1,1}=0$, and when the HARQ-ACK information is transmitted via a PDSCH (a UL shared channel, data channel), $d_{1,1}=1$.

If an additional DM-RS location ($l_1$) or symbol index of a PDSCH is 12, $N_{1,0}$ of Table 4 is 14, or otherwise, $N_{1,0}$ of Table 4 is 13.

When the UE is configured with a plurality of activated component carriers or carriers, a maximum timing difference between the carriers may be applied to a first symbol of a PUCCH that includes HARQ-ACK information and is transmitted.

a case of PDSCH mapping type A, i.e., when a first DMRS symbol location is a third symbol or a fourth symbol of a slot, if index i of a last symbol of a PDSCH is smaller than 7, $d_{1,1}=7-i$. If index i of the last symbol of the PDSCH is equal to or greater than 7, $d_{1,1}=0$.

In a UE of UE processing capability 1, in a case of a PDSCH transmitted with PDSCH mapping type B, i.e., when a first DMRS symbol location is a first symbol of the PDSCH, if a length L of the PDSCH is 7 symbols, $d_{1,1}=0$, if a length L of the PDSCH is included in a range of equal to or greater than 4 symbols and is less than or equal to 6 symbols, $d_{1,1}=7L$, if a length L of the PDSCH is 3 symbols, $d_{1,1}=3+\min(d,1)$, or if a length L of the PDSCH is 2 symbols, $d_{1,1}=3+d$. Here, d refers to the number of symbols on which the PDSCH and a PDCCH that includes a control signal (DCI) for scheduling the PDSCH overlap.

In a UE of UE processing capability 2, in a case of a PDSCH transmitted with PDSCH mapping type B, i.e., when a first DMRS symbol location is a first symbol of the PDSCH, if a length L of the PDSCH is 7 symbols, $d_{1,1}=0$, or if a length L of the PDSCH is included in a range of equal to or greater than 3 symbols and is equal to or smaller than 6 symbols, $d_{1,1}=d$. In the above case, when a length of the PDSCH is 2 symbols, if a PDCCH that includes a control signal (DCI) for scheduling the PDSCH is transmitted in a CORESET having a length of 3 symbols, and symbols to start the CORESET and the PDSCH are same, $d_{1,1}=3$, or otherwise, $d_{1,1}=d$. Here, d refers to the number of symbols on which the PDSCH and PDCCH includes a control signal (DO) for scheduling the PDSCH overlap.

$N_1$ is defined as shown in Table 17 below, according to $\mu$. $\mu=0$, $\mu=1$, $\mu=2$, and $\mu=3$ respectively indicate subcarrier spacings 15 kHZ, 30 kHz, 60 kHz, and 120 kHz. Here, a subcarrier spacing of a PDCCH, a subcarrier spacing of a PDSCH, and a subcarrier spacing of a UL channel transmitting HARQ-ACK may be equal or at least one subcarrier spacing thereof may be different, and a subcarrier spacing that generates a greatest $T_{proc,1}$ value from among the subcarrier spacings is $\mu$.

TABLE 17

| | PDSCH decoding time $N_1$ [symbols] | |
| --- | --- | --- |
| $\mu$ | dmrs-AdditionalPosition = pos0 in DMRS-DownlinkConfig in both of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
| 0 | 8 | $N_{1,0}$ |
| 1 | 10 | 13 |
| 2 | 17 | 20 |
| 3 | 20 | 24 |

TABLE 18

| | PDSCH decoding time $N_1$ [symbols] |
| --- | --- |
| $\mu$ | dmrs-AdditionalPosition = pos0 in DMRS-DownlinkConfig in both of dmrs-DownlinkForPDSCH-MappingTypeA, dmrs-DownlinkForPDSCH-MappingTypeB |
| 0 | 3 |
| 1 | 4.5 |
| 2 | 9 for frequency range 1 |

Table 18, shown above, is an $N_1$ value provided by UE capability 1, and Table 18, shown above, is an $N_1$ value provided by UE capability 2. A UE supporting capability 2 may be configured to apply a processing among Table 17 and Table 18 by an upper signal (e.g., Capability2-PDSCH-Processing of PDSCH-Config). When the Capability2-PDSCH-Processing is enabled, processing may be applied according to $N_1$ value provided by the UE capability 2, as shown in Table 18, or otherwise, processing may be applied according to an Ni value provided by UE capability 1, as shown in Table 17.

In addition, $T_c=1/(\Delta f_{max} \cdot N_f)$, $\Delta f_{max}=480 \cdot 10^3$ Hz. $N_f=4096$, $\kappa = T_s/T_c=64$, $T_s=1/(\Delta f_{ref} \cdot N_{f,ref})$.

$\Delta f_{ref}=15 \cdot 10^3$ Hz, $N_{f,ref}=2048$ may be respectively defined.

In a case of subcarrier spacing $\mu=1$ in a UE with UE processing capability 2, when a frequency resource of 136 or more RBs is allocated for a PDSCH, the UE follows N1 value provided by UE processing capability 1, as in Table 4. If a PDSCH PDSCH2) starting on a symbol within 10 symbols starting from a last symbol of a PDSCH (e.g., PDSCH1) exists, when PDSCH2 follows UE processing capability 2, subcarrier spacing of at least one PDSCH among PDSCH1 and PDSCH2 is 30 kHz ($\mu=1$), and a PDSCH is allocated to a frequency resource of 136 or more RBs and follows UE processing capability 1, the UE may not perform a decoding operation on PDSCH1. Here, PDSCH1 may be one or more $T_{ext}$ is a value indicated by the scheduling DCI, when communication is performed in an unlicensed band, and indicates an extended CP or a length of CP extension of a transmission start symbol being transmitted in a particular time within a symbol immediately before the transmission start symbol (or a first symbol) of a lit signal or channel scheduled by time domain resource allocation information. In more detail, when CP extension of a first symbol (i) of PUSCH, SRS or PUCCH transmission is performed, a time-sequential signal $s_{ext}^{(p,\mu)}(t)$ in duration $t_{start,l}^{\mu} - T_{ext} \leq t < t_{start,l}^{\mu}$ immediately before the first symbol (l) is equal to $\bar{s}_l^{(p,\mu)}(t)$. Here, t>0 indicates a signal in a previous subfratne or a previous slot. PUSCH, $T_{ext}$ of PUSCH, SRS, and PUCCH transmissions scheduled by DCI is obtained using Equation 2, below.

$T_{ext}=\min(\max(T'_{ext}, 0), T_{symb,(l-1)mod7 \cdot 2^\mu})$  Equation 2 where $T'_{ext}=\Sigma_{k=1}^{C_i} T_{symb,(l-k)mod7 \cdot 2^\mu} - \Delta_i$

Here, $\Delta_i$ may refer to Table 19, and when $\mu \in \{0,1\}$, $C_1=1$, and when $\mu=2$, $C_1=2$. The UE may be configured with $C_2$ and $C_3$ values by an upper signal from the BS.

TABLE 19

| $T_{ext}$ index i | $C_i$ | $\Delta_i$ |
|---|---|---|
| 0 | — | — |
| 1 | $C_1$ | $25 \cdot 10^{-6}$ |
| 2 | $C_2$ | $16 \cdot 10^{-6} + T_{TA}$ |
| 3 | $C_3$ | $25 \cdot 10^{-6} + T_{TA}$ |

In general, the UE is scheduled with PDSCH reception or PUSCH transmission which delivers one TB or two TBs, by one DCI. Hereinafter, for convenience of descriptions, the disclosure is described assuming a PDSCH, but the disclosure is also applicable to a PUSCH, According to the scheme above, every PDSCH is scheduled by different scheduling information, i.e., DCI, and thus, PDSCH reception performance of a UE may be maximized, but excessive power consumption for receiving DCI and/or excessive resource use for transmitting DCI may occur. For a UE that needs reception of 8 PDSCHs, the UE needs 8 times of PDCCH reception and decoding and needs a resource for transmitting the 8 PDCCHs. If it is possible to schedule, by one DCI, a plurality of PDSCH receptions (or PUSCH transmission) for delivering a plurality of TBs (hereinafter, referred to as multi-PDSCH scheduling), the power consumption and unnecessary resource use by the LIE may be minimized. Here, the DCI may provide independent information for each of a plurality of PDSCHs, but to do so, a size of the DCI is sharply increased, such that PDCCH reception performance of the UE may deteriorate. Therefore, some fields in the DCI may be designed to be commonly applied to the plurality of PDSCHs, but, in this case, deterioration in scheduling flexibility and/or PDSCH reception performance may occur. Therefore, the disclosure provides a method of providing PDSCH scheduling flexibility without changing a size of DCI.

A method proposed in the disclosure will now be described by using a DCI for scheduling PDSCH reception to a UE. DCI format 1_1 for scheduling a PDSCH in an NR system may include fields as below. The UE may be provided or configured, by an upper signal, as to whether at least one field among the following fields is included.

PDSCH-to-HARQ feedback timing indicator: This is a field for indicating a value corresponding to the K1 value, and a size of the field may be determined as $\lceil \log_2(1) \rceil$ bits. Here, I indicates the number of entries of a higher layer parameter di-DataToUL-ACK. For example, dl-DataToUL-ACK may have 1 to 8 entries, and each entry may have an integer value between 0 and 15 or an integer value between −1 to 15. Here, a −1 value refers to a "non-numerical value" or "non-numeral value", and when PDSCH-to-HARQ feedback timing indicator indicates −1, a HARQ-ACK information transmission time with respect to a PDSCH is not indicated or is not determined yet, and thus, the UE may not transmit HARQ-ACK information with respect to the PDSCH to the BS.

PDSCH group index: This is configured as 1 bit when higher layer parameter PDSCH-HARQ-ACK-Codebook is enhancedDynamic-r16, or otherwise, it is 0 bit. PDSCH group index is a value indicating a group index of a PDSCH scheduled by the DCI. When a value of a PDSCH group index is 0, the UE may determine that the group index of the PDSCH scheduled by the DCI is 0, and when a value of a PDSCH group index is 1, the UE may determine that the group index of the PDSCH scheduled by the DCI is 1.

Number of requested PDSCH groups: This is configured as 1 bit when higher layer parameter pdsch-HARQ-SCK-Codebook is enhancedDynamic-r16, or otherwise, it is 0 bit. When a value of a number of requested :PDSCH groups is 0, the UE transmits HARQ-ACK information about at least one PDSCH corresponding to a PDSCH group index indicated by the PDSCH group index field, to the BS on a PUCCH resource or via a PUSCH which is indicated by the DCI. When a value of a number of requested PDSCH: groups is 1, the UE transmits HARQ-ACK information about at least one PDSCH corresponding to a PDSCH group index indicated by the PDSCH group index field, and at least one PDSCH corresponding to a PDSCH group index not indicated by the PDSCH group index field, to the BS on a PUCCH resource or via a PUSCH which is indicated by the DCI. For example, in a case where the number of PDSCH groups is 2, when a value of a number of requested PDSCH groups is 1, the UE transmits HARQ-ACK information about at least one PDSCH indicated by PDSCH group index 0 and PDSCH group index 1, on a PUCCH resource or via a PUSCH which is indicated by the DCI.

When the UE receives DCI for scheduling PDSCH (PDSCH#1) reception in a slot if PDSCH group index indicated by a PDSCH group index field of the DCI is, for example, g, the UE determines that the PDSCH is included in group g. Also, when a value indicated by a PDSCH-to-HARQ_feedback timing indicator field of the DCI is k, HARQ-ACK information is transmitted on a PUCCH resource indicated by a PUCCH resource indicator of the DCI in a slot n+k. In this case, the HARQ-ACK information to be transmitted on the PUCCH resource to the BS is determined according to a value of the number of requested PDSCH groups of the DCI. When the value of the number of requested PDSCH groups is 0, HARQ-ACK information with respect to one or more PDSCHs belonging to a group g, i.e., a PDSCH group indicated by the PDSCH group index field of the DCI, is transmitted on the PUCCH resource. When the value of the number of requested PDSCH groups is 1, HARQ-ACK information with respect to one or more PDSCHs belonging to a group g, i.e., a PDSCH group indicated by the PDSCH group index field of the DCI, and another PDSCH group or a plurality of PDSCH groups are transmitted on the PUCCH resource. If a value indicated by the PDSCH-to-HARQ feedback timing indicator field is −1 or a value corresponding to a non-numerical value (hereinafter, referred to as a non-numerical value), the UE determines that a PUCCH transmission time or slot in which HARQ-ACK information with respect to a PDSCH is not yet determined, and thus, the UE does not transmit the HARQ-ACK information and/or a PUCCH. The HARQ-ACK information that is not transmitted may be transmitted to the BS by DCI of which value of a PDSCH-to-HARQ_ feedback timing indicator field does not indicate a non-numerical value and which is from among a plurality of DCIs being received after the DCI reception time. When the UE receives DCI for scheduling PDSCH (PDSCH#2) reception in a slot n+1 in the example above, in a case where a PDSCH group index indicated by the PDSCH group index field of the DCI is g, the UE may determine that the PDSCH(PDSCH#2) is included in a group g. Also, when a value indicated by the PDSCH-to-HARQ_feedback timing indicator field of the DCI is k (or a value that is not a non-numerical value), HARQ-ACK information is transmitted on a PUCCH resource indicated by a PUCCH resource indicator of the DCI in a slot n+k. Here, when the value of the number of requested PDSCH groups of the DCI is 0, the UE may transmit HARQ-ACK information about PDSCH (PDSCH#1 and PDSCH#2) belonging to a group g on the PUCCH resource, and thus, may transmit, to the BS, HARQ-ACK information including the not-transmitted HARQ-ACK information, Therefore, for a case where, when one DCI schedules a plurality of PDSCHs, if the DCI includes one PDSCH-to-HARQ_feedback timing indicator field or a value of PDSCH-to-HAM) feedback timing indicator field (hereinafter, for convenience of descriptions, referred to as a K1 field, K1, or a K1 value) of the DCI indicates one HARQ-ACK transmission time, there is a need for a method of differently indicating or determining the K1 value with respect to at least one PDSCH from among a plurality of PDSCHs to be different from the K1 value indicated by the DCI.

For a case where, when one DCI schedules a plurality of PDSCHs, if the DCI includes one PDSCH-to-HARQ_feedback timing indicator field or a value of PDSCH-to-HARQ feedback timing indicator field of the DCI indicates one HARQ-ACK transmission time, a method of differently indicating or determining the K1 value with respect to at least one PDSCH from among a plurality of PDSCHs to be different from the K1 value indicated by the DCI. In more detail, the BS may transmit DCI for scheduling N PDSCHs to the UE, may indicate X as K1 value via a PDSCH-to-HARQ feedback timing indicator field of the and thus, may indicate a HARQ-ACK feedback transmission time for N PDSCHs.

The disclosure proposes a method by which the BS can efficiently schedule PDSCH and/or PUCCH resource without increasing an additional DCI bit, by allowing the UE to determine the K1 value of at least one PDSCH among the N PDSCHs as a value other than X, i.e., K1=Y. Also, hereinafter, the disclosure will now be described assuming a case where, when one DCC schedules a plurality of PDSCHs, a PDSCH group index of the DCI is equally applied to each of the scheduled PDSCHs. When a value of the PDSCH group index of the DCI for scheduling N PDSCHs is g, the UE may determine that the N PDSCHs all belong to a PDSCH group g. For convenience of description, hereinafter, descriptions of a PDSCH group index are not provided.

The BS may configure, by an upper signal (e.g., pdsch-TimeDomainAllocationList or dsch-TimeDomainAllocationList-ForMultiPDSCH), to the UE that a maximum of Nmax (≥1) PDSCHs can be scheduled via one DCI. Here, Nmax may be configured for the UE by an upper signal, or may be determined as a maximum number of slot and length indicator value (SLIV)s included in a row of a table configured via a time domain resource allocation list configured by the upper signal. As described above, after the UE is configured by the upper signal from the BS, a maximum of Nmax (≥1) PDSCHs can be scheduled via one DCI, when the UE receives DCI and a value of a time domain resource assignment field in the DCI is m, and the UE may determine that the number of valid SLIVs included in a row index m+1 of a time domain resource assignment table as the number (N) of PDSCHs to be actually scheduled by the DCI. N may be 1≤N≤Nmax. It is possible that an additional field may be added into the and the UE determines the number (N) of PDSCHs actually scheduled.

Figure 13:
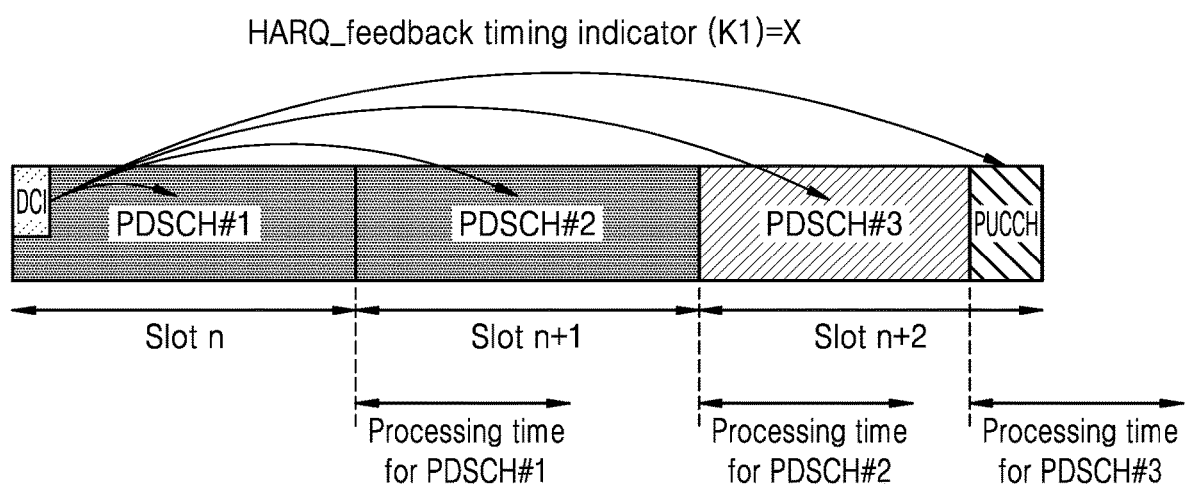
FIG. 13 illustrates an example of a method of transmitting and receiving (transceiving) a DL data channel and transmitting a response signal thereto in a wireless communication system, according to an embodiment.

FIG. 13 illustrates an example of a method of transmitting and receiving a DL data channel and transmitting a response signal thereto in a wireless communication system, according to an embodiment of the disclosure.

Specifically, FIG. 13 illustrates a case where the UE receives DCI in a slot n, and the UE is scheduled to receive three PDSCHs (PDSCH#1 PDSCH#2, PDSCFI#3) via the DCI, and it is indicated that a K1 value is X via a PDSCH-to-HARQ_feedback timing indicator field. Here, the K1 value may be applied based on at least one of the following five (5) conditions.

1) A slot (slot n of FIG. 13) in which the DCI is received or a PDCCH last symbol includes the DCI.
2) A slot (slot n of FIG. 13) including a first PDSCH scheduled via the DCI or a last symbol of the first PDSCH.
3) A slot (slot n+2 of FIG. 13) including a last PDSCH scheduled via the DCI or a last symbol of the last PDSCH.

4) An Mth slot immediately before a slot (slot n+1 when M=1 in FIG. 13) including a last PDSCH scheduled via the DCI.

5) A slot or last symbol of P1st PDSCH (or P2nd PDSCH starting from a last PDSCH) starting from a first PDSCH among PDSCHs scheduled via the DCI.

In FIG. 13, X=2 when a K1 value is applied based on conditions 1) and 2), described above, X=0 when a K1 value is applied based on condition 3), and X=1 when a K1 value is applied based on a condition as in 4). For convenience of description, the disclosure will now be described assuming condition 3), above, but a K1 value may be applied based on other conditions, such as 1) or 2).

In FIG. 13, the UE receives DCI in a slot n, determines the number of scheduled PDSCHs indicated by the DCI, and receives PDSCH#1, PDSCH#2, and PDSCH#3 according to scheduling information of the DCI. The UE may deliver a HARQ-ACK result with respect to the PDSCHs to the BS via a PUCCH in a slot n+2 which is determined based on a K1 value (K1=0) of the DCI and PUCCH resource indicator information. In this regard, as values with respect to a plurality of PDSCHs are indicated as one K1 value, a PDSCH (PDSCH#3 in FIG. 13) that does not satisfy a PDSCH processing time condition (e.g., an L1 or Tproc, 1 condition above) of the UE may occur from among PDSCHs scheduled via the DCI. Here, the UE may determine a K1 value of the PDSCH not satisfying the PDSCH processing time condition, as a non-numerical value. In other words, the UE may determine that a value indicated via the DCI is applied to PDSCH#1 and PDSCH#2, and the K1 value is not applied to PDSCH#3 or the K1 value of PDSCH#3 is a non-numerical value.

In more detail, the UE receives DCI in a slot n, and determines the number of PDSCHs scheduled via at least one field (e.g., a time domain resource allocation field) of the DCI. In a case where the DCI schedules a plurality of PDSCHs, if a K1 value of the DCI is a non-numerical value, the UE may apply a non-numerical value to all of the plurality of scheduled PDSCHs. In a case where the DCI schedules a plurality of PDSCHs, if a K1 value of the DCI is not a non-numerical value or is a numerical value, the UE may apply a K1 value to PDSCH (PDSCH#1 and PDSCH#2 of FIG. 13) satisfying a PDSCH processing time condition of the UE from among the plurality of scheduled PDSCHs, and may determine that a K1 value of PDSCH (PDSCH#3 of FIG. 13) not satisfying the PDSCH processing time condition is a non-numerical value.

Here, a DL assignment index (DAI) value indicated by the DCI may be information about an entirety of the plurality of scheduled PDSCHs or may be information about a PDSCH for which a K1 value that is not a non-numerical value is indicated from among the plurality of scheduled PDSCHs, or may be information about a PDSCH to which a K1 value of the DCI is applied from among the plurality of scheduled PDSCHs. In FIG. 13, a DAI value indicated via the DCA may be DAI=3 indicating information about an entirety of a plurality of scheduled PDSCHs (PDSCH#1, PDSCH#2, and PDSCH#3), may be DAI=2 indicating information about a PDSCH (PDSCH#1 and PDSCH#2) for which a K1 value that is not a non-numerical value is indicated from among the plurality of scheduled PDSCHs, or may be DAI=2 indicating information about PDSCH (PDSCH#1 and PDSCH#2) to which a K1 value of the DCI is applied from among the plurality of scheduled PDSCHs. Here, it is possible that HARQ-ACK information about a PDSCH indicated as a non-numerical value or a PDSCH not satisfying a PDSCH processing time condition of the UE is assumed or determined as NACK, regardless of an actual PDSCH reception result of the UE, and may be transmitted to the BS.

In this regard, as values with respect to a plurality of PDSCHs are indicated as one K1 value, a PDSCH (PDSCH#3 in FIG. 13) that does not satisfy a PDSCH processing time condition (e.g., an L1 or Tproc, 1 condition above) of the UE may occur from among PDSCHs scheduled via the DCI. Here, the UE may determine a K1 value of the PDSCH not satisfying the PDSCH processing time condition, as a non-numerical value. In other words, the UE may determine that a K1 value indicated via the DCI is applied to PDSCH#1 and PDSCH#2, and the value is not applied to PDSCH#3, or a K1 value of PDSCH#3 is a non-numerical value.

Another method of determining K1 will now be described. For convenience of descriptions, the disclosure will now be described assuming condition 1) above, but a K1 value may be applied based on other condition such as 2) or 3). The UE receives DCI in a slot n, determines the number of scheduled. PDSCHs indicated by the DCI, and receives PDSCH#1, PDSCH#2, and PDSCH#3 according to scheduling information of the DCI. The UE may deliver a HARQ-ACK result with respect to the PDSCHs to the BS via a PUCCH in a slot n+2 which is determined based on a K1 value (K1=2) of the DCI and PUCCH resource indicator information. Hereinafter, the disclosure will now be described assuming a method of determining a PUCCH resource, in assumption of 1) above, In other words, the UE determines a PUCCH transmission slot (slot n+2) by applying a K1 value, based on a slot including a first PDSCH from among a plurality of PDSCHs scheduled via the DCI. Here, the UE may determine a PUCCH transmission slot for HARQ-ACK transmission with respect to a PDSCH other than the first PDSCH, by using a difference between slots on which respective PDSCHs are transmitted, based on an indicated K2 and a slot on which the first PDSCH is transmitted. In other words, a K1 value with respect to nth PDSCH (K1n) may be determined as K1n=K1−k that is a difference between a difference (k slot) between a slot (slot n) on which the first PDSCH is transmitted and a slot (slot n+k) on which an nth PDSCH is transmitted and K1 value indicated by DCI. In FIG. 13, in a case of PDSCH#2, a difference between slots on which PDSCH#1 and the PDSCH are transmitted is k=1, and K 1=2, and thus, the UE may determine K1=K1−k=1 with respect to PDSCH#2. Equally, in a case of PDSCH#1 and PDSCH#3, a difference between slots on which the PDSCH is transmitted is k=2, and K1=2, and thus, the UE may determine K1=K1−k=0 with respect to PDSCH#2, In other words, a K1 value of the DCI is applied based on a slot on which a scheduled first PDSCH is received, and a K1 value decreased by slot duration based on a reception slot of the first PDSCH is applied to a PDSCH other than the first PDSCH, such that values respectively for scheduled PDSCHs may be determined.

Hereinafter, the disclosure proposes, when one DCI schedules a plurality of PDSCHs, method by which the DCI includes one PDSCH-to-HARQ feedback timing indicator field and/or a value of PDSCH-to-HARQ_feedback timing indicator field (hereinafter, for convenience of descriptions, referred to as a K1 field, K1, or K1 value) of the DCI indicates one or more HARQ-ACK transmission timings. In more detail, the BS may transmit DCI for scheduling N PDSCHs to the UE, may indicate one or more K1 values via a PDSCH-to-HARQ_feedback timing indicator field of the DCI, and thus, may indicate one or more HARQ-ACK feedback transmission timings for N PDSCHs.

A method of indicating a K1 value for each PDSCH by using one or more K1 values via the PDSCH-to-HARQ_feedback timing indicator field of the DCI will now be described. The PDSCH-to-HARQ_feedback timing indicator field may be predefined or HARQ feedback timing table may be configured by higher layer signaling from the BS. Upon reception of the configuration, the UE can indicate one or more K1 values to an index value indicated by the PDSCH-to-HARQ_feedback timing indicator field, and thus, the UE can determine K1 values of respective PDSCHs scheduled according to a K1 value indicated by each column of the table index. In the UE being scheduled for reception of two PDSCHs via DCI, when a value of a PDSCH-to-HARQ_feedback timing indicator field of the DCI is 1, the UE may sequentially apply a K1 value corresponding to the indicated table 20 index 1 to scheduled PDSCHs from the left column of table to the right, In other words, in the example above, the UE may determine a K1 value of a first PDSCH as A, and a K1 value of a second PDSCH as B.

TABLE 20

| Index | K11 | K12 | ... | K1n |
|---|---|---|---|---|
| 0 | A | — | — | — |
| 1 | A | B | — | |
| 2 | B | C | ... | |
| 3 | A | C | ... | F |

Hereinafter, the disclosure proposes a method of determining a PDSCH group index with respect to one or more PDSCHs scheduled via DCI. In other words, there is a need for a method of determining a group index with respect to a PDSCH for a case where one PDSCH group index is included in the DCI for scheduling the plurality of PDSCHs.

In FIG. 13, the UE receives DCI in a slot n, determines the number of scheduled PDSCHs indicated by the DCI, and receives PDSCH#1, PDSCH#2, and PDSCH#3 according to scheduling information of the DCI. The UE may deliver a HARQ-ACK result with respect to the PDSCHs to the BS via a PUCCH in a slot n+2 which is determined based on a K1 value (K1=0) of the DCI and PUCCH resource indicator information. In this regard, as values with respect to a plurality of PDSCHs are indicated as one K1 value, a PDSCH (PDSCH#3 in FIG. 13) that does not satisfy a PDSCH processing time condition (e.g., an L1 or Tproc, 1 condition above) of the may occur from among PDSCHs scheduled via the DCI. The UE may determine a K1 value of the PDSCH not satisfying the PDSCH processing time condition, as a non-numerical value. In other words, the UE may determine that a K1 value indicated via the DCI is applied to PDSCH#1 and PDSCH#2, and the K1 value is not applied to PDSCH#3, or a K1 value of PDSCH#3 is a non-numerical value. In this regard, the UE may determine that a PDSCH group index value indicated by the DCI is applied to each of the scheduled PDSCHs. In other words, in FIG. 13, when the PDSCH group index value indicated by the DCI is g, the UE may determine that each of PDSCH#1, PDSCH#2, and PDSCh#3 belongs to PDSCH group g. Here, as described above, with respect to a PDSCH such as PDSCH#3 for which a K1 value is indicated or determined as a non-numerical value, the UE determines that a PUCCH transmission time or slot in which HARQ-ACK information with respect to a PDSCH is not yet determined, and thus, the UE does not transmit the HARQ-ACK information and/or a PUCCH. Here, the HARQ-ACK information that is not transmitted may be transmitted to the BS by DCI of which value of a PDSCH-to-HARQ_feedback timing indicator field does not indicate a non-numerical value and which is from among a plurality of D being received after the DCI reception time. In the example above, when the UE receives DCI after one of a slot n or slot n+2, if a PDSCH group index indicated by a PDSCH group index field of the DCI is g, and a value of the number of requested. PDSCH groups is 0 or 1, the UE may transmit HARQ-ACK information with respect to a PDSCH group with respect to at least PDSCH group index g to the BS. Here, in the example above, as it is determined or indicated that all of PDSCH#1, PDSCH#2, and PDSCH#3 are included in the PDSCH group g, the UE may transmit HARQ-ACK information with respect to PDSCH#1, PDSCH#2, and PDSCH#3 to the BS. In this case, HARQ-ACK information with respect to PDSCH#1 and PDSCH#2 are already transmitted via a PUCCH of slot n+2, and thus, unnecessary transmission of HARQ-ACK information may occur. As this is a problem occurring when a PDSCH indicated as a non-numerical value is indicated or determined to be included in the same PDSCH group as a PDSCH indicated as a numerical value, the disclosure proposes a method of determining or indicating one or more PDSCH group indices for a plurality of PDSCHs by using a value of a PDSCH group index field of DCI.

As in the proposed method above, a PDSCH group index value of DCI may be applied to a PDSCH indicated as a numerical value, and a value different from the PDSCH group index value may be applied to a PDSCH indicated as a non-numerical value. In more detail, FIG. 13 will now be described, assuming a maximum of Z PDSCH groups. The UE receives DCI in a slot n, and determines the number of PDSCH scheduled via at least one field (e.g., a time domain resource allocation field) of the DCI. In a case where the DCI schedules a plurality of PDSCHs, if a K1 value of the DCI is a non-numerical value, the VE may apply a non-numerical value to all of the plurality of scheduled PDSCHs. Here, when a PDSCH group index value of the DCI is g, the UE may determine that the plurality of PDSCHs all belong to a PDSCH group g or may determine all of the plurality of PDSCHs belong to a PDSCH group ((g+offset)modulo Z). In this case, offset may be 1 or −1, and may be a value that is predefined or is configured for the UE by an upper signal from the BS. In a case where the DCI schedules a plurality of PDSCHs, if a K1 value of the DCI is not a non-numerical value or is a numerical value, the UE may apply a K1 value and g of the PDSCH group index value to PDSCH (PDSCH#1 and PDSCH#2 of FIG. 13) to satisfy a PDSCH processing time condition of the UE from among the plurality of scheduled PDSCHs, may determine that a K1 value of PDSCH (PDSCH#3 of FIG. 13) not satisfying the PDSCH processing time condition is a non-numerical value, and may determine that a PDSCH group of the PDSCH belongs to (g- offset Z. Afterward, when the UE receives DCI in a slot n or after slot n+2, the UE, if a PDSCH group index of the DCI is (g+offset)modulo Z or a value of the number of requested PDSCH groups is 1, and if a K1 value of the DCI is not a non-numerical value, the UE may transmit HARQ-ACK information (e.g., HARQ-ACK information about a PDSCH indicated or determined as a PDSCH group index ((g+offset)modulo Z)) including the not-transmitted HARQ-ACK information to the BS.

In addition, a method of applying a field of DCI capable of scheduling a plurality of PDSCHs to one or more PDSCHs will now be described. DCI format 1_1 for scheduling a PDSCH in the NR system may include fields, as described below. The UE may be provided or configured, by an upper signal, as to whether at least one field is included. The UE may be configured, by an upper signal (maxNrofCodeWordsScheduledByDCI) from the BS, with a number of maximum codewords one DCI can schedule. Here, a base value or a default value of maxNrofCodeWordsScheduledByDCI may be configured or predefined as 1. When a configuration value of the upper signal (maxNrofCodeWordsScheduledByDCI) is 2, DCI may include MCS, NDI, and RV fields with respect to a second transport block as shown below, in addition to MCS, NDI, and RV fields with respect to a first codeword or transport block (e.g., MCS 1, NDI 1, RV 1 fields with respect to transport block 1 or MCS2, NDI2, RV2 fields with respect to transport block 2 (when maxNrofCodeWordsScheduledByDCI=2)).

An example of sizes of MCS, NDI, and RV fields with respect to one scheduled PDSCH are 5 bits, 1 bit, and 2 bits, respectively, but the disclosure is not limited thereto. Also, in a case where the DCI is DCI capable of scheduling a plurality of PDSCHs, a size of at least one of the fields may be increased according to a maximum number of PDSCHs (Nmax) that the DCI can schedule. In a case where it is assumed that sizes of MCS, NDI, and RV fields with respect to one PDSCH are 5 bits, 1 bit, and 2 bits, respectively, the sizes of the MCS, NDI, and RV field may be respectively increased to 5 Nmax, Nmax, and 2 Nmax bits to indicate MCS, NDI, and RV values with respect to each transport block being transmitted via Nmax PDSCHs that can be scheduled by the DCI. The NDI and RV fields may be configured as a bitmap. In this regard, in order to minimize an increase in a size of the DCI, it is possible that an MCS field with a 5-bit size may be applied to all PDSCHs to be scheduled.

Also, it is possible that an RV field with respect to one PDSCH is configured to have a 1-bit size such that a size of the RV field in the DCI is Nmax, When the R field has a 2-bit size, at least one RV value among 0, 2, 3, and I may be indicated by the RV field of the DCI.

When the RV field has a 1-bit size, a value (e.g., 2 or 3) and at least 0 among 0, 3, and 1 may be indicated by the 1-bit field of the RV field. Examples of sizes of MCS, NDI, and RV fields in the DCI are shown below.

MCS1 (5 bits), NDI1 (Nmax bits), and RV1 fields (Nmax bits) with respect to transport block 1

MCS2 (5 bits), NDI2 (Nmax bits and RV2 fields (Nmax bits) with respect to transport block 2 (when maxNrofCodeWordsScheduledByDCI=2)

Therefore, in preparation for a case where DCI schedules only one PDSCH, when DCI can schedule Nmax PDSCHs, 4(Nmax-1) bits are added to the DCI. When Nmax is 8, a minimum of 28 bits has to be added to the DCI, and this affects DCI (or PDCCH) reception performance of the UE. Therefore, in a case where DCI can schedule a plurality of PDSCHs, when the DCI can schedule a plurality of transport blocks, and when the DCI is equal to or greater than maxNrottodeWordsScheduledByDCI 2, there is a need for a method for minimizing an increase in a size of the DCI.

Hereinafter, the disclosure proposes a method for minimizing a size of DCI for a case where the DCI is configured to schedule a plurality of PDSCHs and a plurality of transport blocks. Hereinafter, the disclosure relates to a case where one DCI is configured to schedule a plurality of PDSCHs and a plurality of transport blocks, and in particular, to a case where a plurality of transport blocks are all scheduled. A case where transmission of at least one transport block from among the plurality of configured transport blocks is disabled or at least one transport block is not scheduled will be separately described.

"Method A" refers to a method of determining the number of transport blocks that can be scheduled according to configured Nmax.

Method A will now be described in detail. The UE may be configured by the BS with Nmax, i.e., the number of PDSCHs that can be maximally scheduled by DCI, or may determine Nmax based on at least one configuration information from the BS. example, the UE may determine or be configured with a maximum number of SLIVs included in a row of a table configured via a time domain resource allocation list configured by an upper signal. Here, the UE may compare an Nmax value with N2, which is a threshold predefined or configured by an upper signal, and thus, may determine a maximum configurable number of codewords or a maximum configurable number of transport blocks. When an Nmax value is equal to or greater than N2, the UE may be configured such that DCI can schedule only one transport block (for example, maxNrofCodeWordsScheduledByDCI=1 is configured or maxNrofCodeWordsScheduledByDCI is not configured). Sizes of MCS, NDI, and RV fields in DCI are described below, and a total number of bits is 4N2+10 bits.

MCS1 (5 bits), NDI1 (N2 bits), and RV1 fields (N2 bits) with respect to transport block 1

MCS2 (5 bits), NDI2 (N2 bits), and RV2 fields (N2 bits) with respect to transport block 2

Here, N2 is a value that is configurable by Nmax/2, flooring(Nmax/2), ceiling(Nmax/2), or an upper signal.

If an Nmax value is smaller than N2, the UE may be configured DCI to schedule only a plurality of transport blocks (e.g., maxNrofCodeWordsficheduledByDCI=2).

Here, an example of sizes of MCS, NDI, and RV fields in DCI are described below, and a total number of bits is 5+2 Nmax bits.

MCS1 (5 bits), NDI1 (Nmax bits and RV1 fields (Nmax bits) with respect to transport block 1

Accordingly, the UE is enabled to determine a maximum configurable number of codewords or a maximum configurable number of transport blocks by comparing the Nmax value with N2, such that an increase in a size of the DCI may be minimized. When N2=Nmax/2, a difference between the numbers of bits in the example above is restricted to 5 bits.

Therefore, the UE that received DCI for scheduling N PDSCHs according to method A determines all MCSs of N transport blocks 1 transmitted via N PDSCHs as an MCS1 value, determines an NDI value of transport block 1 transmitted via ith PDSCH as a value of ith bit among N bits from an MSB of the NDI1 bit string to an LSB sequentially by 1 bit, and determines an RV value of the transport block 1 transmitted via ith PDSCH as a value corresponding to ith bit among N bits from an MSB of an RV1 bit string to an LSB sequentially by 1 bit. Similarly, the UE determines all MCSs of N transport blocks 2 transmitted via N PDSCHs as an MCS2 value, determines an NDI value of transport block I transmitted via ith PDSCH as a value of ith bit among N bits from an MSB of the NDI2 bit string to an LSB sequentially by 1 bit, and determines an RV value of the transport block 1 transmitted via ith PDSCH as a value corresponding to ith bit among N bits from an MSB of an RV2 bit string to an LSB sequentially by 1 bit.

"Method B" refers to a method of equally applying all values of MCS2, NDI2, and RV2 fields with respect to transport block 2 to transport block 2.

Method B will now be described in detail. The UE may be configured by the BS with Nmax, i.e., the number of PDSCHs that can be maximally scheduled by DCI, or may determine Nmax based on at least one configuration information from the BS. The UE may determine or be configured with a maximum number of SLIVs included in a row of a table configured via a time domain resource allocation list configured by an upper signal. If the UE is configured, by an upper signal (e.g., maxNrofCodeWordsScheduledByDCI) from the BS, the number of transport blocks that can be scheduled by the DCI is greater than 1 or a configuration information value corresponding thereto can schedule a plurality of transport blocks, MCS2, NDI2, and RV2 values may be included in the DCI. In the method B, sizes of MCS, NDI, and RV fields (MCS1, NDI1, and RV1 fields) with respect to transport block 1 may be determined according to Nmax, which is the number of PDSCHs that can be maximally scheduled by the DCI, and sizes of MCS, NDI, and RV fields (MCS2, NDI2, and RV2 fields) with respect to transport block 2 may be determined, regardless of Nmax. An example of sizes of MCS, NDI, and RV fields in DCI according to method B may be as below, and in this regard, a total number of bits may be 11+2 Nmax or 12+2 Nmax bits.

MCS1 (5 bits), NDI1 (Nmax bits), and RV1 fields (Nmax bits) with respect to transport block 1

MCS2 (5 bits), NDI2 (1 bit), and RV2 fields (1 or 2 bits) with respect to transport block 2

Therefore, the UE that received DCI for scheduling N PDSCHs according to method B determines all MCSs of N transport blocks 1 transmitted via N PDSCHs as an MCS1 value, and determines an NM value of transport block I transmitted via ith PDSCH as a value of ith bit among N bits from an MSB of the NDII bit string to an LSB sequentially by 1 bit. Similarly, the UE determines an RV value of the transport block 1 transmitted via ith PDSCH as a value corresponding to ith bit among N bits from an MSB of an RVI bit string to an LSB sequentially by 1 bit. Here, MCSs of N transport blocks 2 transmitted via N PDSCHs are all MCS2, the NDI2 value is equally applied to an NDI value of each transport block 2, and an RV2 value is equally applied to an RV value of each transport block 2.

"Method C" refers to a method of including one MCS, NDI, and RV field in DCI and applying a value of the MCS, NDI, and RV field to all scheduled PDSCHs and/or transport blocks.

Method C will now be described in detail. The UE may be configured by the BS with Nmax, i.e., the number of PDSCHs that can be maximally scheduled by DCI, or may determine Nmax based on at least one configuration information from the BS. The UE may determine or be configured with a maximum number of SLIVs included in a row of a table configured via a time domain resource allocation list configured by an upper signal. The LIE may be configured, by an upper signal (e.g., maxNrofCodeWordsScheduledByDCI) from the BS, with the number of transport blocks that can be scheduled by the DCI to greater than 1 or may determine or be configured with a configuration information value corresponding thereto that can schedule a plurality of transport blocks. Here, according to the method C, one MCS, NDI, and RV field is included in the DCI. Here, in the method C, sizes of NDI and RV fields (NM and RV1 fields) may be determined according to Nmax, which is the number of PDSCHs that can be maximally scheduled by DCI, and MCS, NDI, and RV fields with respect to transport block 2 may not be included in the DCI. An example of sizes of MCS, NDI, and RV fields in DCI according to method C is described below, and in this regard, a total number of bits is 5+2 Nmax bits.

MCS (5 bits), NDI (Nmax bits), and RV fields (Nmax bits) with respect to transport block 1 and/or transport block 2

Therefore, the UE that received DCI for scheduling N PDSCHs according to method C may determine all MCSs of 2N transport blocks transmitted via N PDSCHs as an MCS field value of the DCI, and may determine an NDI value of each transport block 1 and transport block 2 transmitted via ith PDSCH as a value of ith bit among N bits from an MSB of the NIX bit string to an LSB sequentially by 1 bit. Similarly, the UE may determine an RV value of each of the transport block 1 and the transport block 2 transmitted via ith PDSCH as a value of ith bit among N bits from an MSB of the RV bit string to an LSB sequentially by 1 bit.

In the description above, MCS2 may be an MCS offset value (MCS_offset) based on MCS1, and a size of the MCS2 field may be smaller than 5 bits, and a size of a field and an offset value indicatable by the field may be configured for or provided to the UE by an upper signal from the BS. The offset value may be configured as a positive value including 0 or may include a negative value smaller than 0. When an MCS1 value of the DCI is m, and an MCS2 (or MCS offset) value is offset, the UE may determine that an MCS value of transport block 2 corresponds to MCS1+offset or may determine that the MCS value of transport block 2 corresponds to a result value of (MCS1+offset)modulo Y. Y may be a maximum value of an MCS table configured by the UE, e.g., 31, or may be a maximum value among MCS values other than a reserved value, e.g., 27 or 28, and the UE may be configured with or be provided a Y value by an upper signal.

In this regard, even when DCI is configured to schedule a plurality of PDSCHs and a plurality of transport blocks, as described above, transmission of at least one transport block may be disabled according to scheduling by the BS. In a case where N PDSCHs are scheduled via DCI, when an MCS value and an RV value indicated with respect to transport block 2 of ith PDSCH are I and R (e.g., 1=26, R=1), respectively, the UE may determine that transmission (or reception) of transport block 2 corresponding to MCS and RV indicated by the I and R from among transport blocks transmitted via ith PDSCH is disabled, and may not receive the transport block. In this case. I and R refer to values indicating to disable a transport block, and are not limited to a case where I=26 and R=1. For example, in a case where I=26 and R=0, or one of I=29, 30, 31 and. R=1, or one of I=29, 30, 31 and R=0, the UE may determine that a transport block indicated as the value is disabled or may be configured with, by an upper signal, values of I and R indicating that a transport block is disabled. In a case where transmission of one transport block is enabled, e.g., when at least one value among an MCS value and an RV value indicated with respect to transport block 1 of the ith PDSCH is not I nor R, the UE may determine that the transport block 1 is a transport block of which transmission (or reception) is enabled, and thus, may receive it. As described above, when transmission with respect to one transport block is enabled, the enabled transport block is always mapped to a first codeword. In other words, transport blocks of which transmission is enabled are sequentially mapped to codewords starting from a codeword with a low codeword index.

Hereinafter, a case where DCI is configured to schedule N PDSCHs and 2 transport blocks will now be described as an example. In particular, a case where transmission of transport block 2 is disabled by DCI will be described.

In a case where it is possible to indicate an RV value of at least 1 bit with respect to each of transport blocks transmitted via N PDSCHs, as is the case in method A, when an MCS value and an RV value with respect to a transport block transmitted via ith PDSCH are respectively indicated as I and R by DCI, the UE may determine that the transport block corresponding to the MCS value and the RV value indicated as the values above is disabled.

In a case of transport block 1 in which an RV value of at least 1 bit may be indicated with respect to N PDSCHs, as is the case in method B, when an MCS value and an RV value with respect to a transport block transmitted via ith PDSCH are respectively indicated as I and R by DCI, the UE may determine that the transport block corresponding to the MCS value and the RV value indicated as the values above is disabled. In a case of transport block 2 that cannot indicate an RV value of 1 bit with respect to each of N PDSCHs, the UE may determine whether transport block 2 is disabled, based on at least one of the following conditions. When MCS2 and RV2 values of the DCA are I and R, the UE may determine that all transport blocks 2 transmitted via N scheduled PDSCHs are disabled, and/or
the UE may determine that transport block 2 transmitted via a particular PDSCH (e.g., one of a first PDSCH or a last PDSCH) from among N scheduled PDSCHs is disabled, and transport blocks transmitted via remaining PDSCHs are enabled.

In addition, a field (e.g., EnableTB) for indicating disabling/enabling a transport block may be added into DCA, and a determination as to whether a transport block is disabled or enabled may be made via the field. The field may be configured as 1 bit or 2 bits to indicate whether to disable/enable transport block 1 and/or transport block 2, as shown in Table 21 below. When the field is configured as 2 bits, the field may be configured as a bitmap, and whether to disable/enable each transport block may be indicated sequentially by 1 bit from MSB of the bitmap to LSB. Here, values of MCS, NDI, and RV in the DCI may be applied to a transport block indicated as being enabled.

TABLE 21

| Value | EnableTB | Value | EnableTB |
|---|---|---|---|
| 0 | TB2 is disabled | 00 | TB1 and TB2 are disabled |
| 1 | TB2 is enabled | 01 | TB1 is enabled and TB2 is disabled |
| | | 10 | TB1 is disabled and TB2 is enabled |
| | | 11 | TB1 and TB2 are enabled |

A field may be configured as one of Nmax bits or N2 bits, and may indicate whether to disable/enable one (e.g., transport block 2) of transport blocks transmitted via respective PDSCHs. Here, the field may be configured as one of 2 Nmax bits or 2N2 bits, and in this case, whether to disable/enable each of transport blocks transmitted via respective PDSCHs may be indicated.

According to the number of PDSCHs that can be scheduled by DCI (Nmax) or the number of PDSCHs that is actually scheduled by the DCI (N), an RV value (or the number of RV bits to be applied) with respect to ith PDSCH scheduled by the DCI may be determined differently or applied differently. In a case where a size of an RV field of the DCI is Nmax or N2 bits, if the number of PDSCHs, N, that is actually scheduled by the DCI is equal to or smaller than N3, it may be determined that an RV value of each PDSCH is indicated by 2 bits in a sequential order starting from an MSB to an LSB of the RV field, and when N is greater than N2, an RV value of each PDSCH is indicated by 1 bit, in a sequential order starting from an MSB to an LSB of an RV field. Here, N3 may be predefined (e.g., when N3=1 or one or two PDSCHs are scheduled), may be configured by an upper signal, or may be determined according to one value among Nmax or N2. When it is assumed that an RV field size with respect to one PDSCH or transport block is S (e.g., S=2), N3 may be determined as one of N3=Nmax/S, N2/S, ceil(Nmax/S), ceil(N2/S), floor(Nmax/S), and floor(N2/S).

In a case where Nmax, N2, and N3 are respectively 8, 4, and 2, and transport blocks 1 and 2 are all enabled in the method A, when the number of PDSCHs, N, that are actually scheduled by the DCA is N=3 or 4, the UE may determine an RV value of each of transport blocks 1 and 2 transmitted via ith PDSCH, in a manner as described below. That is, the UE determines that ith bit in a sequential order starting from an MSB to an LSB of each of RV1 and RV2 fields of DCI is an RV value of each of transport blocks 1 and 2 of ith PDSCH. When the number of PDSCHs, N, that is actually scheduled by the DCI is N=1 or 2, the HE determines that an RV value of each of transport blocks 1 and 2 transmitted via ith PDSCH is 2*ith bit in a sequential order starting from an MSB to an LSB of each of RV1 and RV2 fields of DCI. In other words, first and second bits among an RVI value having 4 bits are an RV value of transport block 1 of a first PDSCH, and third and fourth bits among the RV1 value are an RV value of transport block 1 of a second PDSCH.

In the disclosure, for convenience of descriptions, a value of a particular field in DCI may be interchangeably used to indicate a value applied to one PDSCH, a plurality of PDSCHs, one transport block, a plurality of transport blocks transmitted via one PDSCH, or a plurality of PDSCHs.

Figure 14:
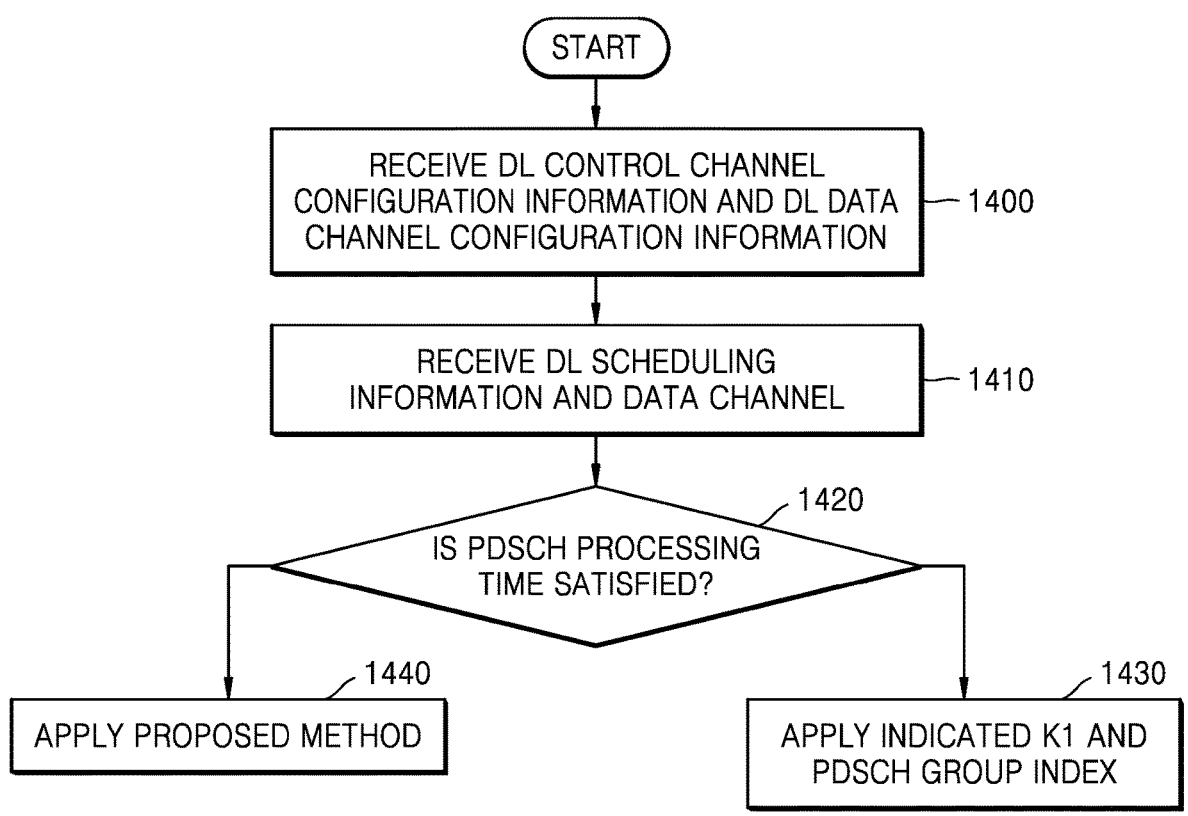
FIG. 14 illustrates a flowchart of an operation of a UE, according to an embodiment.

FIG. 14 illustrates a flowchart of an operation of a UE, according to an embodiment of the disclosure.

Referring to FIG. 14, the UE receives DL control channel configuration information and DL data channel configuration information (e.g., PDCCH-Config and PDSCH-Config) by an upper signal from a BS in step 1400. The IDL data channel configuration information may include at least one of a maximum number of PDSCHs that can be scheduled by one DCI as described above, time domain resource allocation information about a PDSCH that can be scheduled by one DCI, K1 configuration information, or a value of a maximum number of PDSCH groups. The DL control channel configuration information may include a frequency resource region (CORESET) in which a control channel is transmitted, search space information, and the like.

According to the configuration, the HE receives DCI transmitted via a DL control channel from the BS, and receives one PDSCH or a plurality of PDSCHs according to the DCI in step 1410. The UE determines whether it is possible to transmit valid HARQ-ACK information with respect to scheduled PDSCHs, by using at least one of time domain allocation information of each PDSCH determined via the DCI, K1 information, PDSCH group information, PUCCH resource indicator information, or PDSCH processing capability information of the UE in step 1420, In other words, as described above, the UE determines whether a PDSCH processing time condition of the UE is satisfied with respect to each of the scheduled PDSCHs. The UE applies at least one of K1 or a PDSCH group index indicated by the DCI to a PDSCH determined to satisfy the PDSCH processing time condition of the UE from among the PDSCHs in step 1430. The UE determines at least one of K1 or a PDSCH group index, by using various methods of the disclosure, to a, PDSCH determined not to satisfy the PDSCH processing time condition of the UE from among the PDSCHs in step 1440. For example, in step 1440, the UE determines a K1 value of a PDSCH as a non-numerical value, and a PDSCH group index as (g+offset)modulo Z.

Operations described above are not necessarily performed to implement embodiments of the disclosure, and an order of each operation may be changed, some operations may be omitted, or another operation may be added thereto to be performed.

Figure 15:
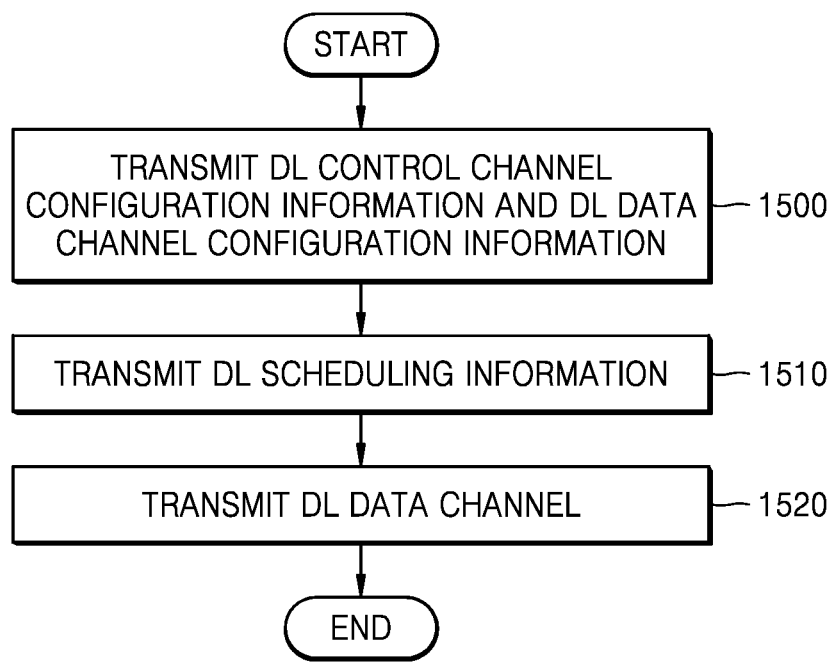
FIG. 15 illustrates a flowchart of an operation of a BS, according to an embodiment.

FIG. 15 is a flowchart illustrating an operation of a BS, according to an embodiment of the disclosure.

Referring to FIG. 15, the BS transmits DL control channel configuration information and DL data channel configuration information (e.g., PDCCH-Config and PDSCH-Config) by an upper signal to a UE in step 1500. The DL data channel configuration information may include at least one of a maximum number of PDSCHs that can be scheduled by one DCI as described above, time domain resource allocation information about a PDSCH that can be scheduled by one DCI, K1 configuration information, or a value of a maximum number of PDSCH groups. The DL control channel configuration information may include a frequency resource region (CORESET) in which a control channel is transmitted, search space information, and the like. Afterward, the BS transmits DCI via a DL control channel to the UE in step 1510. Then, the BS transmits a PDSCH scheduled by the DCI in step 1520. Also, the BS may receive HARQ-ACK information that is a result of reception with respect to the PDSCH by the UE.

The embodiments of the disclosure are not alternative to each other, and one or more methods may be combined and used, The methods according to the embodiments of the disclosure as described herein or in the following claims may be implemented as hardware, software, or a combination of hardware and software.

When implemented as software, a computer-readable storage medium or a computer program product which stores one or more programs (e.g., software modules) may be provided. The one or more programs stored in the computer-readable storage medium or the computer program product are configured for execution by one or more processors in an electronic device. The one or more programs include instructions directing the electronic device to execute the methods according to the embodiments of the disclosure as described herein or in the following claims.

The programs (e.g., software modules or software) may be stored in non-volatile memory including random access memory (RAM) or flash memory, read only memory (ROM), electrically erasable programmable read only memory (EEPROM), a magnetic disc storage device, a compact disc-ROM (CD-ROM), digital versatile discs (DVDs), another optical storage device, or a magnetic cassette. Alternatively, the programs may be stored in memory including a combination of some or all of the above-mentioned storage media. Also, a plurality of such memories may be included.

In addition, the programs may be stored in an attachable storage device accessible through any or a combination of communication networks such as the Internet, an intranet, a local area network (LAN), a wide LAN, and a storage area network (SAN). The storage device may be connected, through an external port, to an apparatus according to the embodiments of the disclosure. Another storage device on the communication network may also be connected to the apparatus performing the embodiments of the disclosure.

In the disclosure, the term "computer program product" or "computer-readable recording medium" may be used to wholly indicate media including a memory, a hard disc installed in a hard disk drive, and a signal. The "computer program product" or "computer-readable recording medium" indicates a means for providing a method of monitoring a DL control channel in a wireless communication system according to the disclosure.

In the aforementioned embodiments of the disclosure, elements included in the disclosure are expressed in a singular or plural form. However, the singular or plural form is appropriately selected for convenience of description and the disclosure is not limited thereto. As such, an element expressed in a plural form may also be configured as a single element, and an element expressed in a singular form may also be configured as plural elements.

The embodiments of the disclosure in the specification and drawings should be considered in a descriptive sense only and not for purposes of limitation. That is, it will be understood by one of ordinary skill in the art that various changes in form and details may be made based on the technical concept of the disclosure. Also, the embodiments may be combined to be implemented, when required. For example, the BS and the UE may be operated in a manner that portions of an embodiment of the disclosure are combined with portions of another embodiment of the disclosure. The embodiments of the disclosure may also be applied to other communication systems, and various modifications based on the technical concept of the embodiments of the disclosure may be made. For example, the embodiments may be applied to an LTE system, a 5G or NR system, or the like.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method performed by a user equipment (UE), the method comprising:
    receiving first downlink control information (DCI) scheduling one or more physical downlink shared channels (PDSCHs), wherein the first DCI includes a PDSCH group index and a hybrid automatic repeat and request (HARQ) feedback timing indicator;
    identifying a value of the HARQ feedback timing indicator included in the received first DCI, wherein a slot for HARQ feedback transmission is determined based on the value of the HARQ feedback timing indicator and a slot where a last PDSCH among the one or more PDSCHs is transmitted; and
    in case that the value is identified as −1, transmitting HARQ feedback information for the one or more PDSCHs on a slot indicated based on a value of a HARQ feedback timing indicator included in a second DCI in which a PDSCH group index is equal to the PDSCH group index of the first DCI.

2. The method of claim 1, further comprising:
    in case that the value of the HARQ feedback timing indicator included in the first DCI is identified as a numerical value, identifying a set of PDSCHs with a minimum UE processing time requirement not fulfilled, among the one or more PDSCHs;
    and assuming the value of the HARQ feedback timing indicator for the set of PDSCHs as −1.

3. The method of claim 2, further comprising:
in case that the PDSCH group index included in the first DCI is g, assuming the PDSCH group index of the identified set of PDSCHs as (g+1) modulo Z, wherein Z is configured as a maximum number of PDSCH group.

4. The method of claim 1, further comprising:
in case that the value of the HARQ feedback timing indicator included in the first DCI is identified as a numerical value, identifying a set of PDSCHs among the one or more PDSCHs with a minimum UE processing time requirement fulfilled; and
determining a slot for HARQ feedback transmission corresponding to the identified set of PDSCHs based on the numerical value included in the first DCI and the slot where the last PDSCH among the one or more PDSCHs is transmitted.

5. A method performed by a base station (BS), the method comprising:
transmitting first downlink control information (DCI) scheduling one or more physical downlink shared channels (PDSCHs), wherein the first DCI includes a PDSCH group index and a hybrid automatic repeat and request (HARQ) feedback timing indicator and a slot for HARQ feedback transmission is determined based on a value of the HARQ feedback timing indicator and a slot where a last PDSCH among the one or more PDSCHs is transmitted; and
transmitting the one or more PDSCHs, wherein in case that the value is a −1, HARQ feedback information for the one or more PDSCHs is transmitted on a slot indicated based on a value of a HARQ feedback timing indicator included in a second DCI in which a PDSCH group index is equal to the PDSCH group index of the first DCI.

6. The method of claim 5, wherein in case that the value of the HARQ feedback timing indicator included in the first DCI is a numerical value and a set of PDSCHs among the one or more PDSCHs with a minimum UE processing time requirement is not fulfilled, the value of the HARQ feedback timing indicator for the set of PDSCHs is assumed as −1.

7. The method of claim 6, wherein in case that the PDSCH group index included in the first DCI is g, the PDSCH group index of the set of PDSCHs is assumed as (g+1) modulo Z, wherein Z is configured as a maximum number of PDSCH group.

8. The method of claim 5, wherein in case that the value of the HARQ feedback timing indicator included in the first DCI is identified as a numerical value and a set of PDSCHs among the one or more PDSCHs with a minimum UE processing time requirement is fulfilled:
a slot for HARQ feedback transmission corresponding to the set of PDSCHs is determined based on the numerical value included in the first DCI and the slot where the last PDSCH among the one or more PDSCHs is transmitted.

9. A user equipment (UE) comprising:
a transceiver; and
a processor coupled with the transceiver and configured to:
receive first downlink control information (DCI) scheduling one or more physical downlink shared channels (PDSCHs), wherein the first DCI includes a PDSCH group index and a hybrid automatic repeat and request (HARQ) feedback timing indicator,
identify a value of the (HARQ) feedback timing indicator included in the received first DCI, wherein a slot for HARQ feedback transmission is determined based on the value of the HARQ feedback timing indicator and a slot where a last PDSCH among the one or more PDSCHs is transmitted, and
in case that the value is identified as −1, transmit HARQ feedback information for the one or more PDSCHs on a slot indicated based on a value of a HARQ feedback timing indicator included in a second DCI in which a PDSCH group index is equal to the PDSCH group index of the first DCI.

10. The UE of claim 9, wherein the processor is further configured to:
in case that the value of the HARQ feedback timing indicator included in the first DCI is identified as a numerical value, identify a set of PDSCHs with a minimum UE processing time requirement not fulfilled, among the one or more PDSCHs, and
assume the value of the HARQ feedback timing indicator for the set of PDSCHs as −1.

11. The UE of claim 10, wherein the processor is further configured to:
in case that the PDSCH group index included in the first DCI is g, assume the PDSCH group index of the identified set of PDSCHs as (g+1) modulo Z, wherein Z is configured as a maximum number of PDSCH group.

12. The UE of claim 9, wherein the processor is further configured to:
in case that the value of the HARQ feedback timing indicator included in the first DCI is identified as a numerical value, identify a set of PDSCHs among the one or more PDSCHs with a fulfilled minimum UE processing time requirement, and
determine a slot for HARQ feedback transmission corresponding to the identified set of PDSCHs based on the numerical value included in the first DCI and the slot where the last PDSCH among the one or more PDSCHs is transmitted.

13. A base station (BS) comprising:
a transceiver; and
a processor coupled with the transceiver and configured to:
transmit first downlink control information (DCI) scheduling one or more physical downlink shared channels (PDSCHs), wherein the first DCI includes a PDSCH group index and a hybrid automatic repeat and request (HARQ) feedback timing indicator and a slot for HARQ feedback transmission is determined based on a value of the HARQ feedback timing indicator and a slot where a last PDSCH among the one or more PDSCHs is transmitted, and
transmit the one or more PDSCHs,
wherein in case that the value is −1, HARQ feedback information for the one or more PDSCHs is transmitted on a slot indicated based on a value of a HARQ feedback timing indicator included in a second DCI in which a PDSCH group index is equal to the PDSCH group index of the first DCI.

14. The BS of claim 13, wherein in case that the value of the HARQ feedback timing indicator included in the first DCI is a numerical value and a set of PDSCHs among the one or more PDSCHs with a minimum UE processing time requirement is not fulfilled:, the value of the HARQ feedback timing indicator for the set of PDSCHs is assumed as −1.

15. The BS of claim 14, wherein in case that the PDSCH group index included in the first DCI is g, the PDSCH group index of the set of PDSCHs is assumed as (g+1) modulo Z, wherein Z is configured as maximum number of PDSCH group.

16. The BS of claim 13, wherein in case that the value of the HARQ feedback timing indicator included in the first DCI is identified as a numerical value and a set of PDSCHs among the one or more PDSCHs with a minimum UE processing time requirement fulfilled:
   a slot for HARQ feedback transmission corresponding to the set of PDSCHs is determined based on the numerical value included in the first DCI and the slot where the last PDSCH among the one or more PDSCHs is transmitted.

* * * * *